(12) United States Patent
Boyd et al.

(10) Patent No.: US 11,170,463 B2
(45) Date of Patent: Nov. 9, 2021

(54) METHODS, SYSTEMS AND APPARATUS TO REDUCE MEMORY LATENCY WHEN FETCHING PIXEL KERNELS

(71) Applicant: Movidius LTD., Dublin (IE)

(72) Inventors: Richard Boyd, Dublin (IE); Richard Richmond, Belfast (GB)

(73) Assignee: MOVIDIUS LIMITED, Schiphol-Rijk (NL)

( * ) Notice: Subject to any disclaimer, the term of this patent is extended or adjusted under 35 U.S.C. 154(b) by 3 days.

(21) Appl. No.: 16/614,755

(22) PCT Filed: May 18, 2018

(86) PCT No.: PCT/EP2018/063223
§ 371 (c)(1),
(2) Date: Nov. 18, 2019

(87) PCT Pub. No.: WO2018/211122
PCT Pub. Date: Nov. 22, 2018

(65) Prior Publication Data
US 2020/0175646 A1    Jun. 4, 2020

Related U.S. Application Data

(60) Provisional application No. 62/508,886, filed on May 19, 2017.

(51) Int. Cl.
*G06T 1/60* (2006.01)
*G06F 9/30* (2018.01)
(Continued)

(52) U.S. Cl.
CPC ............ *G06T 1/60* (2013.01); *G06F 9/30047* (2013.01); *G06F 9/3802* (2013.01);
(Continued)

(58) Field of Classification Search
CPC ......................................................... G06T 1/60
(Continued)

(56) References Cited

U.S. PATENT DOCUMENTS 5,136,697 A    8/1992  Johnson
5,655,098 A    8/1997  Witt et al.
(Continued)

FOREIGN PATENT DOCUMENTS

EP    2998868 A1    3/2016

OTHER PUBLICATIONS

Jason Clemons, Chih-Chi Cheng, Iuri Frosio, Daniel Johnson, and Stephen W. Keckler. 2016. A patch memory system for image processing and computer vision. In The 49th Annual IEEE/ACM International Symposium on Microarchitecture (MICRO-49). IEEE Press, Article 51, 1-13 (Year: 2016).*

(Continued)

*Primary Examiner* — Shivang I Patel
(74) *Attorney, Agent, or Firm* — Hanley, Flight & Zimmerman, LLC

(57) ABSTRACT

Methods, systems, apparatus, and articles of manufacture to reduce memory latency when fetching pixel kernels are disclosed. An example apparatus includes a prefetch kernel retriever to generate a block tag based on a first request from a hardware accelerator, the first request including first coordinates of a first pixel disposed in a first image block, a memory interface engine to store the first image block including a plurality of pixels including the pixel in a cache storage based on the block tag, and a kernel retriever to access two or more memory devices included in the cache storage in parallel to transfer a plurality of image blocks including the first image block when a second request is received including second coordinates of a second pixel disposed in the first image block.

25 Claims, 24 Drawing Sheets

(51) Int. Cl.
  *G06F 9/38* (2018.01)
  *G06F 9/48* (2006.01)
  *G06F 9/50* (2006.01)

(52) U.S. Cl.
  CPC .......... *G06F 9/3842* (2013.01); *G06F 9/4806* (2013.01); *G06F 9/5027* (2013.01)

(58) Field of Classification Search
  USPC ........................................................ 345/530
  See application file for complete search history.

(56) References Cited

U.S. PATENT DOCUMENTS

| | | |
|---|---|---|
| 6,339,822 B1 | 1/2002 | Miller |
| 2011/0161600 A1 | 6/2011 | Hirano et al. |
| 2015/0058572 A1 | 2/2015 | Olson et al. |
| 2015/0324292 A1* | 11/2015 | Krishnaiyer ........ G06F 12/0862 711/137 |
| 2016/0077969 A1 | 3/2016 | Seo et al. |

OTHER PUBLICATIONS

International Searching Authority, "Search Report," issued in connection with PCT patent application No. PCT/EP2018/063223 dated Jul. 4, 2018, 4 pages.

International Searching Authority, "Written Opinion," issued in connection with PCT patent application No. PCT/EP2018/063223 dated Jul. 4, 2018, 6 pages.

Clemons Jason et al., "A Patch Memory System for Image Processing and Computer Vision", 2016 49th Annual IEEE/ACM International Symposium on Microarchitecture (Micro), IEEE, (Oct. 15, 2016), 13 pages.

N. Zhou, F. Qiao and H. Yang, "A Hybrid Cache Architecture with 2D-based Prefetching Scheme for Image and Video Processing," 2013 International Conference on Communication and Signal Processing, Melmaruvathur, 2013, pp. 1092-1096, 5 pages.

Ju-Hyun Kim et al., "Cache Organizations for H.264/AVC Motion Compensation," 13th IEEE International Conference on Embedded and Real-Time Computing Systems and Applications, 2007, 8 pages.

* cited by examiner

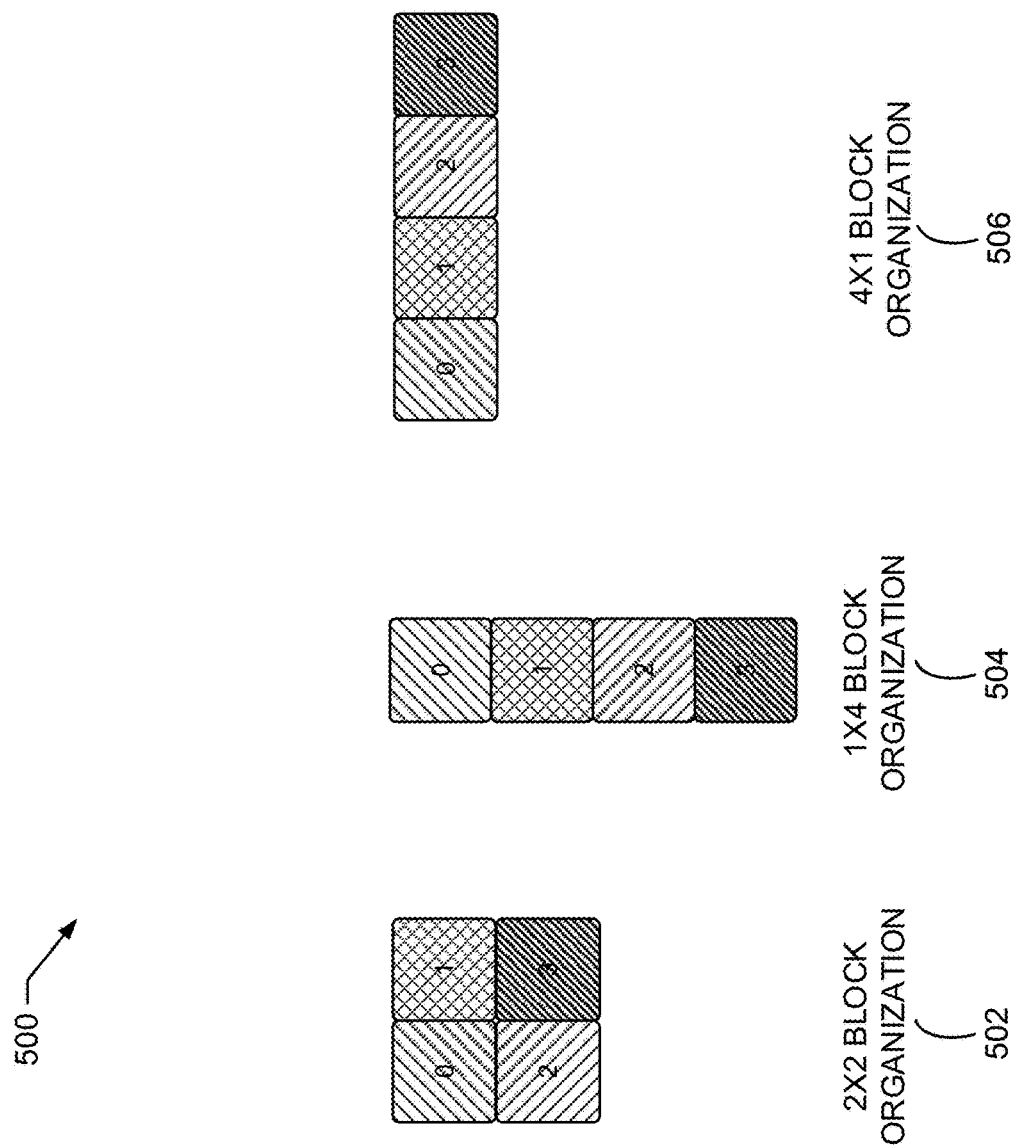

| SIGNAL | BITS | DIRECTION | DESCRIPTION |
|---|---|---|---|
| REQ[3:0][X-1:0] | 4 | INPUT | PER BLOCK REQUEST VECTORS (BIT 0 CORRESPONDS TO BLOCK 0, BIT 1 TO BLOCK 1 AND SO ON), ACTIVE HIGH. THERE ARE X BITS PER REQUEST, THE NUMBER OF BITS SET INDICATE HOW MUCH TO INCREMENT THE COUNT ENTRY FOR THE BLOCK IN THE TAG MEMORY. |
| COORDS.X | 16 | INPUT | PIXEL X-COORDINATE |
| COORDS.Y | 16 | INPUT | PIXEL Y-COORDINATE |
| GNT | 1 | OUTPUT | GRANT, ACTIVE HIGH, CURRENT COORDINATES ACCEPTED TO PRE-FETCHER |

PRE-FETCH INTERFACE SIGNAL TABLE

FIG. 6

| | SIGNAL | BITS | DIRECTION | DESCRIPTION |
|---|---|---|---|---|
| 802 | REQ[3:0][1:0] | 4 | INPUT | PER BLOCK REQUEST VECTORS (BIT 0 CORRESPONDS TO BLOCK 0, BIT 1 TO BLOCK 1 AND SO ON), ACTIVE HIGH |
| 804 | | | | THERE ARE TWO BITS PER REQUEST, THE NUMBER OF BITS SET INDICATE HOW MUCH TO DECREMENT THE COUNT ENTRY FOR THE BLOCK IN THE TAG MEMORY. |
| 806 | COORDS.X | 16 | INPUT | PIXEL X CO-ORDINATE. |
| 808 | COORDS.Y | 16 | INPUT | PIXEL Y CO-ORDINATE. |
| 810 | GNT | 1 | OUTPUT | GRANT, ACTIVE HIGH, CURRENT CO-ORDINATES ACCEPTED TO READ |
| 812 | DATA.BLOCK0 | 256 | OUTPUT | BLOCK 0 (REQUESTED PIXEL LIES IN THIS BLOCK). |
| 814 | DATA.BLOCK1 | 256 | OUTPUT | BLOCK 1 |
| 816 | DATA.BLOCK2 | 256 | OUTPUT | BLOCK 2 |
| 818 | DATA.BLOCK3 | 256 | OUTPUT | BLOCK 3 |
| | VALID | 1 | OUTPUT | DATA FOR PREVIOUSLY GRANTED REQUEST IS VALID, ACTIVE HIGH |

FIG. 8

FIG. 10 — MORTON ORDER 2B/PIXEL 8X8 BLOCK TAG AND INDEX BITS

FIG. 11 — MORTON ORDER 1B/PIXEL 16X8 BLOCK TAG AND INDEX BITS

FIG. 12 — COLUMN-MAJOR ORDER 2B/PIXEL 8X8 BLOCK TAG AND INDEX BITS

FIG. 13 — COLUMN-MAJOR ORDER 1B/PIXEL 16X8 BLOCK TAG AND INDEX BITS

2000 →

| 127 | 96 | 95 | 64 | 63 | 32 | 31 | 0 |
|---|---|---|---|---|---|---|---|
| A+1, FP32 X | | A+1, FP32 Y | | A, FP32 X | | A, FP32 Y | |

| 127 | 112 | 111 | 96 | 95 | 80 | 79 | 64 | 63 | 48 | 47 | 32 | 31 | 16 | 15 | 0 |
|---|---|---|---|---|---|---|---|---|---|---|---|---|---|---|---|
| LocA+3 X | | LocA+3 Y | | LocA+2 X | | LocA+2 Y | | LocA+1 X | | LocA+1 Y | | LocA X | | LocA Y | |

| 127 | 112 | 111 | 96 | 95 | 80 | 79 | 64 | 63 | 48 | 47 | 32 | 31 | 16 | 15 | 0 |
|---|---|---|---|---|---|---|---|---|---|---|---|---|---|---|---|
| LocA+3 X | | LocA+3 Y | | LocA+2 X | | LocA+2 Y | | LocA+1 X | | LocA+1 Y | | LocA X | | LocA Y | |

FIG. 22

METHODS, SYSTEMS AND APPARATUS TO REDUCE MEMORY LATENCY WHEN FETCHING PIXEL KERNELS

RELATED APPLICATION

This patent arises from an application claiming the benefit of U.S. Provisional Patent Application Ser. No. 62/508,886, which was filed on May 19, 2017. U.S. Provisional Patent Application Ser. No. 62/508,886 is hereby incorporated herein by reference in its entirety. Priority to U.S. Provisional Patent Application Ser. No. 62/508,886 is hereby claimed.

FIELD OF THE DISCLOSURE

This disclosure relates generally to image processing, and, more particularly, to methods, systems and apparatus to reduce memory latency when fetching pixel kernels.

BACKGROUND

In recent years, a demand for image processing capabilities has moved beyond high-power dedicated desktop hardware and has become an expectation for personal and/or otherwise mobile devices. Mobile devices typically include processing capabilities that are limited by size constraints, temperature management constraints, and/or supply power constraints.

BRIEF DESCRIPTION OF THE DRAWINGS

FIG. 5 depicts schematic illustrations of example block organizations used by the example PFBC of FIG. 1 and/or the example prefetch engine of FIG. 2 to read data from cache memory.

FIG. 6 depicts an example table describing example signals associated with the PFBC of FIG. 1.

FIG. 8 depicts another example table describing example signals associated with the PFBC of FIG. 1.

FIG. 10 depicts an example tag to map pixel coordinates to cached data based on Morton order set organization and a pixel size of 2 bytes (2B).

FIG. 11 depicts an example tag to map pixel coordinates to cached data based on Morton order set organization and a pixel size of 1 byte (1B).

FIG. 12 depicts an example tag to map pixel coordinates to cached data based on column-major order set organization and a pixel size of 2 bytes (2B).

FIG. 13 depicts an example tag to map pixel coordinates to cached data based on column-major order set organization and a pixel size of 1 byte (1B).

FIG. 20 depicts an example memory organization of meshpoints in FP32 format.

FIG. 21 depicts an example memory organization of meshpoints in 16-bit format.

FIG. 22 depicts an example memory organization of pre-expanded meshpoints.

The figures are not to scale. In general, the same reference numbers will be used throughout the drawing(s) and accompanying written description to refer to the same or like parts.

DETAILED DESCRIPTION

Figure 1:
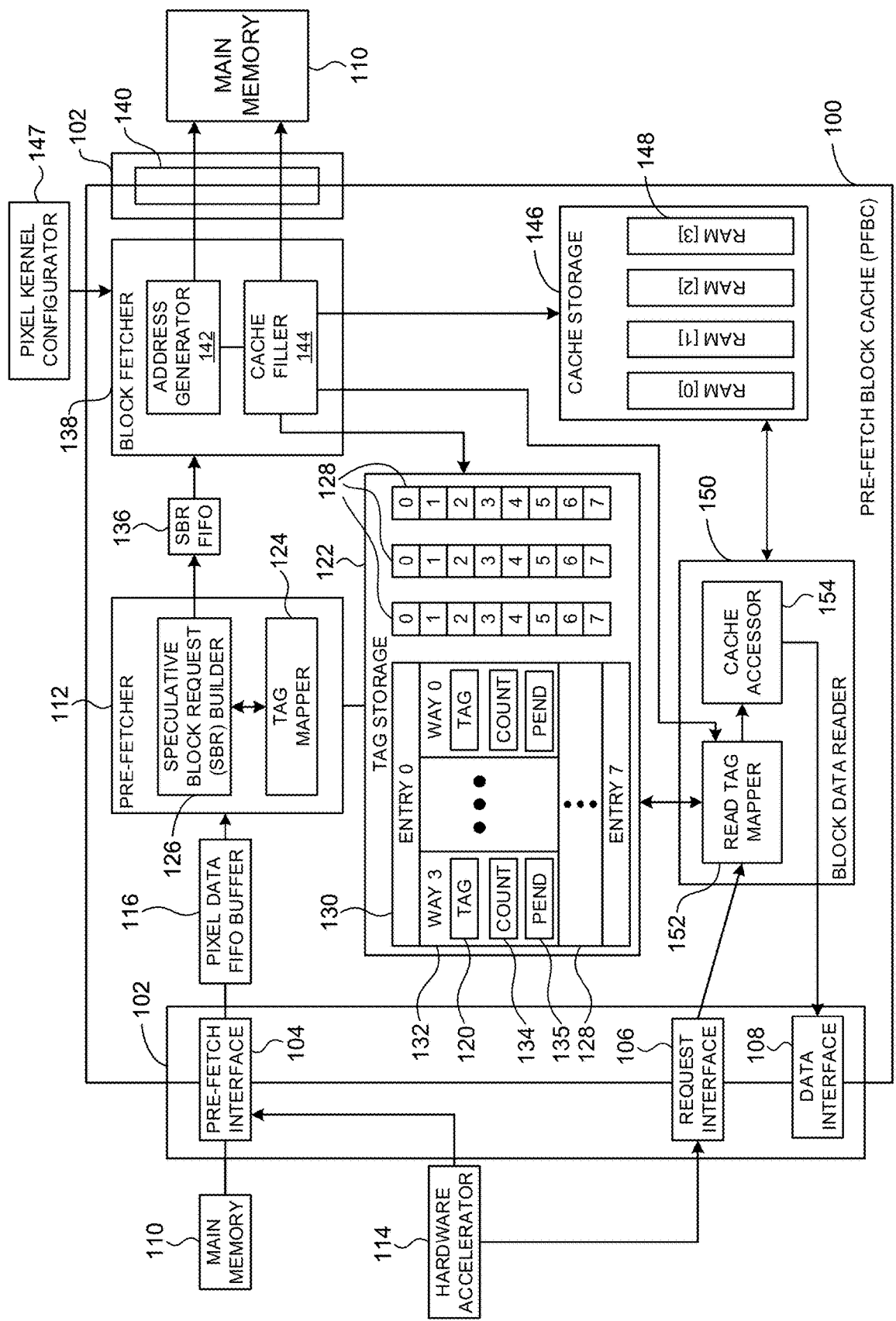
FIG. 1 is a schematic illustration of an example pre-fetch block cache (PFBC) to implement the examples disclosed herein.

Typical computing systems, including personal and/or otherwise mobile devices, employ advanced image processing or computer vision algorithms to automate tasks that human visual systems can perform. Computer vision tasks include acquiring, processing, analyzing, and understanding digital images, which facilitates, in part, extraction of dimensional data from the digital images to produce numerical and/or symbolic information. Computer vision algorithms can use the numerical and/or symbolic information to make decisions and/or otherwise perform operations associated with three-dimensional (3-D) pose estimation, event detection, object recognition, video tracking, etc., among others.

To process digital images, computing hardware fetches image data associated with pixels in the digital images to fill a pixel kernel. Pixels can represent the smallest component of a digital image or the smallest controllable element of a display (e.g., a liquid crystal display (LCD), an organic light-emitting diode (OLED) display, etc.). As used herein, the term "pixel kernel" refers to a composition of two or more pixels (e.g., a pixel matrix) including a pixel at given coordinates in an input image (e.g., a camera image, a video frame, etc.) and a quantity of pixels around the pixel required for processing the pixel. Pixel kernels can represent a matrix of pixels (e.g., a 1×1 pixel kernel, a 2×2 pixel kernel, a 1×4 pixel kernel, etc.). The quantity of pixels wide and the quantity of pixels high of the pixel kernel is known as the support of the kernel. In some instances, the image data includes pixel data that is associated with one or more pixels including pixel coordinates. Pixel coordinates can identify a physical point or a position of a pixel in an image (e.g., a raster image) or a component of a display.

In prior implementations, computing hardware stored some neighboring pixels of an image in memory with spatial locality while storing other neighboring pixels without spatial locality. Spatial locality refers to a concept where data elements that are stored together will most likely be accessed together. In instances where neighboring pixels in the image are stored with spatial locality, computing hardware could reconstruct a pixel kernel from a single memory read. In instances where neighboring pixels in the image are not stored with spatial locality (e.g., a first pixel is at a first address line of a memory and a second pixel is at a second address line of the memory), computing hardware needs to perform multiple memory reads to reconstruct the pixel kernel for processing, which causes an increase in memory latency of the computing hardware.

Examples disclosed herein reduce memory latency and improve pixel data transfer between memory devices and pixel processing hardware (e.g., image processing hardware, computer vision hardware, etc.). Examples disclosed herein pre-fetch data from main memory (e.g., dynamic RAM (DRAM), connection matrix (CMX) memory, etc.), process the data into blocks of image data in accordance with spatial locality, and store the image data blocks or data blocks into cache memory. Examples disclosed herein operate on blocks of pixels or pixel kernels as a basic unit to fetch from the cache memory.

In some disclosed examples, a pre-fetch block cache (PFBC) (e.g., an apparatus) pre-fetches data requested by a computing system from main memory of the computing system. In some disclosed examples, the requested data is image data (e.g., pixel data) at requested pixel coordinates corresponding to pixels of an input image being processed by the computing system. In some disclosed examples, the PFBC maps the requested pixel coordinates to image blocks and stores the image blocks in cache memory included in the PFBC. In some disclosed examples, the PFBC maps the pixel coordinates to the image blocks by generating tags based on the pixel coordinates and storing the tags in tag memory included in the PFBC. In some disclosed examples, the PFBC is configured to speculatively request a quantity of other image blocks to the left and/or the right of a requested image block. Alternatively, the example PFBC can be configured to speculatively request a quantity of other image blocks above and/or below a requested image block.

When the example PFBC determines that a requested image block is cached in cache memory, the PFBC organizes the image blocks associated with the requested data including the requested image block into a burst transfer (e.g., a single beat burst transfer) and transfers the requested image blocks to external hardware for processing. In some disclosed examples, the transferred image blocks include image data associated with the requested data by the computing system and/or the image data associated with the speculatively requested blocks.

In some disclosed examples, the PFBC can be used to remove types of distortion in source images, source video frames, etc. For example, source images and/or source video frames may sometimes include distortion that is undesirable. Prior distortion removal approaches typically utilize dynamic random access memory (DRAM) in a manner that includes substantial latency. To remove types of distortion, such as fisheye distortion, examples disclosed herein include transform algorithms, instructions, and/or hardware including the example PFBC to reduce latency observed in prior approaches.

FIG. 1 is a schematic illustration of an example pre-fetch block cache (PFBC) 100 to reduce and/or otherwise eliminate pixel transfer latency during image processing operations, computer vision operations, etc. The example PFBC 100 of FIG. 1 includes an example memory interface 102 to facilitate transfers of data between the PFBC 100 and computing system hardware (e.g., a memory controller, a central processing unit (CPU), a hardware accelerator, etc.). In the illustrated example of FIG. 1, the memory interface 102 is a 128-bit memory (bus) interface. For example, the memory interface 102 of the PFBC 100 may be a 128-bit AXI master interface, a 128-bit AMC read I/F interface, etc. Alternatively, the example PFBC 100 may have an interface associated with any number of bits (e.g., a 64-bit memory interface, a 256-bit memory interface, etc.).

In the illustrated example of FIG. 1, the memory interface 102 includes an example pre-fetch interface 104, an example request interface 106, and an example data interface 108. In the illustrated example of FIG. 1, the memory interface 102 includes the pre-fetch interface 104 to make read requests (e.g., burst read requests) from example main memory 110 of a computing system. In the illustrated example of FIG. 1, the main memory 110 is DRAM. Alternatively, the main memory 110 may be CMX memory or any other type of non-volatile or volatile memory. The example pre-fetch interface 104 of FIG. 1 queries, receives, and/or otherwise retrieves data (e.g., image data, pixel data, pixel coordinates, etc.) from the main memory 110 and transfers the retrieved data to an example pre-fetcher 112. In the illustrated example of FIG. 1, the pre-fetch interface 104 obtains pixel coordinates from the main memory 110. Alternatively, the example pre-fetch interface 104 may obtain other information from the main memory 110 associated with an input image.

In the illustrated example of FIG. 1, the pre-fetch interface 104 determines image data, including pixel coordinates, to be obtained from the main memory 110 based on a command or instruction from an example hardware accelerator 114. For example, a controller or a control block of the hardware accelerator 114 directs the pre-fetch interface 104 to obtain data from the main memory 110. In the illustrated example of FIG. 1, the hardware accelerator 114 is an image processing hardware accelerator. Alternatively, the example hardware accelerator 114 may be a 3-D accelerator, a cryptographic accelerator, etc. Alternatively, the example hardware accelerator 114 may be included as part of a general-purpose central processing unit (CPU) or in a separate unit such as a graphics processing unit (GPU).

In the illustrated example of FIG. 1, the hardware accelerator 114 identifies and/or otherwise determines pixel coordinates of one or more pixels associated with an input image to be pre-fetched by the pre-fetch interface 104. For example, the hardware accelerator 114 may transmit pixel coordinates to the pre-fetch interface 104 to direct the pre-fetch interface 104 to retrieve image blocks associated with the pixel coordinates prior to the hardware accelerator 114 transmitting the pixel coordinates to the data interface 108 to instruct the data interface 108 to obtain the image blocks retrieved by the pre-fetch interface 104. For example, the hardware accelerator 114 may identify pixel coordinates of a pixel and direct or instruct the pre-fetch interface 104 to query the main memory 110 for the pixel coordinates. In response to the main memory 110 receiving the query, the main memory 110 transmits the pixel coordinates to the pre-fetch interface 104 to initialize retrieving image blocks associated with the pixel coordinates.

In some examples, the hardware accelerator 114 of FIG. 1 ensures that a request for pixel coordinates on the request interface 106 does not occur prior to the request being made by the pre-fetch interface 104. For example, an ordering of the pixel coordinates on the request interface 106 should match the order on the pre-fetch interface 104. In some examples, the request interface 106 includes a FIFO buffer to buffer pixel coordinates received at the request interface 106. In such examples, the pixel coordinates are pushed into the FIFO buffer at substantially the same time as the same pixel coordinates are accepted by the pre-fetch interface 104. In such examples, the request interface 106 may size the FIFO buffer size to match or exceed a typical, or in some cases a worst case, latency seen on the memory interface 102 or from memory (e.g., DRAM) included in the PFBC 100.

In some examples, the hardware accelerator 114 of FIG. 1 generates pixel coordinates that are outside of an input image. For example, the hardware accelerator 114 may instruct the pre-fetch interface 104 and/or the request interface 106 to provide access to negative pixel coordinates. In such examples, the pre-fetch interface 104 and/or the request interface 106 clamps the non-supported requests to zero and/or otherwise drops the requests. For example, the PFBC 100 may only support positive (unsigned) input pixel coordinates. Alternatively, the PFBC 100 may support other types of pixel coordinates.

In the illustrated example of FIG. 1, the pre-fetch interface 104 transmits the obtained pixel coordinates to an example pixel data first in, first out (FIFO) buffer 116 to (temporarily) store pixel coordinate obtained by the pre-fetch interface 104. The pixel data FIFO buffer 116 of FIG. 1 is a hardware shift register. For example, the pixel data FIFO buffer 116 may implement frame buffers. Alternatively, the pixel data FIFO buffer 116 may be a circular buffer or other type of queue structure implemented with hardware or machine readable instructions. The pixel data FIFO buffer 116 of FIG. 1 transmits (e.g., asynchronously transmits) the pixel coordinates on a first in, first out basis to the pre-fetcher 112.

In the illustrated example of FIG. 1, the pre-fetcher 112 generates and stores example tag(s) 120 in example tag storage 122 and/or speculatively fetches image blocks based on pixel coordinates obtained by the pre-fetch interface 104. In the illustrated example of FIG. 1, the tags 120 include block tag fields used to map requested pixel coordinates to stored image block data in the PFBC 100. For example, the tags 120 may correspond to an example tag 1000, 1100, 1200, 1300 depicted in FIGS. 10-13. For example, the block tag fields may correspond to an example block tag field 1002, 1102, 1202, 1302 depicted in FIGS. 10-13. The example pre-fetcher 112 includes an example tag mapper 124 and an example speculative block request (SBR) builder 126. The example pre-fetcher 112 includes the example tag mapper 124 to translate and/or otherwise convert pixel coordinates into the example tags 120 and store the tags 120 in the example tag storage 122. In some examples, the tags 120 include one or more block tag bits and/or one or index fields (e.g., a set index field, a pixel index field, etc.) where each index field includes one or more index bits (e.g., one or more set index bits, one or more pixel index bits, etc.).

In the illustrated example of FIG. 1, the tag storage 122 includes four example tag memories 128. Although four tag memories 128 are depicted in FIG. 1, fewer or more than four tag memories 128 may be used. In FIG. 1, the example tag storage 122 is implemented as registers to facilitate the ease of multiple, substantially parallel access. Alternatively, the tag storage 122 may be CMX, DRAM, etc., or any other type of non-volatile memory or volatile memory. The example pre-fetch interface 104 and/or the example request interface 106 can simultaneously and/or otherwise substantially simultaneously access each of the four tag memories 128 in parallel. The example pre-fetch interface 104 and/or the example request interface 106 can select one of the example tag memories 128 based on the two least significant bits of a set index included in a tag generated based on the requested pixel coordinates. For example, the tag mapper 124 may convert pixel coordinates to a tag including a block set index. The example tag mapper 124 may map the two least significant bits of the block set index to a first one of the tags 120 included in a first one of the tag memories 128.

In the illustrated example of FIG. 1, each of the tag memories 128 includes eight example entries 130 where each entry includes four example sections 132 corresponding to a different way. Each example section 132 includes the respective tag 120, an example count field 134, and an example pending field 135. For example, the count field 134 may correspond to an example count field 1412 depicted in FIG. 14. For example, the pending field 135 may correspond to an example pending field 1414 depicted in FIG. 14. For example, the pending field 135 can be a 1-bit field (e.g., a binary switch field) that has a value of either zero or one. When the pending field 135 is zero, the pending field 135 is disabled, and, when the pending field 135 is one, the pending field 135 is enabled. Additionally or alternatively, the example section 132 may include fewer or more tags, fields, etc. For example, the section 132 may include an example validation field corresponding to an example validation field 1416 depicted in FIG. 14. The example tag storage 122 includes 32 of the entries 130, where each respective entry 130 includes four of the tags 120. Alternatively, each of the tag memories 128 may include fewer or more than eight entries 130. Alternatively, each entry 130 may include fewer or more than four sections 132.

As used herein, a way (as in N-way), is the number of different ways (e.g., memory orientations, memory configurations, mapping orders, etc.) a given block may be cached. For example, multiple blocks (e.g., from the main memory 110) will map to the same block location within a set, if the cache is N-way set associative then up to N blocks mapping to the same block location within a set can be cached. As used herein, a block (e.g., an image block) is a two-dimensional array of pixels. As used herein, a set is a two-dimensional array of blocks. As used herein, a pixel index is the least significant bits of X and Y of a pixel coordinate set which together yield an index to the location of that pixel within a block. As used herein, a block location index, or a set index, is a specific mapping of certain bits from a pixel coordinate set that yields an index to the location at which the image block containing that pixel resides in a set. As used herein, a block tag or a tag is the most significant bits of X and Y of a pixel coordinate set that uniquely identify a block in relation to other blocks that might be cachable at the same block location within a set.

In the illustrated example of FIG. 1, in response to the pre-fetch interface 104 receiving pixel coordinates, the tag mapper 124 searches each of the tag memories 128 in parallel to produce an initial single clock cycle decision (e.g., a single clock cycle hit decision, a single clock cycle miss decision, etc.) for up to N blocks to generate a pixel kernel of N blocks (e.g., where N is 4, 8, 16, etc.) that may be required to process the pixel at the pixel coordinates. In some examples, the hit decision corresponds to image data associated with the pixel coordinates having been already cached by the PFBC 100. In some examples, the miss decision corresponds to image data associated with the pixel coordinates not already been cached by the PFBC 100.

In some examples, the PFBC 100 implements a safety mechanism to ensure that one or more image blocks corresponding to a request made on the pre-fetch interface 104 or the request interface 106 will be cached during subsequent clock cycles of the PFBC 100 and will not be replaced until the corresponding request has been fulfilled on the data interface 108. In such examples, the tag mapper 124 and/or an example read tag mapper 152 use the count field 134 to implement the safety mechanism. For example, the tag mapper 124 increments the count field 134 for a corresponding tag 120 each time image data associated with the tag 120 is requested at the pre-fetch interface 104. In other examples, the read tag mapper 152 decrements the count field 134 for the corresponding tag 120 each time image data associated with the tag 120 is requested at the request interface 106. As a result, image data stored in one of an example cache memory 148 may be replaced if, and only if the corresponding count field 134 for the stored image data is zero and the pending field 135 for the stored image data is zero (e.g., the stored image data is not pending to be processed).

In some examples, when the count field 134 is non-zero, then some requests that have been accepted on the pre-fetch interface 104 have not yet been fulfilled by the data interface 108 so the corresponding image block data stored in an example cache storage 146 must be maintained. For example, the corresponding image block cannot be discarded, overwritten, replaced, etc., until the count field 134 becomes zero. In some examples, when the count field 134 is zero but the pending field 135 is set (e.g., set to 1), then the image block data has been speculatively pre-fetched by the SBR builder 126. In such examples, the image block data may never be requested but was speculatively fetched to improve an efficiency of fulfilling a future request that needed the speculatively fetched image block data.

In some examples, if the pending field 135 included in one of the entries 130 is set and the corresponding count field 134 is zero, the corresponding entry 130 was speculatively fetched but is currently being cached in the cache storage 146. For example, the speculatively fetched entry 130 is not a candidate for replacement until the image block data associated with the entry 130 is cached. In response to the image block data being cached in the cache storage 146, an example cache filler 144 clears the pending field 135 and sets a validation field (e.g., set to 1) included in the entry 130. In response to clearing the pending field 135 and setting the validation field, the entry 130 becomes a candidate for replacement.

The example SBR builder 126 of FIG. 1 generates one or more SBRs following a miss decision. The example SBR builder 126 generates one or more SBRs to allow longer burst transactions to be made on the memory interface 102 and/or to begin making accesses for image blocks that will be needed in advance for processing by the computing system. The example SBR builder 126 generates and transmits SBRs to an example SBR FIFO 136. The example SBR FIFO 136 of FIG. 1 transmits the SBR requests from the SBR builder 126 on a first in, first out basis to an example block fetcher 138. The example block fetcher 138 of FIG. 1 retrieves and/or otherwise obtains blocks of image data from the main memory 110 via an example block fetcher interface 140 included in the memory interface 102 based on pixel coordinates received by the pre-fetch interface 104. In some examples, the block fetcher 138 obtains image blocks corresponding to the pixel coordinates received by the pre-fetch interface 104 via the block fetcher interface 140. In some examples, the block fetcher 138 obtains an image block to a left side or a right side (e.g., an adjacent image block) of the image block corresponding to the pixel coordinates via the block fetcher interface 140. Alternatively, the example block fetcher 138 may be configured to obtain an image block above or below the image block corresponding to the pixel coordinates via the block fetcher interface 140.

In the illustrated example of FIG. 1, the block fetcher 138 includes an example address generator 142 to generate an address (e.g., an address line) of the main memory 110 corresponding to a location of an image block of interest in the main memory 110. For example, the address generator 142 may determine that an image block corresponding to pixel coordinates of a requested pixel received by the pre-fetch interface 104 is located at an address of the main memory 110. In such examples, the address generator 142 may generate the address and instruct the block fetcher interface 140 to retrieve the image block at the generated address from the main memory 110.

In the illustrated example of FIG. 1, the block fetcher 138 includes the example cache filler 144 to retrieve and/or otherwise obtain an image block from the main memory 110 requested by the block fetcher interface 140 at an address generated by the address generator 142. In response to receiving the requested image block, the example cache filler 144 stores the image block in the example cache storage 146. For example, the cache filler 144 may store the image block in one of the cache memories (e.g., RAM[0], RAM[1], RAM[2], RAM[3]) 148 included in the cache storage 146. Alternatively, the cache storage 146 may include fewer or more than four cache memories 148.

In some examples, the cache filler 144 receives blocks from the main memory 110 in the same order in which the image blocks are requested by the SBR builder 126. For example, a first and last line of data for each block may be received in the same order in which the image blocks are requested. In some examples, the cache filler 144 stores the retrieved data in the cache storage 146 based on the pixel coordinates of the first block of the request and the beat of the read data. For example, the cache filler 144 may increment the X-coordinate of the image block by one with each beat of each burst. At the start of each burst, the X-coordinate of the image block resets to that of the first block of the request as the Y-coordinate of all blocks of the request is the same.

In some examples, the cache filler 144 writes the image block data in the cache storage 146 based on a generated SBR by the SBR builder 126. For example, the burst beat count may be used to index the SBR and read the way into which block corresponding to the current beat is written. In some examples, the cache filler 144 writes the image block data retrieved from the main memory 110 to the cache storage 146 based on the least significant bits of the set index included in the corresponding tag 120. For example, for a given beat of a burst, the correct cache memory 148 to which the write the image block data is selected by the least significant bits of the set index where the rest of the address is based on the remaining bits of the set index and the way.

In some examples, the cache filler 144 writes only one line of pixels of a block for each beat of a burst. For example, the burst number is used to drive a byte/bit write enable mask for each beat, where eight bursts in total can be used to complete an SBR. In some examples, the enable mask changes only between bursts as the enable mask is constant between beats within the burst. In some examples, the cache filler 144 updates the corresponding tag 120 in the tag storage 122 on the last burst. For example, as the last line of data for each block is received and written to the cache storage 146, the cache filler 144 clears the pending field 135 and sets the validation field of the tag 120.

In some examples, the cache filler 144 updates and/or otherwise notifies an example block data reader 150 that an image block has been stored in the cache storage 146 corresponding to received pixel coordinates by the request interface 106. In some examples, the cache filler 144 updates one of the tags 120 included in the tag storage 122 corresponding to the image block. For example, the cache filler 144 may update the tag 120 to map the tag 120 to a location of the image block in the cache storage 146.

In the illustrated example of FIG. 1, the block fetcher 138 obtains image block data from the main memory 110 based on configuration information received from an example pixel kernel configurator 147. The example pixel kernel configurator 147 transmits configuration information to the block fetcher 138 including a base address to align the block fetcher interface 140 to the memory interface 102 data width in bytes, a line stride in bytes that is a multiple of the memory interface 102 data width, a frame width, a frame height, and a quantity of bytes per pixel. In some examples, when the block fetcher interface 140 is operating in circular buffer mode, the configuration information includes a quantity of address lines to be retrieved and a current address line indicating which line of the circular buffer is currently the top line. In some examples, the quantity of address lines to be retrieved is based on a power of two. In response to receiving the configuration information, the block fetcher 138 can configure the block fetcher interface 140 to retrieve image block data from the main memory based on the configuration information.

In the illustrated example of FIG. 1, the pixel kernel configurator 147 configures the block fetcher 138 with the support of the kernel (e.g., the kernel of the hardware accelerator 114). For example, the pixel kernel configurator 147 may transmit configuration information to the block fetcher 138 including the support of the kernel. In response to receiving the support of the kernel, the block fetcher 138 can configure at least one of the address generator 142 or the cache filler 144 to add the support to the Y-coordinate of the requested pixel received at the pre-fetch interface 104. In some examples, when a pixel with pixel coordinates (X, Y+support) maps to a different block then a block with pixel coordinates (X, Y), then the block fetcher 138 retrieves the different block in addition to the image block that includes the pixel. For example, the support may correspond to the quantity of pixels wide and the quantity of pixels high of the pixel kernel. For example, a first pixel with first pixel coordinates (X, Y+support) may map to a first block of a first pixel kernel compared to a second pixel with second pixel coordinates (X, Y), which maps to a second block of a second pixel kernel.

In the illustrated example of FIG. 1, the cache storage 146 includes four cache memories 148. Alternatively, the example cache storage 146 may include fewer or more than four cache memories 148. The example cache memories 148 are static RAM (SRAM). Alternatively, the example cache memories 148 may be any other type of non-volatile or volatile memory. The example cache memories 148 of FIG. 1 store 8×8 blocks of pixels where each pixel is 2 bytes and, thus, a size of entries (or words) of the cache memories 148 are 128 bytes or 1024 bits (e.g., 128 bytes=8 blocks×8 pixels/block×2 bytes/pixel). Alternatively, the example cache memories 148 may store an entry size of 16×8 pixels where each pixel is 1 byte, or 4×8 blocks of pixels where each pixel is 4 bytes in memory size.

In the illustrated example of FIG. 1, each of the cache memories 148 can store a quarter of the image blocks for each set associated with a requested pixel. Each of the cache memories 148 can be selected based on the least two significant bits of a set index included in the tags 120. Each of the example cache memories 148 has two ports allowing access (e.g., simultaneous access, substantially simultaneous access, etc.) by the block fetcher 138 and the block data reader 150. For example, the block fetcher 138 may use a first one of the ports to write image blocks or image block data to one of the cache memories 148. In such examples, the block fetcher 138 may write to only one of the cache memories 148 at a time (e.g., assuming a bus width of the cache memories 148 is equal to the width of the image blocks, i.e., 16 bytes) and/or only one line of a selected image block will be written at a time. In some examples, if the width of the image blocks is greater than the width of the cache memories 148, then two of the cache memories 148 may be written at a time. In other examples, the block data reader 150 may use a second one of the ports to retrieve image blocks or image block data from one of the cache memories 148. In such examples, the block data reader 150 may read from one to four of the cache memories 148 in parallel and/or otherwise simultaneously.

In the illustrated example of FIG. 1, the block data reader 150 determines if image block data corresponding to pixel coordinates of a requested pixel received by the request interface 106 is stored in the cache storage 146 based on mapping the pixel coordinates to one of the tags 120 included in the tag storage 122. In response to determining that the image block data is stored in the cache storage 146, the block data reader 150 transmits the image block data from the cache storage 146 to the data interface 108.

In the illustrated example of FIG. 1, the request interface 106 is driven by the hardware accelerator 114. In some examples, an arithmetic data path of the hardware accelerator 114 drives the request interface 106. For example, a control block or a controller of the hardware accelerator 114 generates or reads from the main memory 110 a sequence of pixel coordinates to be accessed for processing or transformation by the arithmetic data path of the hardware accelerator 114.

The example block data reader 150 of FIG. 1 includes the example read tag mapper 152 to map pixel coordinates received by the request interface 106 and map the pixel coordinates to the tags 120 included in the tag storage 122. In some examples, the read tag mapper 152 determines that image block data corresponding to received pixel coordinates is not stored in the cache storage 146 based on information included in the tag 120. In such examples, the read tag mapper 152 waits until the image block data is retrieved and stored in the cache storage 146 by the block fetcher 138. In some examples, the read tag mapper 152 does not continuously read the tag storage 122 until the image block data is retrieved. For example, the read tag mapper 152 may pause operations or stall until the cache filler 144 instructs the read tag mapper 152 to wake up and/or otherwise resume reading the tag storage 122 when the cache filler 144 caches a new block.

The example block data reader 150 of FIG. 1 includes the example cache accessor 154 to retrieve and/or otherwise obtain image block data from the cache storage 146 when the read tag mapper 152 determines that the image block data is stored in the cache storage 146. In some examples, the read tag mapper 152 maps pixel coordinates to one of the tags 120 and determines that image block data associated with the pixel coordinates is stored in the cache storage 146 and determines a location of the image block data in one of the cache memories 148. In response to determining the location of the image block data, the cache accessor 154 retrieves the image block data from the cache storage 146 and transmits the image block data to the data interface 108.

In operation, the pre-fetch interface 104 receives pixel coordinates for a pixel associated with an input image. The pre-fetch interface 104 transmits the pixel coordinates to the tag mapper 124 via the pixel data FIFO buffer 116. The tag mapper 124 generates a block tag based on the pixel coordinates and searches each of the tag memories 128 in parallel to determine whether the generated block tag matches one of the tags 120. In some examples, one or more of the tag memories 128 include one or more tags 120 previously generated and stored by the tag mapper 124 in response to previous operations of the pre-fetch interface 104.

In response to one of the tags 120 matching the generated block tag, the tag mapper 124 reads a value stored in the corresponding count field 134 of the tag 120 in the tag storage 122, increments the value, and writes the incremented value back to the count field 134. In response to none of the tags 120 matching the generated block tag, the tag mapper 124 identifies a first one of the sections 132 that is free and/or otherwise available and performs the following: 1) reads a value of the corresponding count field 134, increments the value, and writes the incremented value back to the count field 134 (e.g., increments a count field value of 0 to 1); 2) sets a value of the tag 120 to the block tag; 3) set a validation field included in the section 132 to zero and/or otherwise clear the validation field; and 4) set the pending field 135 included in the section 132 to 1 and/or otherwise enable the pending field.

In the illustrated example of FIG. 1, in response to the tag mapper 124 setting the tag 120 included in the tag storage 122 to the block tag, the SBR builder 126 generates and transmits one or more SBRs to the block fetcher 138 via the SBR FIFO 136. In response to receiving the one or more SBRs, the address generator 142 generates one or more address lines for the cache filler 144 to retrieve from the main memory 110. In response to retrieving the image block data at the one or more address lines via the block fetcher interface 140, the cache filler 144 performs the following: 1) reads a value of the pending field of the section 132 corresponding to the block tag, clears the value, and writes the cleared value back to the pending field; 2) reads a value of the validation field of the section 132 corresponding to the block tag, increments the value and/or otherwise sets the bit value of the validation field, and writes the value back to the validation field; and 3) stores the image block data in one of the cache memories 148 mapped to the block tag.

In operation, the block data reader 150 initiates a search of the tag storage 122 when the request interface 106 receives a request to retrieve image data associated with one or more pixels of an input image. In FIG. 1, the request interface 106 receives pixel coordinates associated with the pixel of interest. In response to receiving the requested pixel coordinates, the read tag mapper 152 generates a block tag based on the pixel coordinates and searches the tag storage 122 for a match to the block tag. For example, the read tag mapper 152 may read one to four of the tag memories 128 in parallel as one to four image blocks may be needed based on the requested pixel coordinates.

In response to one of the tags 120 matching the block tag generated by the read tag mapper 152, the read tag mapper 152 performs the following: 1) reads a value of the count field 134 of a matching one of the tags 120, decrements the value, and writes the decremented value back to the count field 134; and 2) instructs the cache accessor 154 to read one to four of the cache memories 148 in parallel to retrieve the image block data mapped to the matching one of the tags 120. In response to the cache accessor 154 retrieving the image block data from ones of the cache memories 148, the cache accessor 154 transmits the image block data to the data interface 108 for further processing. In response to the one of the tags 120 not matching the block tag generated by the read tag mapper 152, the request interface 106 stalls or does not accept additional requests until the requested image block data is stored in the cache storage 146 and one or more of the tags 120 included in the tag storage 122 is updated with a position of the image block data in the cache storage 146.

While an example manner of implementing the PFBC 100 is illustrated in FIG. 1, one or more of the elements, processes, and/or devices illustrated in FIG. 1 may be combined, divided, re-arranged, omitted, eliminated, and/or implemented in any other way. Further, the example memory interface 102, the example pre-fetch interface 104, the example request interface 106, the example data interface 108, the example pre-fetcher 112, the example pixel data FIFO buffer 116, the example tag storage 122, the example tag mapper 124, the example SBR builder 126, the example SBR FIFO 136, the example block fetcher 138, the example block fetcher interface 140, the example address generator 142, the example cache filler 144, the example cache storage 146, the example block data reader 150, the example read tag mapper 152, the example cache accessor 154 and/or, more generally, the example PFBC 100 of FIG. 1 may be implemented by hardware, software, firmware, and/or any combination of hardware, software, and/or firmware. Thus, for example, any of the example memory interface 102, the example pre-fetch interface 104, the example request interface 106, the example data interface 108, the example pre-fetcher 112, the example pixel data FIFO buffer 116, the example tag storage 122, the example tag mapper 124, the example SBR builder 126, the example SBR FIFO 136, the example block fetcher 138, the example block fetcher interface 140, the example address generator 142, the example cache filler 144, the example cache storage 146, the example block data reader 150, the example read tag mapper 152, the example cache accessor 154, and/or, more generally, the example PFBC 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example memory interface 102, the example pre-fetch interface 104, the example request interface 106, the example data interface 108, the example pre-fetcher 112, the example pixel data FIFO buffer 116, the example tag storage 122, the example tag mapper 124, the example SBR builder 126, the example SBR FIFO 136, the example block fetcher 138, the example block fetcher interface 140, the example address generator 142, the example cache filler 144, the example cache storage 146, the example block data reader 150, the example read tag mapper 152, the example cache accessor 154 is/are hereby expressly defined to include a non-transitory computer readable storage device or storage disk such as a memory, a digital versatile disk (DVD), a compact disk (CD), a Blu-ray disk, etc., including the software and/or firmware. Further still, the example PFBC 100 of FIG. 1 may include one or more elements, processes, and/or devices in addition to, or instead of, those illustrated in FIG. 1, and/or may include more than one of any or all of the illustrated elements, processes, and devices.

Figure 2:
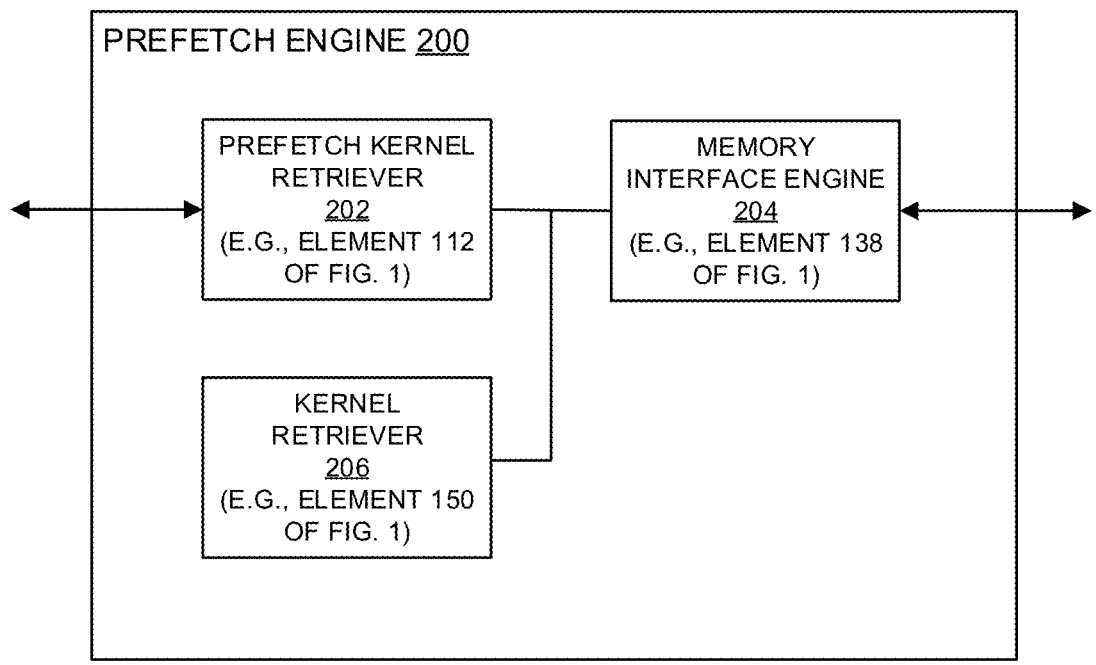
FIG. 2 is a block diagram of an example implementation of an example prefetch engine to implement the example PFBC of FIG. 1.

FIG. 2 is a block diagram of an example implementation of an example prefetch engine 200 to implement the PFBC 100 of FIG. 1. The prefetch engine 200 of FIG. 2 can obtain, process, organize, and store image data corresponding to pixel coordinates of one or more pixels of an input image prior to being requested for a computing task such as image processing, computer vision, etc. The prefetch engine 200 of FIG. 2 includes an example prefetch kernel retriever 202, an example memory interface engine 204, and an example kernel retriever 206.

In the illustrated example of FIG. 2, the prefetch engine 200 includes the prefetch kernel retriever 202 to obtain image data corresponding to pixel coordinates prior to the image data being requested by the kernel retriever 206. In the illustrated example of FIG. 2, the prefetch kernel retriever 202 implements a means for generating block tags based on pixel coordinates and implements a means for retrieving image blocks based on the block tags. The prefetch kernel retriever 202 can correspond to the pre-fetcher 112 of FIG. 1. For example, the prefetch kernel retriever 202 can implement one or more functions up to at least an entirety of the functions described above in connection with the pre-fetcher 112 of FIG. 1. In some examples, the prefetch kernel retriever 202 determines if a request to obtain image data has been accepted by the prefetch engine 200. If not, the prefetch kernel retriever 202 continues to monitor for one or more requests. In response to detecting a request, the prefetch kernel retriever 202 determines corresponding information associated with the request. Corresponding information includes, but is not limited to, pixel coordinates, horizontal support, vertical support, and/or Morton order status information. As used herein, Morton order refers to a mapping of an N-dimensional space onto a linear list of numbers. For example, when applied to coordinates, the Morton order defines a space-filling curve which is Z-shaped to map multidimensional data to one dimension while preserving locality of the data points.

In some examples, the prefetch kernel retriever 202 maps pixel coordinates to block mapping based on the support of the pixel kernel. For example, received pixel coordinates may correspond to a top-left corner of a pixel kernel as described below in connection with FIGS. 3 and/or 4. In such examples, the prefetch kernel retriever 202 can map the pixel coordinates based on at least one of the input pixel coordinates (X, Y), a horizontal support of W pixels, a vertical support of H pixels, a Morton set organization, and a configuration to enable the prefetch engine 200 to cache 8×8 pixel blocks.

In some examples, the prefetch kernel retriever 202 performs the mapping for all vertices of the pixel kernel based on computations using one or more of the examples of Equations (1)-(4) as described below:

$$\text{Block } 0 = (X >> 3, Y >> 3) \qquad \text{Equation (1)}$$

$$\text{Block } 1 = ((X+W) >> 3, Y >> 3) \qquad \text{Equation (2)}$$

$$\text{Block } 2 = (X >> 3, (Y+H) >> 3) \qquad \text{Equation (3)}$$

$$\text{Block } 3 = ((X+) >> 3, (Y+) >> 3) \qquad \text{Equation (4)}$$

In the illustrated examples of Equations (1)-(4) above, ">>" refers to a right-shift operation. As such, "X>>3" represents shifting an X-coordinate of a pixel to the right by 3 bits. In some examples, the prefetch kernel retriever 202 searches one or more tag memories (e.g., the example tag memories 128 of FIG. 1) to produce single clock cycle hit/miss decisions. The prefetch kernel retriever 202 of FIG. 2 determines whether image data corresponding to pixel coordinates associated with a request has already been stored in cache (e.g., the cache storage 146 of FIG. 1). In response to determining that the image data has already been cached, the example kernel retriever 206 retrieves the image data from cache. In response to determining that the image data has not been cached, the example prefetch kernel retriever 202 generates a tag (e.g., one of the tags 120 of FIG. 1) corresponding to a storage location of the image data in cache and directs the example memory interface engine 204 to retrieve and store the image data in cache at the storage location.

In the illustrated example of FIG. 2, the prefetch engine 200 includes the memory interface engine 204 to access separate RAMs based on the Morton order of the tags, which promotes parallel memory transactions in a more efficient manner and reduces power consumption associated with block access mechanics. In the illustrated example of FIG. 2, the memory interface engine 204 implements a means for retrieving image blocks from a memory and storing the retrieved image blocks in a cache storage. The memory interface engine 204 can correspond to the block fetcher 138 of FIG. 1. For example, the memory interface engine 204 can implement one or more functions up to at least an entirety of the functions described above in connection with the block fetcher 138 of FIG. 1.

In some examples, the memory interface engine 204 obtains image data associated with a request processed by the prefetch kernel retriever 202 and stores the image data in cache (e.g., the cache storage 146 of FIG. 1). In such examples, the memory interface engine 204 alerts the prefetch kernel retriever 202 and/or the kernel retriever 206 that the image data has been stored in cache. For example, the memory interface engine 204 updates one of the tags 120 generated by the prefetch kernel retriever 202 to indicate that the image data associated with the tag 120 is stored in cache. In other examples, the memory interface engine 204 updates and/or otherwise alerts the kernel retriever 206 that the image data to be retrieved by the kernel retriever 206 is available in cache.

In the illustrated example of FIG. 2, the prefetch engine 200 includes the kernel retriever 206 to receive a request to obtain image data associated with pixel coordinates of one or more pixels included in an input image. In the illustrated example of FIG. 2, the kernel retriever 206 implements a means for generating a block tag based on pixel coordinates, searching a tag storage based on the generated block tag, and/or retrieving image blocks based on the search of the tag storage. The kernel retriever 206 can correspond to the block data reader 150 of FIG. 1. For example, the kernel retriever 206 can implement one or more functions up to at least an entirety of the functions described above in connection with the block data reader 150 of FIG. 1.

In some examples, the kernel retriever 206 determines whether the image data is in cache. For example, kernel retriever 206 may map the pixel coordinates to one of the tags 120 of FIG. 1. In response to the kernel retriever 206 determining that the image data is not in cache, the kernel retriever 206 waits until the image data is stored in cache. In response to the kernel retriever 206 determining that the image data is in cache, the kernel retriever 206 retrieves the image data from cache.

The example prefetch kernel retriever means, the example memory interface engine means, and/or the kernel retriever means of the illustrated example of FIG. 1 is/are implemented by software executing on a hardware processor. Additionally or alternatively, the example prefetch kernel retriever means, the example memory interface engine means, and/or the kernel retriever means could instead be implemented by a logic circuit structured to perform logic operations to achieve the desired functionality, such as an ASIC, an FPGA, or the like and/or a combination of such circuits and software and/or firmware.

While an example manner of implementing the prefetch engine 200 is illustrated in FIG. 2, one or more of the elements, processes, and/or devices illustrated in FIG. 2 may be combined, divided, re-arranged, omitted, eliminated, and/or implemented in any other way. Further, the example prefetch kernel retriever 202, the example memory interface engine 204, the example kernel retriever 206, and/or, more generally, the example prefetch engine 200 of FIG. 2 may be implemented by hardware, software, firmware, and/or any combination of hardware, software, and/or firmware. Thus, for example, any of the example prefetch kernel retriever 202, the example memory interface engine 204, the example kernel retriever 206, and/or, more generally, the example prefetch engine 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example prefetch kernel retriever 202, the example memory interface engine 204, and/or the example kernel retriever 206 is/are hereby expressly defined to include a non-transitory computer readable storage device or storage disk such as a memory, a digital versatile disk (DVD), a compact disk (CD), a Blu-ray disk, etc., including the software and/or firmware. Further still, the example prefetch engine 200 of FIG. 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
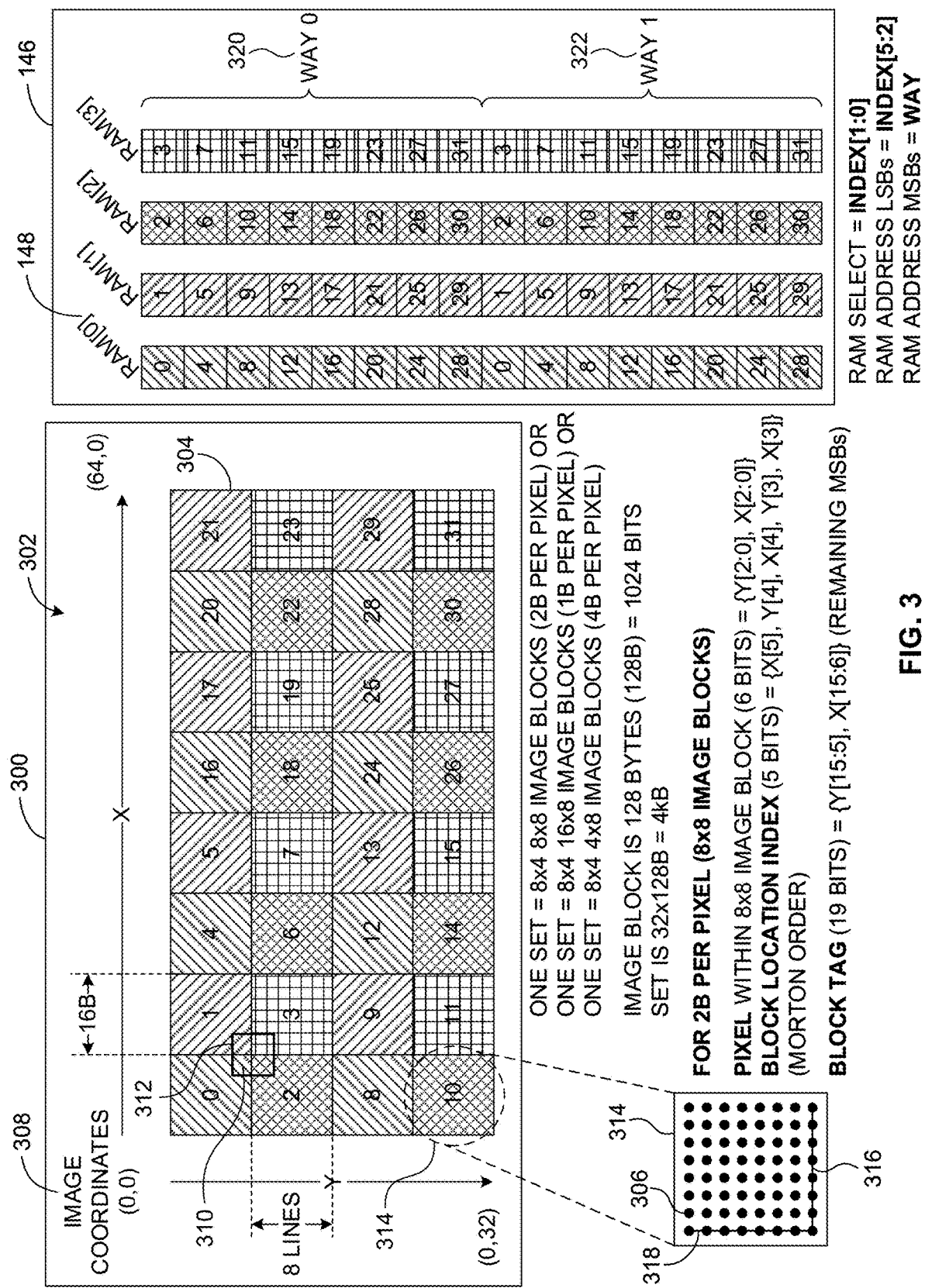
FIG. 3 depicts an example input image mapped to a cache memory based on Morton order.

FIG. 3 depicts an example input image 300 mapped to the cache storage 146 of FIG. 1 based on Morton order. The input image 300 may correspond to a camera image, a video frame, etc. The input image 300 is organized into an example set 302. The set 302 is a two-dimensional array of example blocks (e.g., pixel blocks) 304. In the illustrated example of FIG. 3, each of the blocks 304 represents a two-dimensional array of example pixels 306. The example blocks 304 are image blocks (e.g., image data blocks). In FIG. 3, the example input image 300 includes 2048 pixels (e.g., 2048 pixels=64 pixels wide×32 pixels tall). Alternatively, the input image 300 may have fewer or more than 2048 pixels.

In the illustrated example of FIG. 3, the coordinates of the pixels 306 are respective to the top-left corner of a pixel kernel of a corresponding hardware accelerator (e.g., the hardware accelerator 114 of FIG. 1). For example, each of the pixels 306 has an X-coordinate and a Y-coordinate representative of a position of the pixel 306 in the input image 300. In FIG. 3, the pixels 306 can have an X-image coordinate in a range of 0 to 64 corresponding to a width of the input image 300 of 64 pixels. In FIG. 3, the X-image coordinate is represented by 2 bytes or 16 bits to give a maximum image width of 65,536 bits. In FIG. 3, the pixels 306 can have a Y-image coordinate in a range of 0 to 32 corresponding to a height of the input image 300 of 32 pixels. In FIG. 3, the Y-image coordinate is represented by 2 bytes or 16 bits to give a maximum image height of 65,536 bits. In FIG. 3, an example origin (e.g., a location with image coordinates (X,Y) of (0,0)) 308 of the image coordinates is in the top-left corner of the input image 300.

In the illustrated example of FIG. 3, the pixels 306 of the input image 300 are arranged in the image blocks 304 based on a 2×2 block organization. For example, ones of the pixels 306 included in image blocks 0, 1, 2, and 3 are arranged in a first 2×2 block, ones of the pixels 306 included in image blocks 4, 5, 6, and 7 are arranged in a second 2×2 block, etc. For example, a first pixel 310 with image coordinates of X=8 and Y=8 resides in image block 0. In FIG. 3, the first pixel 310 can be mapped to an example pixel kernel 312 including image block 0 and image blocks 1, 2, and 3 with respect to the image block 0.

In FIG. 3, the set 302 is an 8×4 array that is eight image blocks wide and four image blocks tall. For example, a first block 314 includes eight example rows 316 and eight example columns 318 where each of the rows 316 and columns 318 includes eight pixels 306. Each example pixel 306 has a memory size of two bytes or sixteen bits causing the first block 314 to have a memory size of 128 bytes or 1024 bits (e.g., 128 bytes=(8 pixels/line×8 lines)×(2 bytes/pixel)). Alternatively, each pixel 306 may have any other memory size such as one byte, four bytes, etc.

In the illustrated example of FIG. 3, the input image 300 is organized into 32 of the image blocks 304 where each of the image blocks 304 is an 8×8 block of pixels (e.g., an image block including eight rows 316 and eight columns 318 of eight pixels 306 each) causing the input image 300 to have a size of 4 kilobytes (kB) or 4,096 bits (e.g., 4 kB=(8 image blocks×4 image blocks)×(64 pixels/image block)×(2 bytes/pixel)) when stored in memory.

In the illustrated example of FIG. 3, the PFBC 100 of FIG. 1 and/or the prefetch engine 200 of FIG. 2 generates a pixel index, a block location index, and a block tag based on position(s) of the pixel(s) 306 included in the input image 300. For example, the tags 120 of FIG. 1 can include the pixel index, the block location index, and the block tag. An example block tag is generated based on {Y[15:5], X[15:6]}, where a top eleven bits of the Y-coordinate (e.g., 11 bits=(15-5)+1) and a top ten bits of the X-coordinate (e.g., 10 bits=(15-6)+1) are used to generate the block tag. For example, the tag mapper 124 of FIG. 1 may use a first portion of bits of the Y-coordinate and a second portion of bits of the X-coordinate, where the first and second portions may be different, to generate and assign a unique identifier to a set of pixel coordinates (e.g., an X and Y-coordinate pair). In such examples, the tag mapper 124 can determine whether the unique identifier is included in the tag storage 122. Alternatively, the block tag may be generated based on a different number of X-coordinate bits and/or a different number of Y-coordinate bits.

In an example operation, the tag mapper 124 of FIG. 1 may obtain a position of one of the pixels 306 at coordinate Y=257 (decimal) and X=1020 (decimal). The tag mapper 124 may convert the Y and X-coordinates to binary, where Y=b0000_0001_0000_0001 and X=b0000_0011_1111_1100. The example tag mapper 124 takes the top eleven bits of the Y-coordinate to yield a first binary value of b00000001000 and takes the top ten bits of the X-coordinate to yield a second binary value of b0000001111. The example tag mapper 124 concatenates the first and second binary values to generate a third binary value of b000000010000000001111 or a hex value of h200F. The example tag mapper 124 stores the block tag of h200F in memory (e.g., the tag storage 122 of FIG. 1). The example tag mapper 124 and/or the example read tag mapper 152 uses the block tag of h200F to determine whether one of the blocks 304 that includes the pixel at coordinate Y=257 and X=1020 is present in cache or not.

In the illustrated example of FIG. 3, a block location index is generated based on {X[5], Y[4], X[4], Y[3], X[3]} based on Morton order, where a fifth bit of the X-coordinate (X[5]), a fourth bit of the Y-coordinate (Y[4]), a fourth bit of the X-coordinate (X[4]), a third bit of the Y-coordinate (Y[3]), and a third bit of the X-coordinate (X[3]) are concatenated together to construct the block location index. Alternatively, any other quantity of bits and/or bit positions of the X and/or Y-coordinates may be used to construct the block location index. In the example operation above where the binary value of the Y-coordinate of 257 (decimal) is b0000_0001_0000_0001 and the binary value of the X-coordinate of 1020 (decimal) is b0000_0011_1111_1100, the tag mapper 124 of FIG. 1 generates the corresponding block location index to be b10101. The block location index identifies one of the blocks 304 in the set 302 (e.g., the 8×4 set) that includes the pixel coordinates of interest. For example, the block location index of b10101 corresponds to one of the blocks 304 that includes the pixel 306 at coordinates X=1020 (decimal) and Y=257 (decimal).

In the illustrated example of FIG. 3, a pixel index is generated based on {Y[2:0], X[2:0]}, where a bottom three bits of the Y-coordinate (e.g., 3 bits=(2−0)+1) and a bottom three bits of the X-coordinate (e.g., 3 bits=(2−0)+1) are concatenated together to construct the pixel index. Alternatively, any other quantity of bits and/or bit positions of the X and/or Y-coordinates may be used to construct the pixel index. In the example operation above where the binary value of the Y-coordinate of 257 (decimal) is b0000_0001_0000_0001 and the binary value of the X-co-ordinate of 1020 (decimal) is b0000_0011_1111_1100, the tag mapper 124 can generate the corresponding pixel index to be b001100.

In the illustrated example of FIG. 3, the PFBC 100 of FIG. 1 and/or the prefetch engine 200 of FIG. 2 generates a RAM selection index and a RAM address based on the pixel coordinates. For example, the tag mapper 124 may use the block location index to construct the RAM selection index (RAM SELECT) and the RAM address. The example RAM selection index is based on Index[1:0], where the bottom two bits of the block location index are used to select one of the block data memories 148 of FIG. 1. Alternatively, any other quantity of bits and/or bit positions of the block location index may be used to construct the pixel index. In the example operation above that generated the block location index of b10101, the corresponding RAM selection index is b01. The example RAM selection index of b01 corresponds to a selection of RAM[1], where b00 corresponds to a selection of RAM[0], b10 corresponds to a selection of RAM[2], and b11 corresponds to a selection of RAM[3].

In the illustrated example of FIG. 3, the PFBC 100 and/or the prefetch engine 200 generates the RAM address based on the block location index and an availability of an index in a first example way (WAY 0) 320 or a second example way (WAY 1) 322. The example RAM address is based on Index[5:2], where (1) the most significant bit of the RAM address corresponds to one of the ways 320, 322 of FIG. 3, and (2) the least significant bits of the RAM address are the top three bits of the block location index. Alternatively, any other quantity of bits and/or bit positions of the block location index may be used to construct the RAM address. In FIG. 3, the most significant bit of the RAM address is determined based on the availability of the index described by the top three bits of the block location index.

In the example operation above that generated the block location index of b10101, the tag mapper 148 uses the bottom two bits of the block location index (e.g., b01) to select RAM[1] of the tag memories 148 and the top three bits of the block location index (e.g., b101) to select either index 5 (decimal) of RAM[1] corresponding to b0101 or index 13 (decimal) of RAM[1] corresponding to b1010. For example, the tag mapper 148 determines whether the index 5 of the first way 320 of RAM[1] is available. If available, the tag mapper 148 generates the RAM address to be b0101. If not available, the tag mapper 148 determines whether the index 5 of the second way 322 (e.g., index 13 of the RAM[1]) is available. If available, the tag mapper 148 generates the RAM address to be b1101. If not available, the tag mapper 148 identifies the image block data in either index 5 of the first way 320 or index 5 of the second way 322 to be evicted and/or otherwise removed from RAM[1]. For example, in response to removing the image block data from index 5 of the first way 320, the tag mapper 148 generates the RAM address to be b0101 to store image data associated with the Y-coordinate of 257 (decimal) and the X-coordinate of 1020 (decimal) in index 5 of the first way 320 of RAM[1].

In the illustrated example of FIG. 3, the PFBC 100 and/or the prefetch engine 200 maps one or more of the blocks 304 of the set 302 to the cache storage 146 of FIG. 1 based on Morton order. For example, blocks 0, 1, 2, and 3 are proximate each other in the set 302 but are in different block memories 148. For example, a first plurality of pixels in block 0 is proximate to a second plurality of pixels in block 1, a third plurality of pixels in block 2, and a fourth plurality of pixels in block 3. By storing each of the image blocks 0, 1, 2, and 3 in different block data memories 148, the PFBC 100 and/or the prefetch engine 200 can retrieve each of them in parallel to improve and/or otherwise promote parallel memory transactions in a more efficient manner and reduce power consumption associated with block access mechanics.

Figure 4:
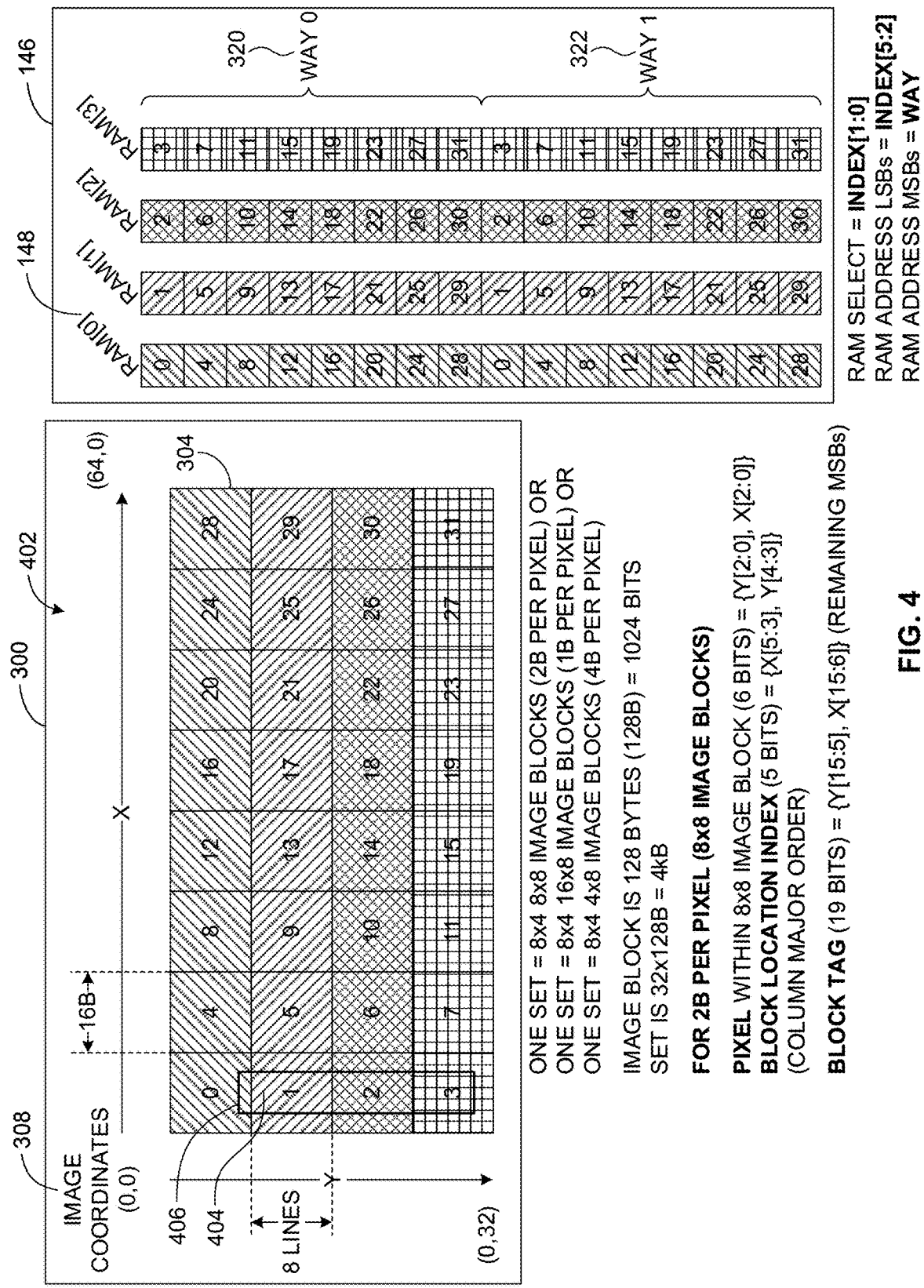
FIG. 4 depicts the input image of FIG. 3 mapped to cache memory based on column-major order.

FIG. 4 depicts the example input image 300 of FIG. 3 mapped to the cache storage 146 of FIG. 1 based on column-major order. The example input image 300 is organized into an example set 402. The set 402 of FIG. 4 is a two-dimensional array of the image blocks 304 of FIG. 3. In FIG. 4, the two-dimensional array is an 8×4 array that is eight image blocks wide and four image blocks tall, where each of the image blocks 304 includes 64 pixels.

In the illustrated example of FIG. 4, the image blocks 304 are arranged based on a column-major organization. For example, image blocks 0, 1, 2, and 3 are arranged in a first 1×4 block, image blocks 4, 5, 6, and 7 are arranged in a second 1×4 block, etc. For example, a first pixel 404 with image coordinates of X=4 and Y=9 resides in image block 1. The example first pixel 404 can be mapped to an example pixel kernel 406 including image block 1 and image blocks 0, 2, and 3 with respect to the image block 1 based on the column-major organization.

In the illustrated example of FIG. 4, the PFBC 100 of FIG. 1 and/or the prefetch engine 200 of FIG. 2 maps the set 402 to the cache storage 146 of FIG. 1 based on column-major order. For example, image blocks 0, 1, 2, and 3 are proximate each other in the set 302 but are in different block memories 148. By storing each of the image blocks 0, 1, 2, and 3 in different block data memories 148, the PFBC 100 and/or the prefetch engine 200 can retrieve each of the image blocks 0, 1, 2, and 3 in parallel to improve pixel data transfer in computing tasks such as image processing, computer vision, etc. Alternatively, the PFBC 100 and/or the prefetch engine 200 may map the input image 300 to the cache storage 146 based on row-major order.

FIG. 5 depicts schematic illustrations of example block organizations used by the PFBC 100 of FIG. 1 and/or the prefetch engine 200 to read data from the cache storage 146 of FIG. 1. In the illustrated example of FIG. 5, a first example block organization 502 is a 2×2 block organization. The first example block organization 502 corresponds to the PFBC 100 and/or the prefetch engine 200 mapping image blocks to the cache storage 146 based on Morton order as described above in connection with FIG. 3. A second example block organization 504 is a 1×4 block organization. The second example block organization 504 corresponds to the PFBC 100 and/or the prefetch engine 200 mapping image blocks to the cache storage 146 based on column-major order as described above in connection with FIG. 4. A third example block organization 506 corresponds to the PFBC 100 and/or the prefetch engine 200 mapping image blocks to the cache storage 146 based on row-major order. Alternatively, other block organizations may be used (e.g., a 4×4 block organization, a 2×8 block organization, an 8×2 block organization, etc.). For example, any other block organization based on a 2×2, 1×4, or 4×1 block organization may be used.

In some examples, the request interface 106 of FIG. 1 and/or the kernel retriever 206 of FIG. 2 receive pixel coordinates and direct the read tag mapper 152 and/or the prefetch kernel retriever 202 to map the pixel coordinates to one or more of the tags 120 included in the tag storage 122 of FIG. 1. For example, the read tag mapper 152 may map the pixel coordinates to image block 0 and subsequently to image blocks 1, 2, and 3 based on a position relativity to image blocks 1, 2, and 3 with respect to image block 0 based on one of the block organizations 502, 504, 506 of FIG. 5.

FIG. 6 depicts an example table 600 describing example signals associated with the pre-fetch interface 104 of FIG. 1. In the table 600, an example request signal 602, an example pixel X-coordinate signal 604, and an example pixel Y-coordinate signal 606 can be received by the pre-fetch interface 104. For example, the pre-fetch interface 104 may receive the request signal 602, the pixel X-coordinate signal 604, and/or the pixel Y-coordinate signal 606 from the hardware accelerator 114 of FIG. 1. In the example table 600 of FIG. 6, an example grant signal 608 can be generated by the pre-fetch interface 104. Alternatively, the pre-fetch interface 104 may receive and/or generate fewer or more signals than depicted in the table 600.

The request signal 602 of FIG. 6 is a 4-bit signal with an input direction (e.g., the pre-fetch interface 104 receives the request signal 602 from the hardware accelerator 114). The request signal 602 represents a block request vector where bit 0 corresponds to block 0, bit 1 to block 1, etc. In FIG. 6, the request signal 602 is active HIGH. In the request signal 602 of FIG. 6, there are X bits per request that indicate how much to increment a count entry included in the tag 120 of FIG. 1 for the requested block(s). The pixel X-coordinate signal 604 of FIG. 6 (COORDS.X) is a 16-bit signal with an input direction that represents an X-coordinate of a requested pixel. The pixel Y-coordinate signal 606 of FIG. 6 (COORDS.Y) is a 16-bit signal with an input direction that represents a Y-coordinate of the requested pixel. The grant signal 608 of FIG. 6 is a 1-bit signal with an output direction (e.g., the pre-fetch interface 104 generates the grant signal 608). In FIG. 6, the grant signal 608 is set to active HIGH when the pre-fetcher 112 of FIG. 1 has accepted the requested pixel coordinates to be processed.

Figure 7:
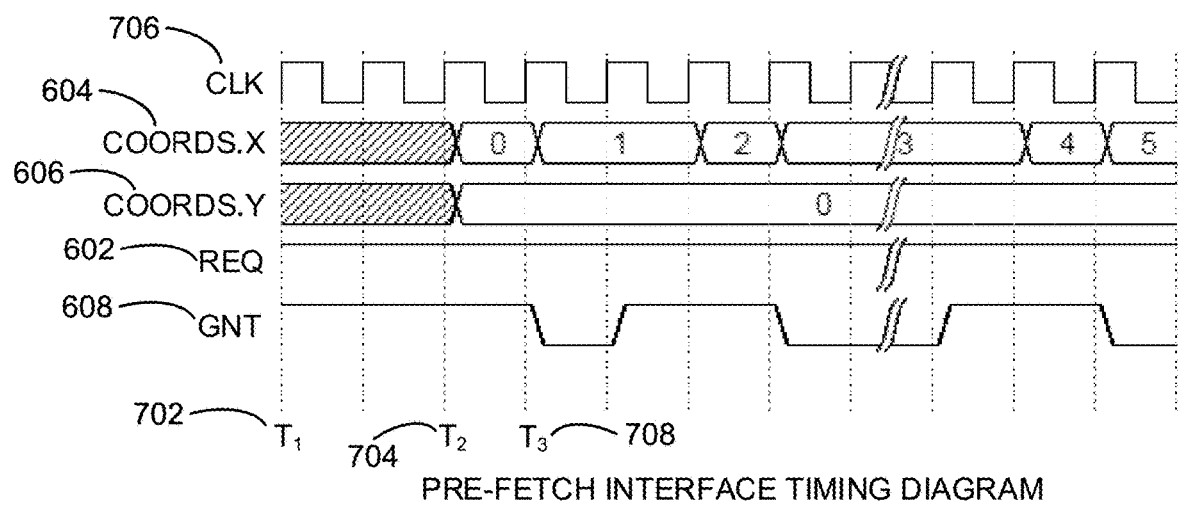
FIG. 7 depicts an example timing diagram corresponding to the PFBC of FIG. 1 in operation.

FIG. 7 depicts an example timing diagram 700 corresponding to the pre-fetch interface 104 of FIG. 1 in operation. At a first example time ($T_1$) 702, the request signal (REQ) 602 of FIG. 6 is asserted HIGH indicating that full integer pixel coordinates are being requested (e.g., the hardware accelerator 114 directs the pre-fetch interface 104 to retrieve image blocks associated with requested pixel coordinates). At the first example time 702, the grant signal (GNT) 608 of FIG. 6 is asserted HIGH indicating that the pre-fetcher 112 of FIG. 1 can accept the request. At a second example time ($T_2$) 704, after three rising-edges of an example clock signal (CLK) 706, the pre-fetch interface 104 is receiving data associated with the pixel X-coordinate signal 604 and the pixel Y-coordinate signal 606. For example, at the second time 704, the pre-fetch interface 104 is receiving data associated with pixel coordinates to be processed by the pre-fetcher 112 of FIG. 1.

In the timing diagram 700 of FIG. 7, at a third example time ($T_3$) 708, the grant signal 608 is asserted LOW indicating that the current request should be held. As depicted in the timing diagram 700, the pre-fetch interface 104 is pipelined such that by default the grant signal 608 is asserted HIGH initially (e.g., the grant signal 608 is HIGH at the first time 702) and asserted LOW for one or more cycles of the clock signal 706 after an initial request while the pre-fetcher 112 handles the request.

FIG. 8 depicts an example table 800 describing example signals associated with the request interface 106 of FIG. 1. In the example table 800 of FIG. 8, an example request signal 802, an example pixel X-coordinate signal 804, and an example pixel Y-coordinate signal 806 can be received by the request interface 106. For example, the request interface 106 may receive the request signal 802, the pixel X-coordinate signal 804, and/or the pixel Y-coordinate signal 806 from the hardware accelerator 114 of FIG. 1. In the example table 800 of FIG. 8, an example grant signal 808, a first example data block signal 810, a second example data block signal 812, a third example data block signal 814, a fourth example data block signal 816, and an example valid signal 818 can be generated by the request interface 106. Alternatively, the request interface 106 may receive and/or generate fewer or more signals than depicted in the table 800.

The request signal 802 of FIG. 8 is a 4-bit signal with an input direction (e.g., the request interface 106 receives the request signal 802). The request signal 802 represents a block request vector where bit 0 corresponds to block 0, bit 1 to block 1, etc. In FIG. 8, the request signal 802 is active HIGH. In the request signal 802 of FIG. 8, there are two bits per request that indicate how much to decrement a count entry included in the tag 120 of FIG. 1 for the requested block(s). The pixel X-coordinate signal 804 of FIG. 8 (COORDS.X) is a 16-bit signal with an input direction that represents an X-coordinate of a requested pixel. The pixel Y-coordinate signal 806 of FIG. 8 (COORDS.Y) is a 16-bit signal with an input direction that represents a Y-coordinate of the requested pixel.

In the table 800 of FIG. 8, the grant signal 808 is a 1-bit signal with an output direction (e.g., the request interface 106 generates the grant signal 808). In FIG. 8, the grant signal 808 is set to active HIGH when the block data reader 150 of FIG. 1 has accepted the requested pixel coordinates to be processed. In FIG. 8, the data block signals 810, 812, 814, 816 are 256-bit signals with an output direction. The first data block signal 810 corresponds to block 0 that includes the requested pixel. For example, block 0 may correspond to block 0 of the first block organization 502, the second block organization 504, or the third block organization 506 of FIG. 5. Similarly, the second data block signal 812 corresponds to block 1, the third data block signal 814 corresponds to block 2, and the fourth data block signal 816 corresponds to block 3. For example, blocks 1-3 may correspond to blocks 103 of the first block organization 502, the second block organization 504, or the third block organization 506 of FIG. 5. In FIG. 8, the valid signal 818 is a 1-bit signal with an output direction that is active HIGH when data for a previously granted request has been determined to be valid.

Figure 9:
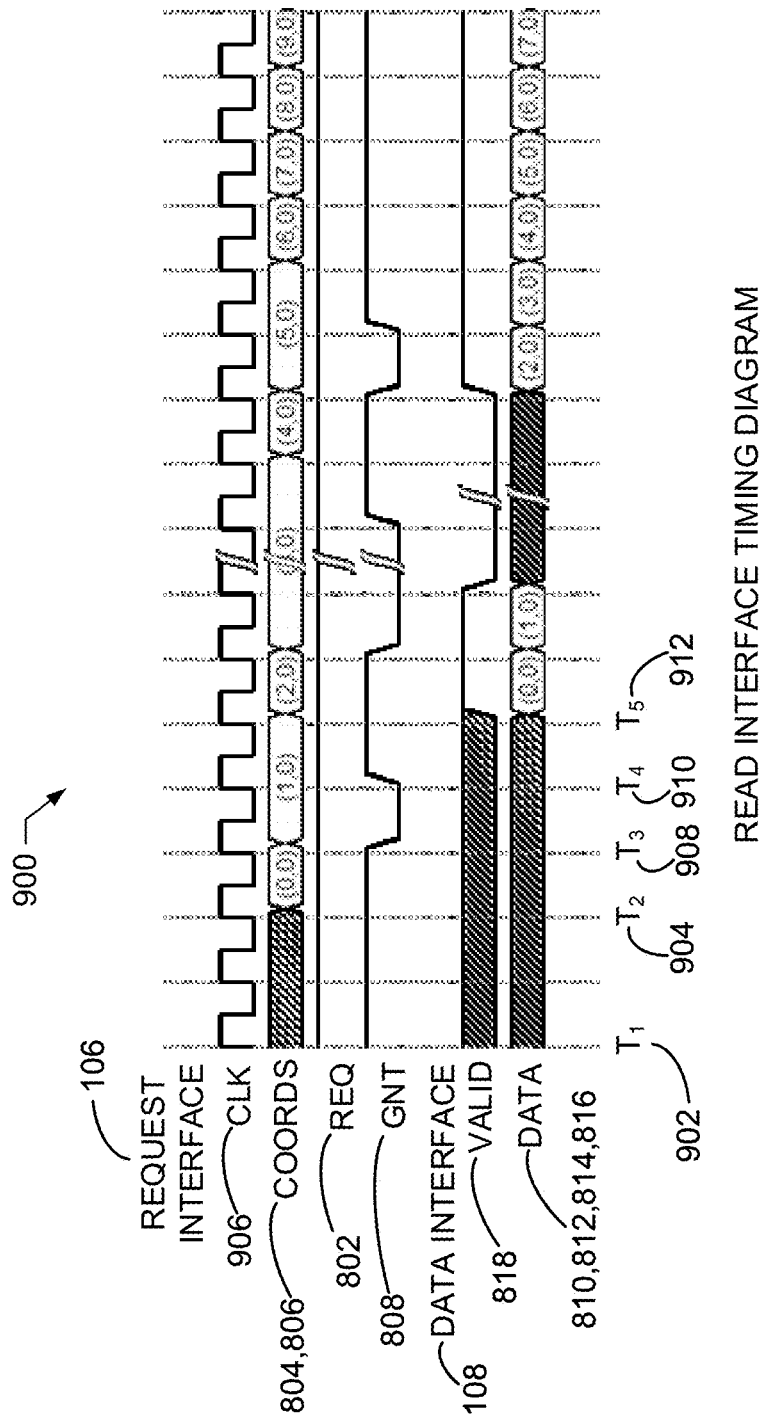
FIG. 9 depicts another example timing diagram corresponding to the PFBC FIG. 1 in operation.

FIG. 9 depicts an example timing diagram 900 corresponding to the request interface 106 of FIG. 1 in operation. At a first example time ($T_1$) 902, the request signal (REQ) 802 of FIG. 8 is asserted HIGH indicating that full integer pixel coordinates are being requested. At the first time 902, the grant signal (GNT) 808 of FIG. 8 is asserted HIGH indicating that the block data reader 150 of FIG. 1 can accept the request.

At a second example time ($T_2$) 904, after three rising-edges of an example clock signal (CLK) 906, the request interface 106 is receiving data associated with the pixel X-coordinate signal 804 and the pixel Y-coordinate signal 806. For example, at the second time 904, the request interface 106 is receiving data associated with pixel coordinates to be processed by the block data reader 150 of FIG. 1. At the second time 904, the request interface 106 interprets the pixel coordinates represented by the pixel X-coordinate signal 804 and the pixel Y-coordinate signal 806 as being mapped to block 0 and blocks 1-3 relative to block 0 as depicted by the block organizations 502, 504, 506 of FIG. 5.

In the timing diagram 900 of FIG. 9, at a third example time ($T_3$) 908, the grant signal 808 is asserted LOW indicating that the current request should be held. As depicted in the timing diagram 900, the request interface 106 is pipe-lined such that by default the grant signal 808 is asserted HIGH initially (e.g., the grant signal 808 is HIGH at the first time 902 and/or when the request interface 106 is idle) and asserted LOW for one or more cycles of the clock signal 906 after an initial request while the block data reader 150 is handling the request.

At the third time 908, the block data reader 150 can convert the pixel coordinates associated with the pixel X-coordinate signal 804 and the pixel Y-coordinate signal 806 into ones of the tags 120 of FIG. 1. The block data reader 150 reads the tag memories 128 of FIG. 1 to determine whether the requested blocks are cached. In response to determining that the requested blocks are cached, the block data reader 150 determines which of the block data memories 148 the requested blocks are stored. In response to determining that one or more of the requested blocks are not cached, the block data reader 150 waits and/or is otherwise stalled until the requested blocks are processed and stored in cache by the pre-fetcher 112 of FIG. 1. In response to the block data reader 150 waiting for the requested blocks to be stored in cache, the grant signal 808 is asserted LOW until the block data reader 150 is available to receive requests from the request interface 106.

In some examples, the minimum latency for a hit is three clock cycles. For example, at the third time 908, when the first coordinate is received on the pixel X-coordinate signal 804 and the pixel Y-coordinate signal 806, the block data reader 150 initiates tag memory look-up in the tag storage 122. If the requested blocks are cached, then, in the following cycle, at a fourth example time ($T_4$) 910, the block data reader 150 initiates reading the block data memories 148. In the following cycle, at a fifth example time ($T_5$) 912, the block data reader 150 causes the cached data to be available on the data interface 108. For example, the block data reader 150 may instruct the cache storage 146 to mux the cached data onto output registers of the data interface 108.

In some examples, the requested block data is presented on registers so that logic (e.g., hardware, computer readable instructions, etc.) reading the data interface 108 can use the requested block data directly on the data path of the logic or pass the requested block data to further muxing logic without timing difficulties or problems. In some examples, the requested block data on the data interface 108 is held from one request received on the request interface 106 to the next so that further reads (from the block data memories 148) are not required if, for example, all the data required for processing the next pixel coordinates (or more) were previously attained during an earlier request.

FIG. 10 depicts an example tag 1000 to map pixel coordinates associated with a pixel included in an input image to cached data in cache memory based on Morton order set organization and a pixel size of 2 bytes (2B). For example, the tag 1000 of FIG. 10 is based on Morton order set organization, where a 2×2 array of blocks may be read on the request interface 106, where each block is 8×8 pixels, and each pixel is 2 bytes in memory size.

The tag 1000 of FIG. 10 includes an example block tag 1002, an example set index 1004, and an example pixel index 1006. The block tag 1002 of FIG. 10 is 21 bits in memory size based on the eleven most significant bits of the Y-coordinate and the ten most significant bits of the X-coordinate of a requested pixel. The set index 1004 of FIG. 10 is five bits in memory size and based on a concatenation of a fifth bit of the X-coordinate, a fourth bit of the Y- and X-coordinates, and a third bit of the Y- and X-coordinates.

The pixel index 1006 of FIG. 10 is six bits in memory size and based on the three least significant bits of the Y- and X-coordinates.

FIG. 11 depicts an example tag 1100 to map pixel coordinates associated with a pixel included in an input image to cached data in cache memory based on Morton order set organization and a pixel size of 1 byte (1B). For example, the tag 1100 of FIG. 11 is based on Morton order set organization, where a 2×2 array of blocks may be read on the request interface 106, where each block is 16×8 pixels, and each pixel is 1 byte in memory size.

The tag 1100 of FIG. 11 includes an example block tag 1102, an example set index 1104, and an example pixel index 1106. The block tag 1102 of FIG. 11 is 20 bits in memory size based on the eleven most significant bits of the Y-coordinate and the nine most significant bits of the X-coordinate of a requested pixel. The set index 1104 of FIG. 11 is five bits in memory size and based on a concatenation of a sixth bit of the X-coordinate, a fourth bit of the Y-coordinate, a fifth bit of the X-coordinate, a third bit of the Y-coordinate, and a fourth bit of the X-coordinate. The pixel index 1106 of FIG. 11 is seven bits in memory size and based on the three least significant bits of the Y-coordinate and the four least significant bits of the X-coordinate.

Figures 12, 13:
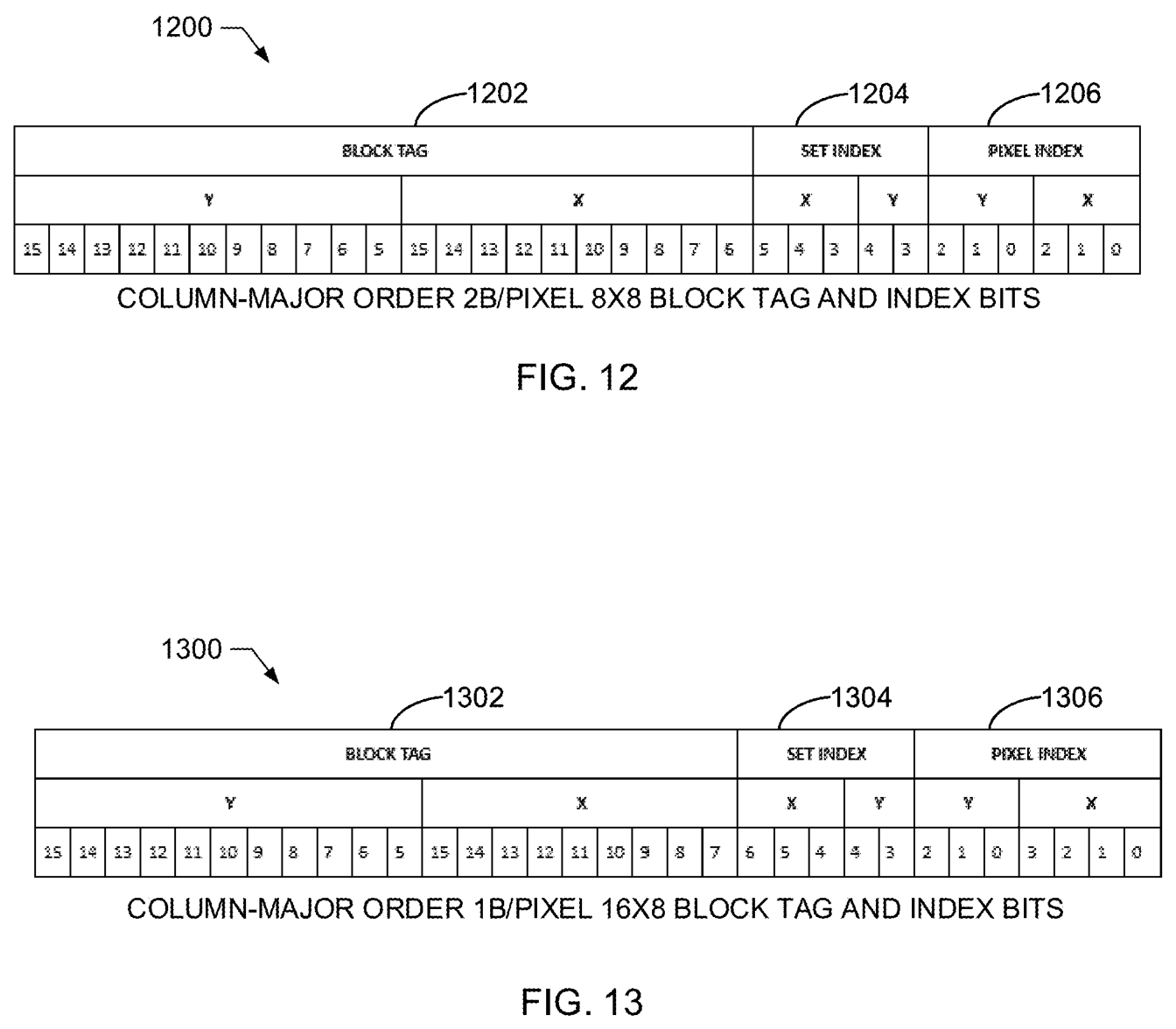

FIG. 12 depicts an example tag 1200 to map pixel coordinates associated with a pixel included in an input image to cached data in cache memory based on column-major order set organization and a pixel size of 2 bytes (2B). For example, the tag 1200 of FIG. 12 is based on column-major order set organization, where a 1×4 array of blocks may be read on the request interface 106, where each block is 8×8 pixels, and each pixel is 2 bytes in memory size.

The tag 1200 of FIG. 12 includes an example block tag 1202, an example set index 1204, and an example pixel index 1206. The block tag 1202 of FIG. 12 is 21 bits in memory size based on the eleven most significant bits of the Y-coordinate and the ten most significant bits of the X-coordinate of a requested pixel. The set index 1204 of FIG. 12 is five bits in memory size and based on a concatenation of a fifth, fourth, and a third bit of the X-coordinate and a fourth and third bit of the Y-coordinate. The pixel index 1206 of FIG. 12 is six bits in memory size and based on the three least significant bits of the Y- and X-coordinates.

FIG. 13 depicts an example tag 1300 to map pixel coordinates associated with a pixel included in an input image to cached data in cache memory based on column-major order set organization and a pixel size of 1 byte (1B). For example, the tag 1300 of FIG. 13 is based on column-major order set organization, where a 1×4 array of blocks may be read on the request interface 106, where each block is 16×8 pixels, and each pixel is 1 byte in memory size.

The tag 1300 of FIG. 13 includes an example block tag 1302, an example set index 1304, and an example pixel index 1306. The block tag 1302 of FIG. 13 is 20 bits in memory size based on the eleven most significant bits of the Y-coordinate and the nine most significant bits of the X-coordinate of a requested pixel. The set index 1304 of FIG. 13 is five bits in memory size and based on a concatenation of a sixth, fifth, and fourth bit of the X-coordinate and a fourth and third bit of the Y-coordinate. The pixel index 1306 of FIG. 13 is seven bits in memory size and based on the three least significant bits of the Y-coordinate and the four least significant bits of the X-coordinate.

Figure 14:
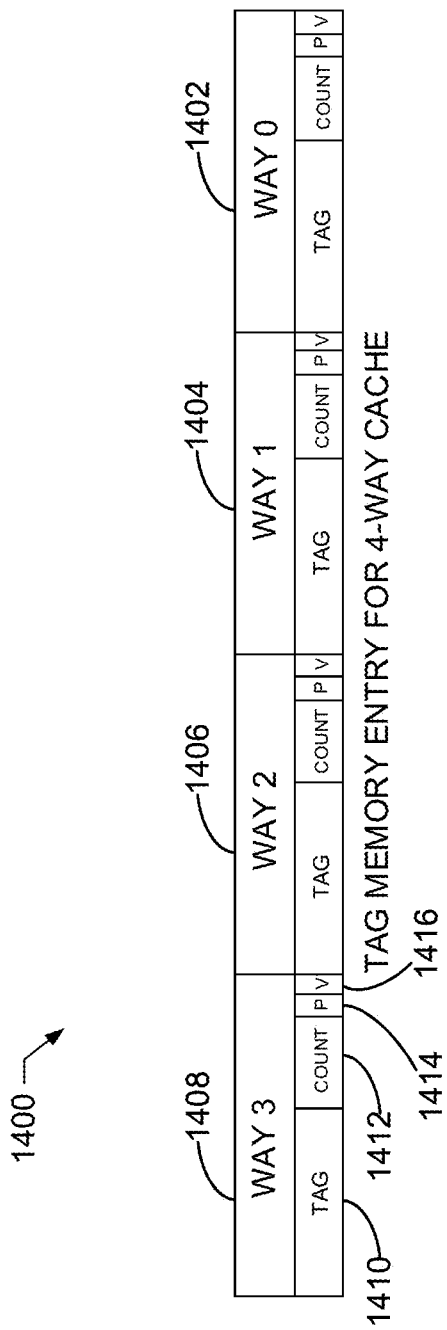
FIG. 14 depicts an example tag memory entry for an example 4-way cache.

FIG. 14 depicts an example tag memory entry 1400 for a 4-way cache. For example, the tag memory entry 1400 can correspond to the tag memory entries 120 of FIG. 1. The tag memory entry 1400 of FIG. 14 includes a first example way index (WAY 0) 1402, a second example way index (WAY 1) 1404, a third example way index (WAY 2) 1406, and a fourth example way index (WAY 3) 1408. Each of the way indices 1402, 1404, 1406, 1408 includes an example tag field 1410, an example count field 1412, an example pending field (P) 1414, and an example validation field (V) 1416.

In the illustrated example of FIG. 14, the tag field 1410 is the tag of the image block cached at the corresponding way. The tag field 1410 of FIG. 14 is 19 bits when a pixel memory size is two bytes and 20 bites when a pixel memory size is one byte. The count field 1412 is a 7-bit field that is a count of a number of outstanding pre-fetch requests for a block. For example, the count field 1412 is incremented every time a block is requested on the pre-fetch interface 104 of FIG. 1. If the count field 1412 is at a max value (e.g., b1111111 for a 7-bit field), then the pre-fetch interface 104 stalls until the count field 1412 is decremented. In other examples, the count field 1412 is decremented every time a request for the image block is fulfilled on the request interface 106.

The pending field 1414 is a 1-bit field that signals that the image block corresponding to the tag included in tag field 1410 is currently being fetched (e.g., is pending) and will be cached in the corresponding way of the cache memory 146 in subsequent clock cycles. The validation field 1416 is a 1-bit field that signals that the image block corresponding to the tag in the tag field 1410 is cached in the corresponding way of one of the data block memories 148. In some examples, all validation fields 1416 included in the tags 120 of the tag storage 122 can be cleared to invalidate and/or otherwise flush the cache. Alternatively, the tag memory entry 1400 may have fewer or more than the fields depicted in FIG. 14. Alternatively, the tag field 1410, the count field 1412, the pending field 1414, and/or the validation field 1416 may have any other quantity of bits. Alternatively, the tag memory entry 1400 may be implemented using separate arrays of registers.

Figure 15:
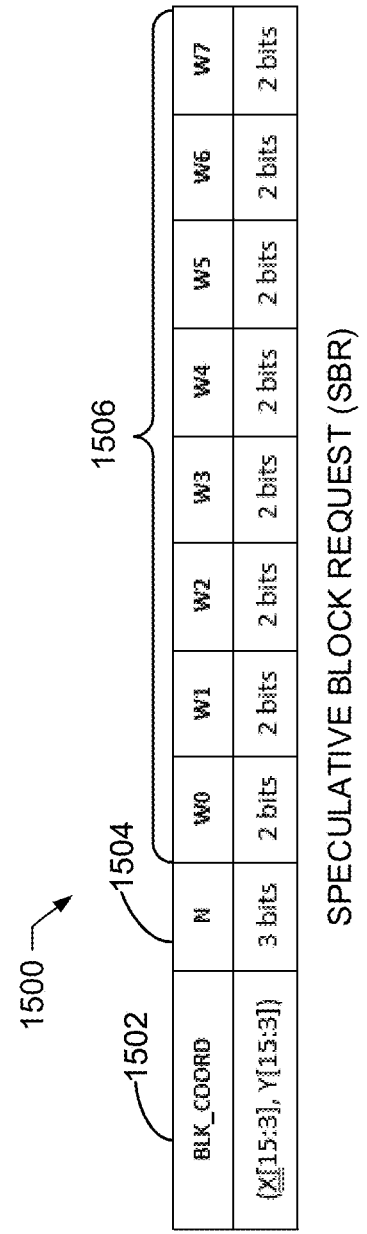
FIG. 15 depicts an example speculative build request to retrieve data from example memory.

FIG. 15 depicts an example SBR 1500 to retrieve blocks from the main memory 110. In some examples, the pre-fetcher 112 and/or the prefetch kernel retriever 202 of FIG. 2 generates the SBR 1500 to retrieve image block data associated with requested pixel coordinates not currently in cache. In some examples, the pre-fetcher 112 and/or the prefetch kernel retriever 202 of FIG. 2 generates the SBR 1500 to speculatively retrieve image block data associated with non-requested pixel coordinates not currently in cache.

The SBR 1500 of FIG. 15 includes an example coordinates field (BLK_COORD) 1502, an example block quantity field 1504, and example way fields 1506. The coordinates field 1502 of FIG. 15 corresponds to pixel coordinates of a first block to fetch from the main memory 110. The block quantity field 1504 of FIG. 15 corresponds to a total number of additional blocks to fetch to a left of the first block. Alternatively, the block quantity field 1504 may correspond to a total number of additional blocks to fetch above, below, or to a right of the first block. The block quantity field 1504 is 3 bits in memory size to account for a quantity of blocks to select less one (e.g., quantity of blocks=N−1). Alternatively, the block quantity field 1504 may be used to represent a total number of additional blocks to fetch to a right of the first block. In examples where the SBR 1500 is used to search to the right of the first block, the last block found cached in the cache storage 146 of FIG. 1 by the tag mapper 124 of FIG. 1 becomes the first block of the request such that memory accesses spanning multiple blocks always increment and, thus, be composable into a burst.

In FIG. 15, the way fields 1506 represent a list including the way in which each block requested by the SBR 1500 will be cached in the cache memories 148 of the cache storage 146. In operation, the pre-fetcher 112 and/or the prefetch kernel retriever 202 determine to generate one or more SBRs 1500 based on a search of the tag storage 122 of FIG. 1. For example, if the tag mapper 124 of FIG. 1 determines that all blocks required for the requested pixel coordinates are hits then the SBR builder 126 does not generate the SBR 1500. For example, the SBR builder 126 may not generate the SBR 1500 when each block tag generated by the tag mapper 124 based on the pixel coordinates are found in the tag memories 128 of FIG. 1 and either of the pending field 135 or the validation field of the corresponding entries 130 are set. In other examples where one or more blocks are misses (e.g., block tag(s) are not in the tag memories 128 and the image blocks are not in the cache storage 146), the SBR builder 126 generates the SBR 1500 and pushes the SBR 1500 into the SBR FIFO 136 of FIG. 1 for processing by the block fetcher 138 of FIG. 1.

In some examples, the SBR builder 126 generates one or more of the SBR 1500 without making any speculative requests. For example, the SBR builder 126 may construct one of the SBR 1500 for each block to be retrieved and stored in the cache storage 146. In such examples, for each block, the SBR builder 126 constructs one of the SBR 1500 of FIG. 15 by including the pixel coordinates of the image block of interest in the coordinates field 1502, setting the block quantity field 1504 to zero, and setting a first one of the way fields (W0) 1506 to the number of the way in which the image block will be cached in one of the cache memories 148.

In some examples, the SBR builder 126 generates one or more of the SBR 1500 to make speculative request(s). In some examples when making speculative requests, the SBR builder 126 generates a maximum of two SBR 1500 with a minimum quantity of two blocks requested in each SBR. In such examples, a first one of the SBR 1500 includes information for Block 0 and Block 1. For example, the SBR builder 126 may assign the coordinates for Block 0 to the coordinates field 1502, set the block quantity field 1504 to one corresponding to two blocks to fetch less one, and set the first and second one of the way fields (W0, W1) to the numbers of the ways in which Block 0 and Block 1 will be cached in the cache memories 148. A second one of the SBR 1500 may include information for Block 2 and Block 3. For example, the SBR builder 126 may assign the coordinates for Block 2 to the coordinates field 1502, set the block quantity field 1504 to one corresponding to two blocks to fetch less one, and set the first and second one of the way fields (W0, W1) to the numbers of the ways in which Block 2 and Block 3 will be cached in the cache memories 148.

Figure 16:
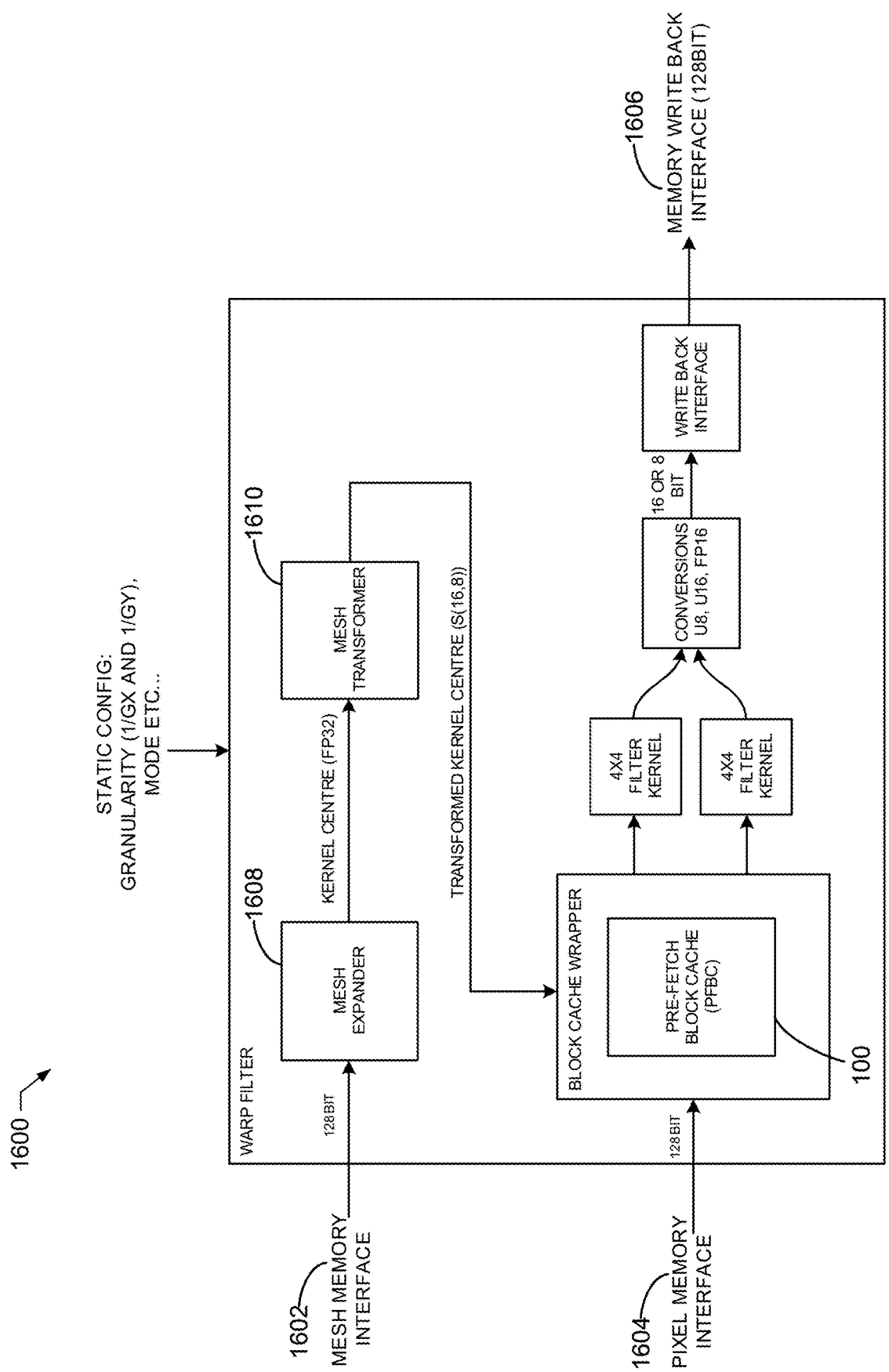
FIG. 16 illustrates a block diagram of an example implementation of an example warp filter including the PFBC of FIG. 1.

FIG. 16 illustrates a block diagram of an example implementation of an example warp filter 1600 including the PFBC 100 of FIG. 1. The example warp filter 1600 of FIG. 16 performs geometric operations on images, using bicubic sampling. In basic terms, the warp filter 1600 takes an input image which it "warps" using a mesh to produce an output image. In FIG. 16, the warp filter 1600 is a memory-to-memory block and includes three example memory interfaces 1602, 1604, 1606. The first memory interface 1602 of FIG. 16 is a read memory interface for mesh memory or a mesh read interface. The second memory interface 1604 of FIG. 16 is a read memory interface for pixel memory or a block cache pixel read interface. The third memory interface 1606 of FIG. 16 is a write memory interface to pixel memory (e.g., a 128-bit memory write back interface) or a pixel write interface.

Figure 17:
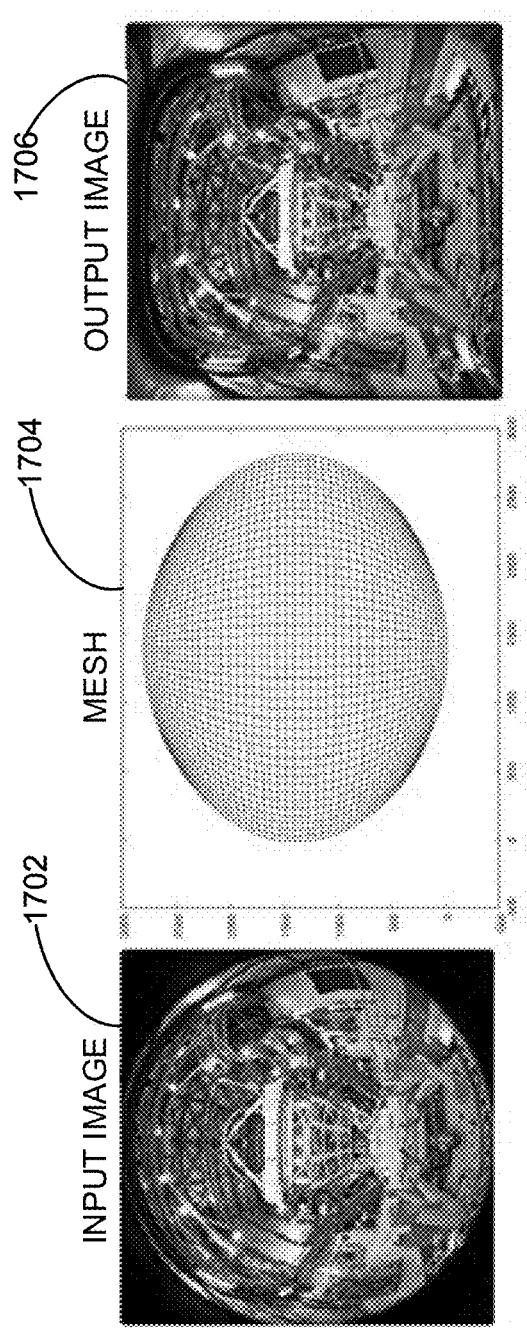
FIG. 17 is an example fisheye transform processed by the example warp filter of FIG. 16 to remove distortion.

FIG. 17 is an example fisheye transform 1700 processed by the warp filter 1600 of FIG. 16 to remove distortion. The warp filter 1600 removes fisheye distortion from an example input image 1702 using an example mesh 1704 to generate an example output image 1706. The warping action can be thought of as an action which modifies the output image on a per pixel basis. The example "mesh" is a set of coordinates that map the output pixels to locations in the input image. The example mesh can either be a sparse mesh or a pre-expanded mesh. In the case of a sparse mesh—the warp filter 1600 of FIG. 16 will expand the mesh internally to produce an expanded meshpoint for every pixel in the output image. For a pre-expanded mesh, the mesh has already been fully expanded. The expanded meshpoint is basically an (X,Y) location in the input image.

An example mesh is used to define the transformation. Each point in the mesh contains (X,Y) pair of sampling co-ordinates. The mesh is up sampled using bilinear resampling at runtime to produce per-pixel X and Y sampling co-ordinates at the output image resolution. The input image is then sampled at these co-ordinates using bicubic sampling to produce the output image pixels. Example applications for the bicubic warp filter include fisheye distortion correction and pincushion and barrel distortion correction.

Figure 18:
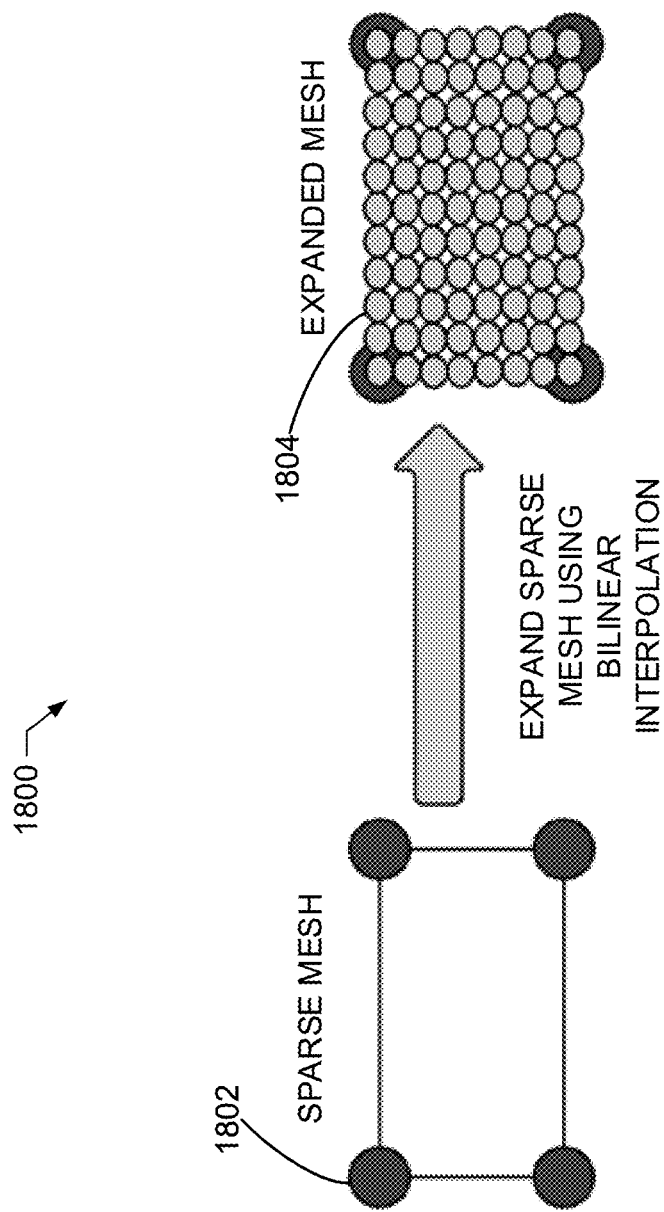
FIG. 18 is a schematic illustration of example expanded meshpoints.

FIG. 18 is a schematic illustration of example expanded meshpoints. In FIG. 18 each large dot on the left is an example sparse meshpoint 1802. In the illustrated example of FIG. 18, there are 4 sparse meshpoints 1802 that get expanded to 88 example meshpoints 1804 on the right (shown as smaller dots). Each of the smaller dots on the right can be thought of as a pixel point in the output image and will have an (X,Y) vector to a location in the input image. Each of the smaller dots on the right can map to any arbitrary location in the input image.

When the example warp filter 1600 of FIG. 16 calculates a particular output pixel, the warp filter 1600 obtains the pixel and required surrounding kernel pixels within the input frame that the expanded meshpoint points to. The warp filter 1600 then performs either Bicubic or Bilinear filtering on the pixel kernel to produce the actual output pixel. The warp filter 1600 proceeds through the defined output image producing output pixels by filtering on the kernels pointed to by the expanded mesh. In this manner, an entire output frame can be generated from an input frame and a mesh.

Figure 19:
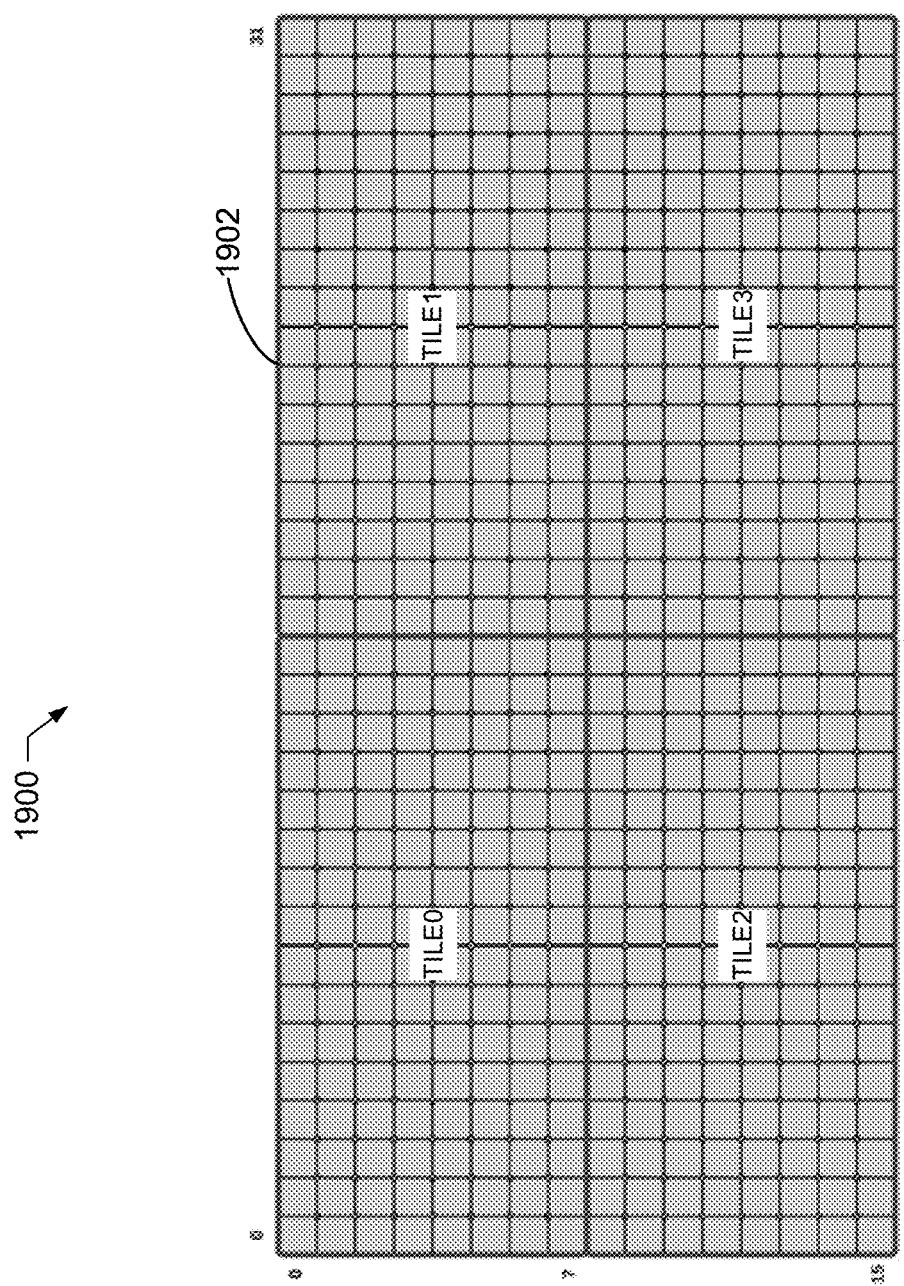
FIG. 19 illustrates an example image split into equal tiles by the example warp filter of FIG. 16.

FIG. 19 illustrates an example image 1900 split into equal tiles 1902 by the warp filter 1600 of FIG. 16. The image 1900 of FIG. 19 includes 32 pixels×16 rows split into 4 equal tiles 1902. The warp filter 1600 of FIG. 16 operates on one processing tile 1902 at a time. The tiles 1902 are related to the output image and can be thought of as tiles within the output image. In other words, the warp filter 1600 is configured to produce an output image made up of a number of tiles (e.g., the tiles 1902). The current processing tile will be completed before moving to the next processing tile. The tile dimensions are host configurable and can be one of the following in height and width −8, 16, 32, 64, 128. In some examples, there is no dependency between tile height and tile width from a hardware perspective.

Turning back to FIG. 16, the memory interfaces 1602, 1604, 1606 are controlled and/or configured via host accessible registers. For example, the warp filter 1600 can be driven by host configurable registers in a manner such as to maintain configurability but to reduce the requirement for interrupts and host intervention. In some examples, full configuration takes place prior to the host instructing the warp filter 1600 to begin operation. For example, the host must ensure that there is a sufficient number of input lines available in the input picture buffer to service the variety of meshpoints in the input mesh (either pre-expanded or sparse) prior to starting the warp filter 1600. Any meshpoints that point outside the input picture buffer can result in the nearest edge pixel being used with padding to construct the full 4×4 bicubic kernel.

In some examples, the host configures the tile size and the number of tiles that the warp filter 1600 operates on before generating an interrupt. Generally, the number of tiles in the run will be an entire tile-row but is not necessarily so. The host can also indicate the starting position of a tile within the output image. The starting position can be in the form of an (X[15:0],Y[15:0]) offset from the top left pixel position in an image which is assumed to be position (0,0).

In some examples, a circular buffer is used for the input picture buffer to the warp filter 1600. In such examples, the host can program the memory offset and the number of the lines in the circular buffer. As mentioned above, the behavior of the warp filter 1600 can be undefined if the meshpoints point outside the circular buffer. The hardware can track a position within the circular buffer and can request from absolute memory addresses.

In the illustrated example of FIG. 16, the warp filter 1600 includes an example mesh expander 1608 to take a sparse mesh and expand the sparse mesh to map onto an output image as described above in connection with FIG. 18. Example mesh expansions disclosed herein include an input data format having sparse meshpoints in FP32 or mixed point 16-bit mixed point (programmable decimal position), where the value is relative to (0,0) origin, with 1/Granularity, and 20 bit fractional, U(0,20). Additionally, an example output data format has expanded meshpoints in FP32.

The example mesh expander 1608 of FIG. 16 accesses main memory to fetch the sparse meshpoints so that they can be expanded for the downstream logic. The meshpoints are normally held in PF32 format, but other formats may be supported such as 16-bit mixed point. For meshpoints stored in any other format other than FP32, the mesh expander 1608 can convert such formats to FP32 prior to any interpolation. In FIG. 16, the input meshpoints are absolute locations (e.g., the input meshpoints are not relative to the current output coordinate position).

The interpolation in the example mesh expander 1608 is Bilinear. The granularity of the example mesh expander 1608 is programmed as a 20-bit fractional 1/granularity to avoid costly dividers in hardware. The calculation of the Alpha and Beta components (e.g., the fractional position of the bi-linear filters) can be performed in fixed point U(16,20) causing the Alpha and Beta to both be represented as 20-bit fractional. In FIG. 16, conversion of Alpha and Beta from 20-bit fractional to FP32 takes place prior to the bi-linear interpolation of the meshpoints. The meshpoint bilinear interpolation takes place in FP32. The order of the interpolation is vertical followed by horizontal. The packing of the meshpoints into the memory word will depend on the format of the meshpoints. Two example options for meshpoints formats are either FP32 or mixed point 16 bit. These example options are described below.

For examples related to FP32, each word contains two sparse meshpoints, each of which consists of an FP32 X and an FP32 Y component. The upper 32 bits of the memory word hold the X component and the lower 32 bits contain the Y component. An example memory organization of meshpoints in FP32 format 2000 is shown in FIG. 20.

For examples related to 16-bit fixed point with programmable decimal position, each returning memory word contains 4 sparse meshpoints representing meshpoint for location A and the locations directly to the right—location A+1, location A+2 and location A+3. The lower 32 bits will contain the X and Y components for the location A, the next 32 bits will contain the X and Y components for location A+1 and so on up to Location A+3. An example memory organization of meshpoints in 16-bit format 2100 is shown in FIG. 21. For meshes that do not have a width of a multiple of 4, the value contained in unused locations will not be defined.

An example pre-expanded mesh mode is an alternate path to mesh expansion. One path or the other is taken within the warp. The selection of the pre-expanded mode over mesh expansion is selected by setting the PREEXPANDED_ MODE bit to 1 in the WARP_MESH register. The pre-expanded mesh mode includes an input data format as an expanded mesh in mixed point 16 bit, programmable decimal position, relative to output pixel position, and an output data format as expanded meshpoints in FP32, absolute.

In the pre-expanded mesh mode, a pre-expanded mesh is fetched from memory. In such examples, the mesh expander 1608 is bypassed and the pre-expanded meshpoints are output in FP32 to an example mesh transformer 1610. The input mode will be mixed point 16 bit for the meshpoints and these meshpoints will be relative to the current pixel position. For example, the 16-bit input meshpoint vector will be added to the current pixel position to give the final absolute meshpoint vector. The decimal position of the input 16 bits is programmable so that a variety of precisions and images sizes are catered for.

The expanded meshpoints are packed into 128 bits with each word consisting of four meshpoints. Each meshpoint is represented by an X and Y component. These X and Y components are packed with the highest 16 bits representing the FP16 X component and the lowest 16 bits containing the FP16 Y component. An example memory organization of pre-expanded meshpoints 2200 is shown in FIG. 22. The output from the pre-expanded sub-block is FP32.

In some examples, the pre-expanded sub-module can be configured to output a bypass mesh. A bypass mesh is an example mesh where the meshpoint values all equal the (X, Y) position in the output image. To configure the warp to generate a bypass mesh, the example application writes a 1'b1 to the MESH_BYPASS field of the WARP_MESH register, whilst also setting the fields PREEXPANDED_MODE=1'b1, RELATIVE=1'b1 and DEC_POSN=4'b0 (also in WARP_MESH).

In the illustrated example of FIG. 16, the warp filter 1600 includes the mesh transformer 1610 to take the FP32 expanded meshpoints as an input and produces S(16,8) transformed meshpoints as an output of the mesh transformer 1610. Internal to the mesh transformer 1610, the datapath is fully FP32 except for the final conversion from FP32 to S(16,8). An example input data format for the mesh transformer 1610 can be an expanded mesh with FP32, and an output format can be a transformed mesh with S(16,8). In some examples, the mesh transformer 1610 includes a bypass mode whereby meshpoints are passed through unaffected except for the final transformation from FP32 to S(16,8). The bypass mode is not to be confused with the bypass mesh. In some examples, the mesh transformer 1610 includes a divider bypass mode to turn off the dividers (for power saving) if the host requires a divide by 1 only. The divider bypass (XFORM_DIV_BYPASS) and entire transform bypass (XFORM_BYPASS) can be configured from a register of the warp filter 1600 (e.g., a WARP_MODE register).

The example mesh transformer 1610 of FIG. 16 can perform at least three main operations. A first example operation includes an example 3×3 matrix transform, where the FP32 input meshpoints are passed through a 3×3 matrix, for which the mesh transformer 1610 executes instructions (e.g., machine readable instructions, hardware logic, etc.) corresponding to the pseudo code represented by the examples of Equations (4)-(6) below:

$$x=(m(0,0)*mx)+(m(0,1)*my)+m(0,2) \quad \text{Equation (4)}$$

$$y=(m(1,0)*mx)+(m(1,1)*my)+m(1,2) \quad \text{Equation (5)}$$

$$z=(m(2,0)*mx)+(m(2,1)*my)+m(2,2) \quad \text{Equation (6)}$$

In the examples of Equations (4)-(6) above, m represents the 3×3 matrix, mx represents the FP32 x-component of the meshpoint, and my represents the FP32 y-component of the meshpoint. The outputs are x, y and z. The multiplication and addition operations are carried out in FP32. The matrix coefficients are configured via one or more registers (e.g., the WARP_MAT0 (m(0,0)) to WARP_MAT8 (m(2,2)) registers).

A second example operation that can be performed by the mesh transformer 1610 of FIG. 16 is a divide by z operation. For example, x and y can be divided by z where x, y, and z are the outputs from the matrix transforms of the examples of Equations (4)-(6) above. For example, the mesh transformer 1610 can execute instructions corresponding to the pseudo code represented by the examples of Equations (7)-(8) as described below:

$$x'=x/z \quad \text{Equation (7)}$$

$$y'=y/z \quad \text{Equation (8)}$$

The mesh transformer 1610 can convert the resultant x' and y' from FP32 to 16 bit signed integer with 8 bit fractional (S(16,8)).

In the illustrated example of FIG. 16, the warp filter 1600 includes the PFBC 100 of FIG. 1 to perform the prefetching of pixels from main memory. The warp filter 1600 uses the PFBC 100 to effectively eliminate the memory latency which in the case of DRAM could be a significant delay. In some examples, only the integer part of the input meshpoint is used to fetch the required 4×4 pixel kernel from the AMC memory system. The fractional 8-bit part is passed through to the next subblock in the pipeline: the bicubic resampler subblock. In some examples, an input data format of the PFBC 100 is expanded, transformed meshpoint—S(16,8), and input pixels from main memory in one of U8, U16. In some examples, an output data format of the PFBC 100 is a 4×4 pixel kernel in U16.

Figure 23:
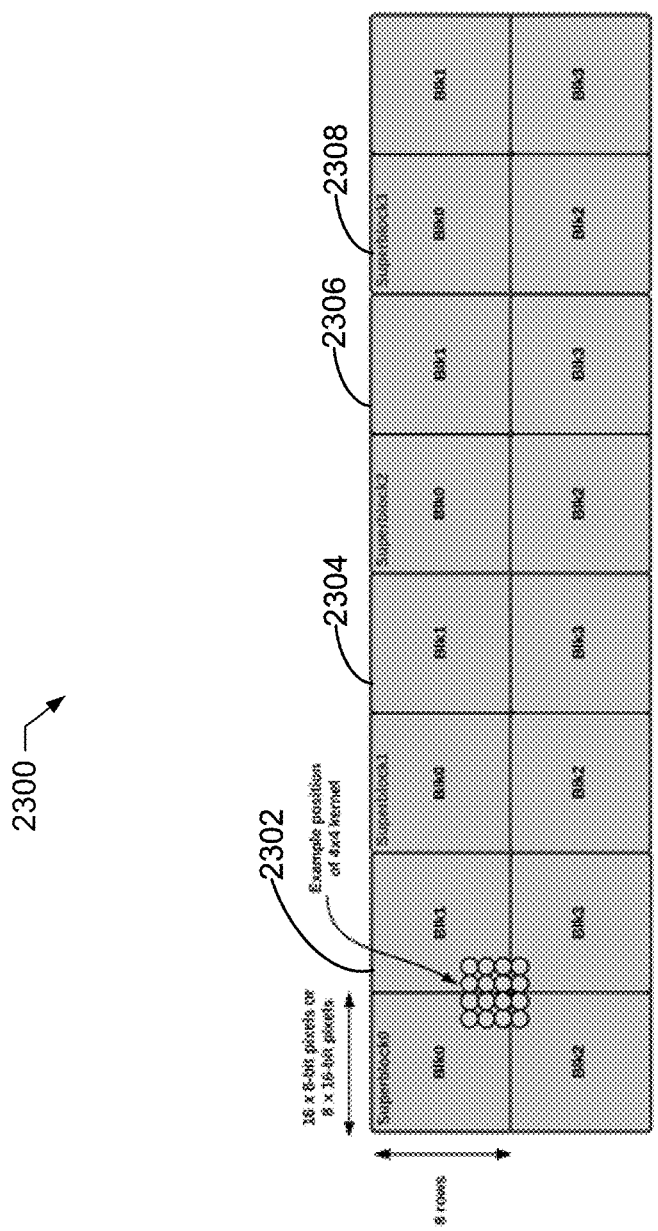
FIG. 23 depicts an example of blocks and superblocks used in the example PFBC in the example of FIG. 16.

The PFBC 100 of FIG. 1 is a 4-way, prefetch block cache. In some examples, each block is 128 bits×8 rows. In some examples, each set is 8 blocks×4 block rows. The PFBC 100 included in the warp filter 1600 operates on blocks of pixels as its basic unit to fetch from DRAM or CMX. In some examples, the size of the image blocks is either 8×8 pixels in the case of 16-bit pixel mode and 16×8 pixels in the case of 8-bit pixel mode. FIG. 23 depicts an example of blocks and superblocks 2300 used in the PFBC 100 in the example of FIG. 16. By definition, at least one kernel pixel will always be located somewhere within Blk0 of Superblock0.

In some examples, the PFBC 100 can be adjusted to change the maximum amount that the PFBC 100 will speculatively prefetch at any time by adjusting one or more registers (e.g., the SPEC_REQUEST_MODE field of the WARP PFBC register). For example, setting a register such as the SPEC_REQUEST_MODE field to:

(A) 3'd0 means that no speculative prefetches occurs and the PFBC 100 will only fetch the image blocks (up to 4) that are required to fulfill the current requested kernel. In the case of the kernel position shown in FIG. 23, the PFBC 100 would fetch all 4 blocks of Superblock0 2302 to fulfill the requested kernel.

(B) 3'd1 means that one Superblock that contains the requested kernel will be fetched (if certain conditions are met, see note below) even if the kernel does not overhang into it. That is, there will be a speculative pre-fetch for 4 blocks of what is notionally referred to as Superblock0 2302 in FIG. 23.

(C) 3'd2 means that two Superblocks will be fetched (if certain conditions are met, see note below). That is, there will be a speculative pre-fetch for the 8 blocks of what are notionally referred to as Superblock0 2302 and Superblock1 2304 in FIG. 23.

(D) 3'd3 means that three Superblocks will be fetched (if certain conditions are met, see note below). That is, there will be a speculative pre-fetch for the 8 blocks of what are notionally referred to as Superblock0 2302, Superblock1 2304, and Superblock2 2306 in FIG. 23.

(E) 3'd4 means that four Superblocks will be fetched (if certain conditions are met, see note below). That is, there will be a speculative pre-fetch for the 8 blocks of what are notionally referred to as Superblock0 2302, Superblock1 2304, Superblock2 2306, and Superblock3 2308 in FIG. 23.

In some examples, a register (e.g., the PID_DEDUPE field of the WARP_MODE register) of the warp filter 1600 can used to remove duplication of kernels input to the PFBC 100. For example, the register can be used to reduce memory accesses within the PFBC 100 with the aim of reducing power.

An example bicubic resampler includes an input data format of 4×4 pixel kernels in U16 and an 8 bit fractional, and an output data format of U16 output pixels. There are two example modes of operation for the Resampler subblock—Bicubic and Bilinear. Bicubic mode uses a 4×4 pixel kernel in U16 format; Bilinear mode uses a 2×2 pixel kernel in U16 format. If the input kernel happens to be close and hangs over the edge of the picture (e.g., not all pixels in the kernel are within the input picture boundary) then those non-existent pixels will get filled with either the same value as their nearest neighbor or with a host defined color. This edge mode of operation is host configurable. For example, the horizontal operation can be carried out first followed by the vertical.

In some examples, the Bicubic coefficients are generated from the 8-bit fractional input and can be calculated as follows:

$$(-\tfrac{1}{2}*t+t2-\tfrac{1}{2}*t3); \quad \text{A:}$$

$$(1-\tfrac{5}{2}*t2+\tfrac{3}{2}*t3); \quad \text{B:}$$

$$(\tfrac{1}{2}*t+2*t2-\tfrac{3}{2}*t3); \text{ and} \quad \text{C:}$$

$$(-\tfrac{1}{2}*t2+\tfrac{1}{2}*t3), \quad \text{D:}$$

where t is the 8-bit fractional input, t2 is t*t, and t3 is t*t*t. In some examples, t is either from X if calculating the coefficients for the horizontal operation or from Y if calculating the coefficients for the vertical operation. The coordinate in the expanded Mesh equates to K11 in the Kernel below. An example input pixel kernel may be represented as:

K00 K10 K20 K30
K01 K11 K21 K31
K02 K12 K22 K32
K03 K13 K23 K33
Example bicubic pseudo code may be represented as:
H0=A*K00+
B*K10+
C*K20+
D*K30;
H1=A*K01+
B*K11+
C*K21+
D*K31;
H2=A*K02+
B*K12+
C*K22+
D*K32;
H3=A*K03+
B*K13+
C*K23+
D*K33;
And an example output can be represented as:
A*H0+
B*H1+
C*H2+
D*H3;

In some examples, a Bicubic mode can be enabled by setting a register (e.g., the BICUBIC_MODE field of the WARP_MODE register) of the warp filter 1600. In some examples, the Bilinear coefficients are generated from the 8-bit fractional input and can be calculated as follows:

$(1-t)$;  A:

$t$,  B:

where 't' is either from X if calculating the coefficients for the horizontal operation or from Y if calculating the coefficients for the vertical operation. The coordinate in the expanded Mesh equates to K11 in the Kernel below.

An example Input Pixel Kernel:
K00 K10 K20 K30
K01 K11 K21 K31
K02 K12 K22 K32
K03 K13 K23 K33
where only the upper-left 4 pixels (K00, K01, K10, K11) are used in Bilinear resampling mode.

$H1=(A*K11)+(B*K21)$;

$H2=(A*K12)+(B*K22)$;

Output$=(A*H1)+(B*H2)$;

In some examples, Bilinear mode is enabled by setting the BILINEAR_MODE field of the WARP_MODE register of the warp filter 1600.

In some examples, the warp filter 1600 of FIG. 16 obtains the following basic configuration information: frame BASE address for 3 memory ports, STRIDE for 3 memory ports, circular buffer/frame buffer mode for 3 memory ports, X,Y Tile Start Point in frame (e.g., (0,0) can be used for most applications), and/or a number of tiles to process (e.g., either all in image or a subset starting from the Tile Start Point, or set to 0 to process an entire frame). Additionally or alternatively, the warp filter 1600 may obtain basic configuration information such as tile X,Y dimensions, input frame dimensions (INFRAMELIMIT), output frame dimensions (TILE_START and OUTFRAMELIM), and/or X Granularity reciprocal and Y Granularity reciprocal in U(0,20). The X and Y Granularity reciprocals are 1/Gx in Fixed point (0,20) format and granularity is (Pixels out/pixels in). In some examples, the register value can be calculated as (1/G*2^20). In some examples, there can be restrictions on the relationship between G and tile width or height. An example restriction may be that G must be greater than or equal to the (tile_size)/2, where tile_size is tile width or tile height.

Additionally or alternatively, the warp filter 1600 may obtain basic configuration including the mesh starting position in integer and fractional values (e.g., can use (0.0, 0.0) for most applications), programmable coefficients for 3×3 Matrix operation (9×FP32) in the mesh transformer 1610, a selection of Bilinear or Bicubic re-sampling, a selection of edge modes (e.g., what happens when filter kernel hangs over edge of picture (e.g., resolve by either pad with edge pixel or use constant color)), and/or a color for edge mode if using constant color mode.

In the illustrated example of FIG. 16, the warp filter 1600 includes the three interfaces 1602, 1604, 1606. For example, the three interfaces 1602, 1604, 1606 may be AMC master interfaces. The mesh read interface 1602 is a relatively low bandwidth port and can fetch up to nine 64 bit (X,Y) meshpoints (in FP32,FP32 format) per output tile. The bandwidth of this example interface will depend on the granularity and tile size set. Granularity is restricted to no lower than tile size to restrict the number of mesh fetches to reasonable levels. For a granularity and tile size of 32×32, then the meshpoint fetcher will fetch 9 64-bit words every 1024 cycles. These meshpoints will be held in contiguous memory locations. This memory port will also read high bandwidth pre-expanded meshpoints from the memory system.

The block cache memory interface 1604 of FIG. 16 supports read bursts of up to 8 words. In some examples, the size of the burst is limited by the number of blocks that can be requested in a single Speculative Block Request (SBR) word (maximum of 8). The pixel write interface 1606 obtains pixel write-backs that are all whole words of 128 bits and, in some examples, byte masking is not supported. The pixel write interface 1606 of FIG. 16 supports write bursts of up to 16.

Figure 28:
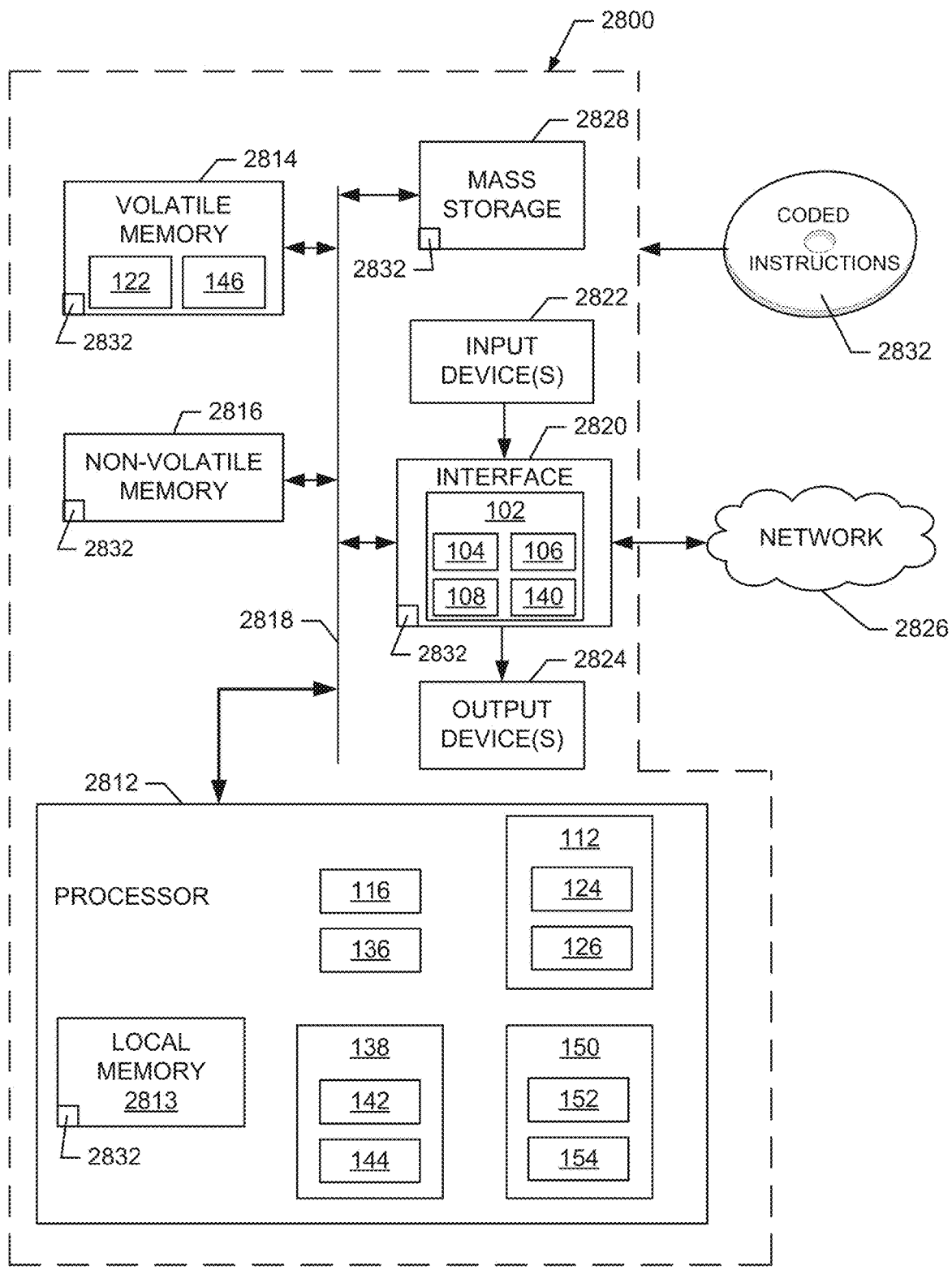
FIG. 28 is a block diagram of an example processor platform structured to execute the example machine readable instructions of, at least, FIGS. 24-27 to implement the example PFBC of FIG. 1.
Figure 29:
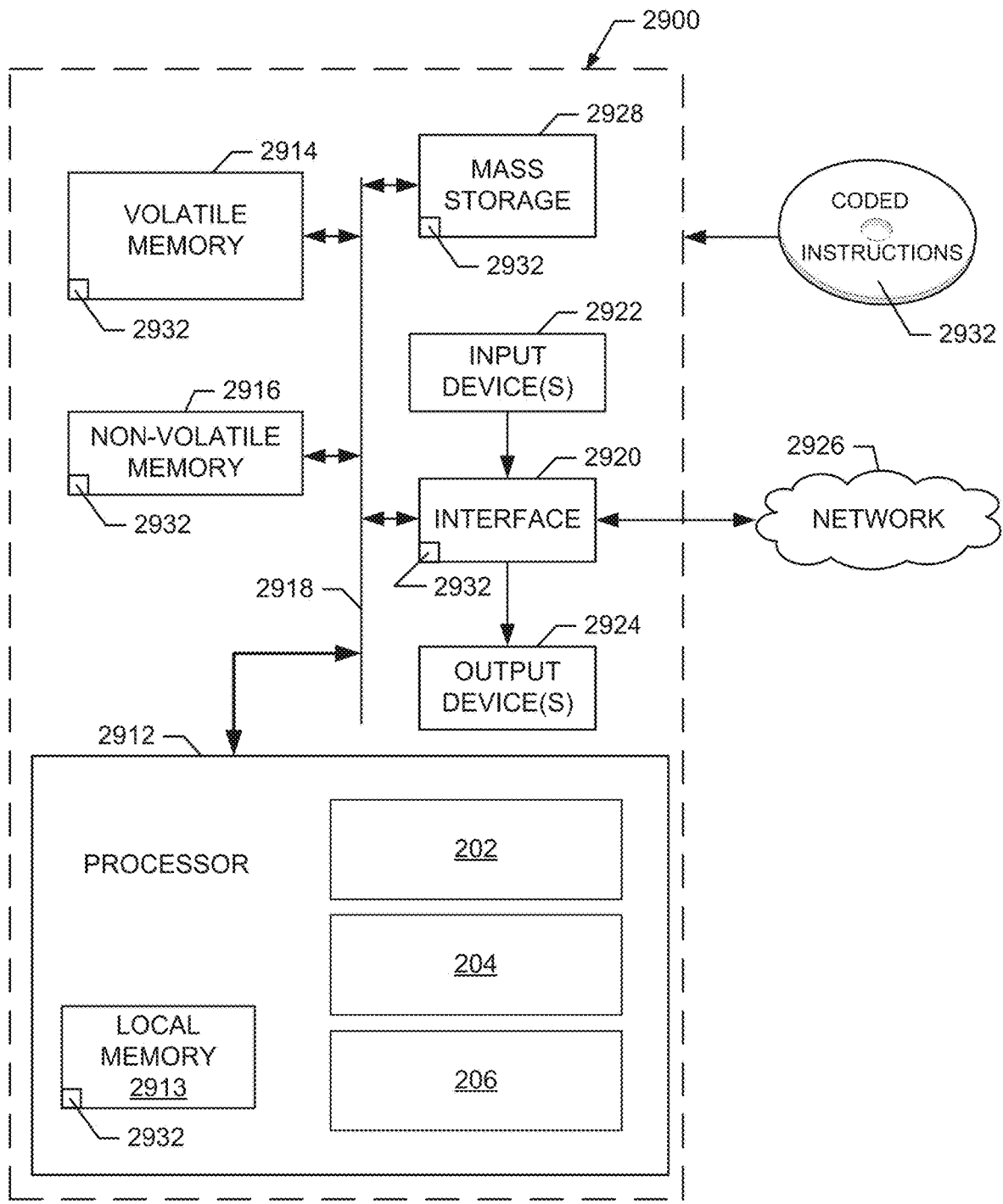
FIG. 29 is a block diagram of an example processor platform structured to execute the example machine readable instructions of, at least, FIGS. 24-27 to implement the example prefetch engine of FIG. 2.

Flowcharts representative of example hardware logic, machine readable instructions, hardware implemented state machines, and/or any combination thereof for implementing the PFBC 100 of FIG. 1 and/or the prefetch engine 200 of FIG. 2 are shown in FIGS. 24-27. The machine readable instructions may be an executable program or portion of an executable program for execution by computer processor(s) such as the processor 2812 of FIG. 28 shown in the example processor platform 2800 discussed below in connection with FIG. 28 and/or the processor 2912 of FIG. 29 shown in the example processor platform 2900 discussed below in connection with FIG. 29. The program may be embodied in software stored on a non-transitory computer readable storage medium such as a CD-ROM, a floppy disk, a hard drive, a DVD, a Blu-ray disk, or a memory associated with the processor(s) 2812, 2912, but the entire program and/or parts thereof could alternatively be executed by a device other than the processor(s) 2812, 2912 and/or embodied in firmware or dedicated hardware. Further, although the example program is described with reference to the flowcharts illustrated in FIGS. 24-27, many other methods of implementing the example PFBC 100 and/or the prefetch engine 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 24-27 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 24:
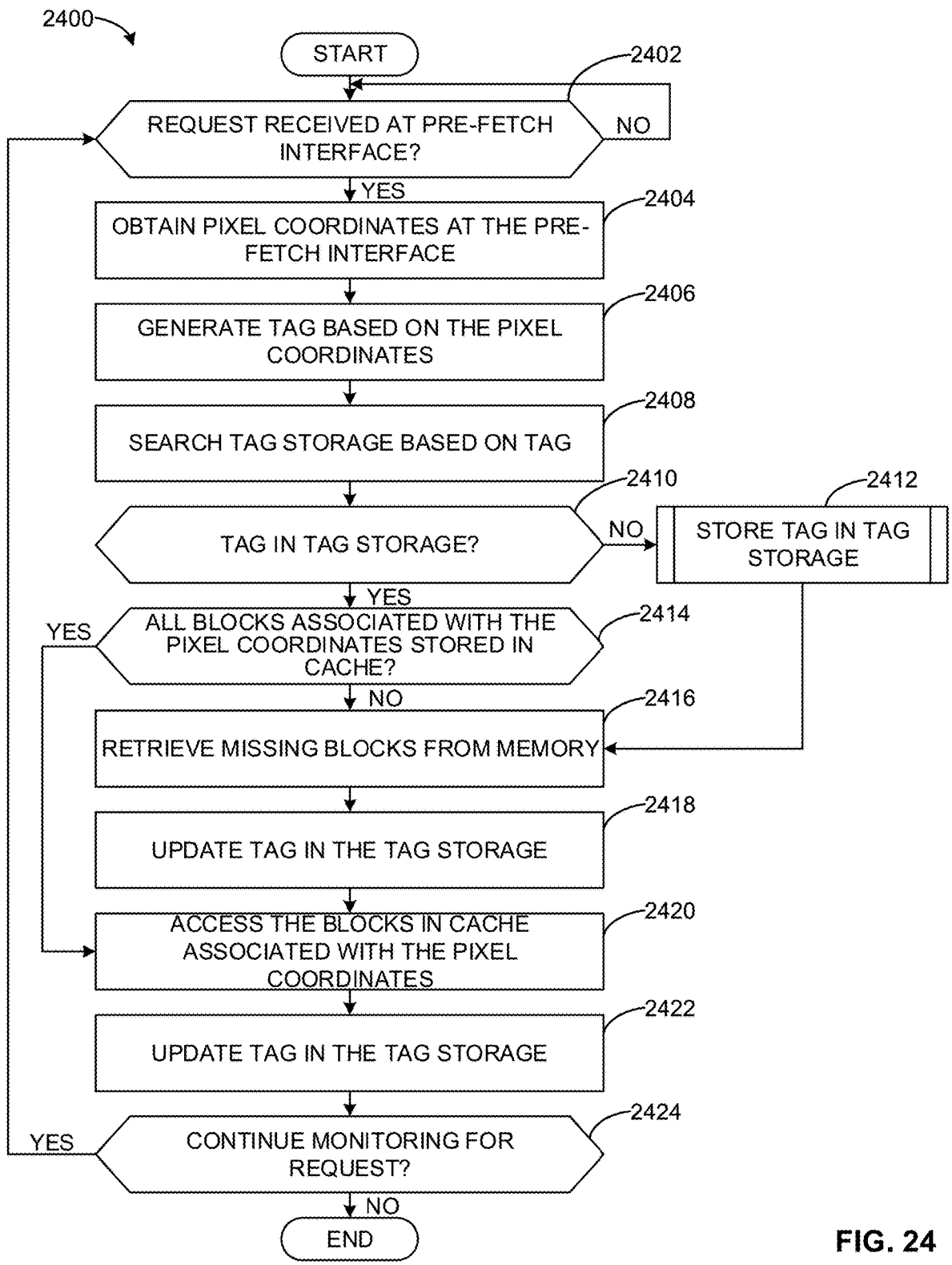
FIG. 24 is a flowchart representative of example machine readable instructions that may be executed to implement the example PFBC of FIG. 1 and/or the example prefetch engine of FIG. 2 to process an example request received at an example pre-fetch interface.

FIG. 24 is a flowchart representative of example machine readable instructions 2400 that may be executed to implement the PFBC 100 of FIG. 1 and/or the prefetch engine 200 of FIG. 2 to process a request received at a pre-fetch interface. For example, the machine readable instructions 2400 may implement the pre-fetch interface 104 of FIG. 1 and/or the prefetch kernel retriever 202 of FIG. 2 receiving a request from a hardware accelerator (e.g., the hardware accelerator 114 of FIG. 1) to process pixel coordinates associated with a pixel of an input image.

The example machine readable instructions 2400 of FIG. 24 begin at block 2402, at which the PFBC 100 determines if a request (e.g., a request from the hardware accelerator 114) has been accepted at a pre-fetch interface. For example, the pre-fetch interface 104 of FIG. 1 may determine if a request including pixel coordinates from the hardware accelerator 114 has been accepted. If not, the PFBC 100 continues to wait for such an event. In response to the PFBC 100 detecting a request acceptance, then, at block 2404, the PFBC 100 obtains pixel coordinates at the pre-fetch interface. For example, the pre-fetch interface 104 may receive pixel coordinates of a pixel included in an input image. Additionally or alternatively, the hardware accelerator 114 may include horizontal support, vertical support, and/or Morton order information associated with the pixel coordinates in the request received by the pre-fetch interface 104.

At block 2406, the PFBC 100 generates a tag based on the pixel coordinates. For example, the tag mapper 124 may generate a tag including a block tag based on the pixel coordinates received by the pre-fetch interface 104. In response to generating the tag, the PFBC 100 searches tag storage based on the tag at block 2408. For example, the tag mapper 124 may search each of the tag memories 128 included in the tag storage 122 of FIG. 1 in parallel to determine if the generated block tag is already stored in the tag storage 122.

At block 2410, the PFBC 100 determines if the tag is in the tag storage. For example, the tag mapper 124 may determine that the block tag is not in any of the tags 120 indicating that image block data associated with the pixel coordinates are not in the cache storage 146 of FIG. 1. For example, the tag mapper 124 may determine that an image block associated with the pixel coordinates has not been stored in the cache storage 146 and, in response to at least the determination, instructs the SBR builder 126 of FIG. 1 to generate one or more SBRs to retrieve the image block from the main memory 110 of FIG. 1. In other examples, the tag mapper 124 may determine that the block tag is already stored in one of the tags 120 indicating that image block data associated with the pixel coordinates has already been cached in the cache storage 146.

If, at block 2410, the PFBC 100 determines that the tag is not in tag storage, then, at block 2412, the PFBC 100 stores the tag in tag storage. An example process that may be used to implement block 2412 is described below in connection with FIG. 26. In response to storing the tag in tag storage, the PFBC 100 retrieves missing blocks from memory at block 2416. For example, the block fetcher 138 of FIG. 1 may retrieve the image data blocks associated with the pixel coordinates not already stored in the cache storage 146 from the main memory 110 of FIG. 1.

If, at block 2410, the PFBC 100 determines that the tag is in tag storage, then, at block 2414, the PFBC 100 determines if all blocks associated with the pixel coordinates are stored in cache. For example, the tag mapper 124 may determine that all image data blocks required to construct the pixel kernel associated with the pixel coordinates are stored in the cache storage 146. In other examples, the tag mapper 124 may determine that not all image data blocks required to construct the pixel kernel associated with the pixel coordinates are stored in the cache storage 146.

If, at block 2414, the PFBC 100 determines that all blocks associated with the pixel coordinates are stored in cache, control proceeds to block 2420 to access the blocks in cache associated with the pixel coordinates. If, at block 2414, the PFBC 100 determines that not all blocks associated with the pixel coordinates are stored in cache, then, at block 2416, the PFBC 100 retrieves the missing blocks from memory. For example, the block fetcher 138 may retrieve one or more image data blocks associated with the pixel coordinates from the main memory 110. In such examples, the block fetcher 138 may store the one or more retrieved image data blocks into one or more of the cache memories 148 included in the cache storage 146 of FIG. 1.

In response to retrieving the missing blocks from memory, the PFBC 100 updates the tag in the tag storage at block 2418. For example, the block fetcher 138 may update the corresponding entry 130 including the tag 120 with a storage location of the retrieved image data blocks.

In response to updating the tag in the tag storage, the PFBC 100 accesses the blocks in cache associated with the pixel coordinates. For example, the request interface 106 may receive a request for the pixel coordinates received at the pre-fetch interface 104. The read tag mapper 152 may generate a block tag based on the pixel coordinates and determine that the image data blocks associated with the pixel coordinates are stored in the cache storage 146 based on the block tag matching a block tag in one of the tags 120 stored in the tag storage 122. In response to at least the determination, the read tag mapper 152 may instruct the cache accessor 154 to retrieve the image data blocks from the cache storage 146 and output the image data blocks onto the data interface 108 of FIG. 1 for further processing. For example, the cache accessor 154 retrieving the image data blocks from the cache storage 146 compared to retrieving lines of image data from the main memory 110 is a substantially faster and more efficient operation as fewer read operations are performed.

In response to accessing the blocks in cache associated with the pixel coordinates, the PFBC 100 updates the tag in the tag storage at block 2422. For example, the read tag mapper 152 may decrement the count field 134 of the corresponding entry 130 indicating that the image block data associated with the entry 130 has been retrieved from the cache storage 146.

At block 2424, the PFBC 100 determines whether to continue monitoring for requests. If the PFBC 100 determines to continue monitoring for requests, control returns to block 2402 to determine if a request has been received, otherwise the machine readable instructions 2400 of FIG. 24 conclude.

Figure 25:
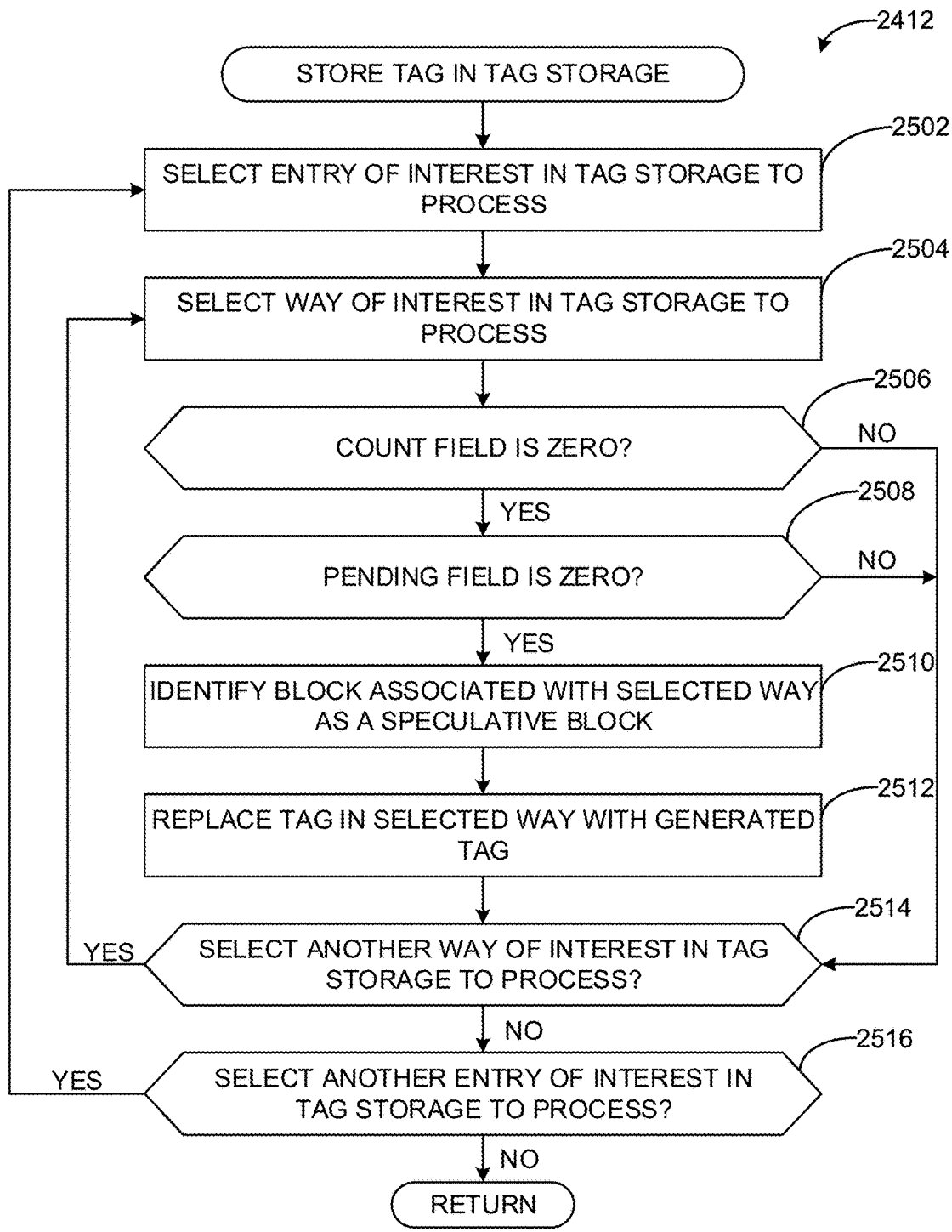
FIG. 25 is a flowchart representative of example machine readable instructions that may be executed to implement the example PFBC of FIG. 1 and/or the example prefetch engine of FIG. 2 to store an example tag in example tag storage.

FIG. 25 is a flowchart representative of example machine readable instructions 2412 that may be executed to implement the PFBC 100 of FIG. 1 and/or the prefetch engine 200 of FIG. 2 to store a tag in tag storage. The machine readable instructions 2412 of FIG. 25 begin at block 2502, at which the PFBC 100 selects an entry of interest in tag storage to process. For example, the tag mapper 124 may select a first one of the entries 130 in a first one of the tag memories 128 of the tag storage 122 to process.

At block 2504, the PFBC 100 selects a way of interest in the tag storage to process. For example, the tag mapper 124 may select a first one of the ways included in the first one of the entries 130 to process.

At block 2506, the PFBC 100 determines if the count field is zero. For example, the tag mapper 124 may determine if the count field 134 included in the selected way is zero. In such examples, the tag mapper 124 can determine that an image block associated with the selected way has been speculatively fetched when the count field 134 is zero and can determine that the image block is associated with a request received by the pre-fetch interface 104 (e.g., a previously received request by the pre-fetch interface 104) when the count field 134 is non-zero.

If, at block 2506, the PFBC 100 determines that the count field is not zero, control proceeds to block 2514 to determine whether to select another way of interest in the tag storage to process. If, at block 2506, the PFBC 100 determines that the count field is zero, then, at block 2508, the PFBC 100 determines if the pending field is zero. For example, the tag mapper 124 may determine if the pending field 135 of FIG. 1 included in the selected way is zero. In such examples, the tag mapper 124 can determine that an image block associated with the selected way has been speculatively fetched but is currently being fetched and cannot be replaced or overwritten when the count field 134 is zero and the pending field 135 is one and/or otherwise enabled. For example, the PFBC 100 cannot replace a speculatively fetched image block before being stored in the cache 146. In other examples, the tag mapper 124 can determine that the image block associated with the selected way has been speculatively fetched and can be replaced when the count field 134 is zero and the pending field 135 is zero because the image block is not pending retrieval.

If, at block 2508, the PFBC 100 determines that the pending field is not zero, control proceeds to block 2514 to determine whether to select another way of interest in tag storage to process. If, at block 2508, the PFBC 100 determines that the pending field is zero, then, at block 2510, the PFBC 100 identifies a block associated with the selected way as a speculative block. For example, the tag mapper 124 may determine that an image data block associated with the first one of the ways of the first one of the entries 130 is a speculatively fetched block and was not previously requested to be stored in the cache storage 146.

In response to identifying the block associated with the selected way as a speculative block, then, at block 2512, the PFBC 100 replaces a tag in the selected way with the generated tag. For example, the tag mapper 124 may store a block tag generated based on pixel coordinates received by the pre-fetch interface 104 in the block tag field of the tag 120 at the selected way. In such examples, the tag mapper 124 may overwrite and/or otherwise replace the existing tag 120 with the generated tag based on received pixel coordinates.

At block 2514, the PFBC 100 determines whether to select another way of interest in the tag storage to process. If, at block 2514, the PFBC 100 determines to select another way of interest in the tag storage to process, control returns to block 2504 to select another way of interest in the tag storage to process. If, at block 2514, the PFBC 100 determines not to select another way of interest in the tag storage to process, then, at block 2516, the PFBC 100 determines whether to select another entry of interest in the tag storage to process. If, at block 2514, the PFBC 100 determines not to select another entry of interest in the tag storage to process, control returns to block 2502 to select another entry of interest in the tag storage to process. In response to not selecting another entry of interest in the tag storage to process, the machine readable instructions 2412 of FIG. 25 return to block 2416 of the machine readable instructions 2400 of FIG. 24 to retrieve the missing blocks from memory.

Figure 26:
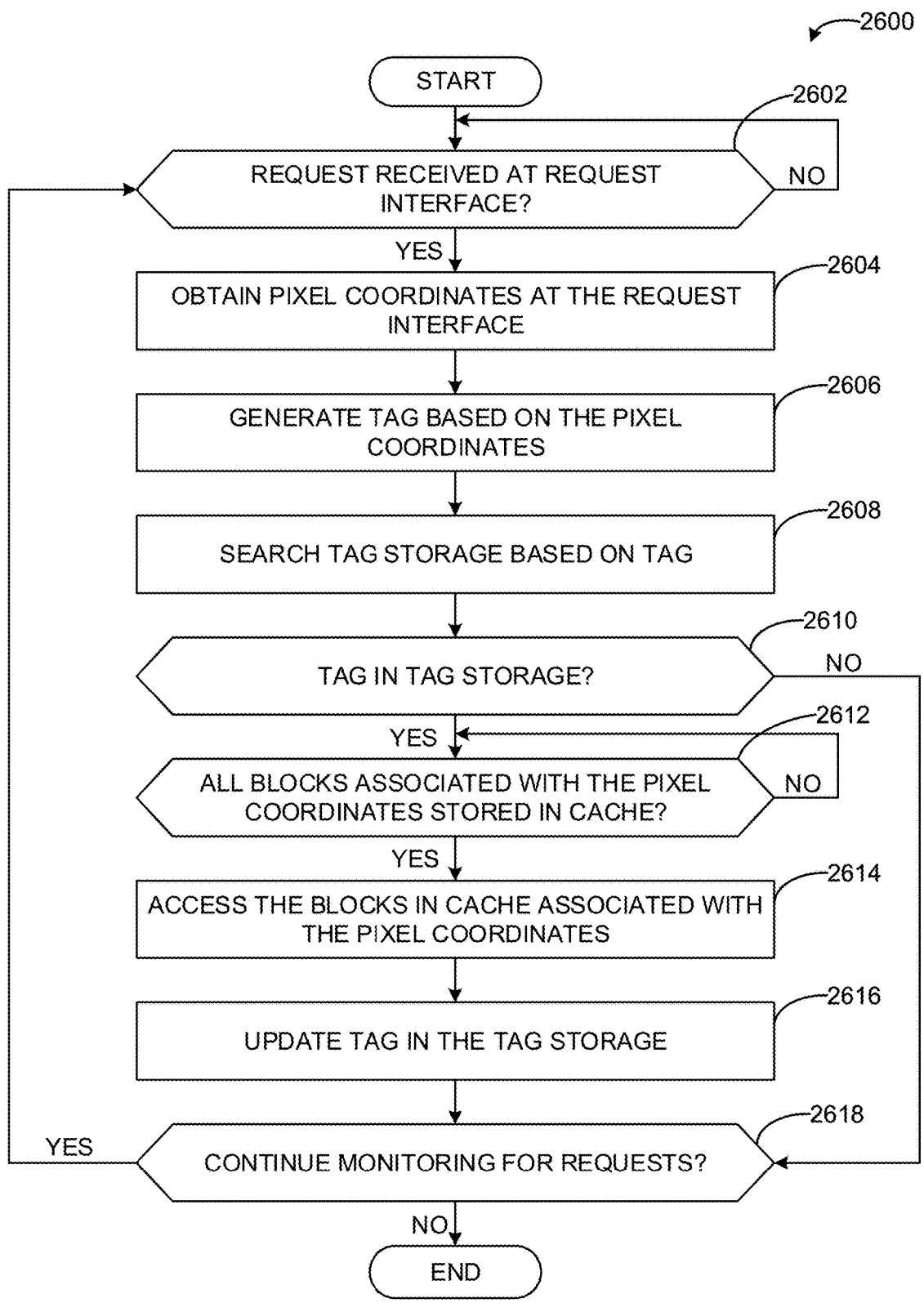
FIG. 26 is a flowchart representative of example machine readable instructions that may be executed to implement the example PFBC of FIG. 1 and/or the example prefetch engine of FIG. 2 to process an example request received at an example request interface.

FIG. 26 is a flowchart representative of example machine readable instructions 2600 that may be executed to implement the PFBC 100 of FIG. 1 and/or the prefetch engine 200 of FIG. 2 to process a request received at a request interface. The machine readable instructions 2600 of FIG. 26 begin at block 2602, at which the PFBC 100 determines if a request has been accepted at a request interface. For example, the request interface 106 of FIG. 1 may determine if a request has been accepted. If not, the PFBC 100 continues to wait for such an event. In response to the PFBC 100 detecting a request acceptance at the request interface 106, then, at block 2604, the PFBC 100 obtains pixel coordinates at the request interface 106. For example, the request interface 106 may receive pixel coordinates of a pixel included in an input image.

At block 2606, the PFBC 100 generates a tag based on the pixel coordinates. For example, the read tag mapper 152 may generate a tag including a block tag based on the pixel coordinates received by the request interface 106. In response to generating the tag, the PFBC 100 searches tag storage based on the tag at block 2608. For example, the read tag mapper 152 may search each of the tag memories 128 included in the tag storage 122 of FIG. 1 in parallel to determine if the image block data associated with the pixel coordinates are stored in the cache storage 146.

At block 2610, the PFBC 100 determines if the tag is in the tag storage. For example, the read tag mapper 152 may determine that the block tag is not in any of the tags 120 indicating that image block data associated with the pixel coordinates are not in the cache storage 146 of FIG. 1. In other examples, the read tag mapper 152 may determine that the block tag is already stored in one of the tags 120 indicating that image block data associated with the pixel coordinates has already been cached in the cache storage 146. In such examples, the cache accessor 154 can readily retrieve one or more image blocks from the cache 146 associated with the requested pixel coordinates. For example, the cache accessor 154 can achieve a performance boost of retrieving the one or more image blocks compared to retrieving one or more lines of image data from the main memory 110 by reducing a quantity of read operations associated with the image data to process the requested pixel coordinates.

If, at block 2610, the PFBC 100 determines that the tag is not in tag storage, control proceeds to block 2618 to continue monitoring for requests. For example, the read tag mapper 152 may wait until the image block data associated with the received pixel coordinates are stored in the cache storage 146. In such examples, the read tag mapper 152 waits until the image block data is stored to achieve a performance boost compared to prior implementations of performing an increased quantity of read operations on the main memory 110 to retrieve a plurality of lines of image data compared to retrieving image data blocks.

If, at block 2610, the PFBC 100 determines that the tag is in tag storage, then, at block 2612, the PFBC 100 determines if all blocks associated with the pixel coordinates are stored in cache. For example, the read tag mapper 152 may determine that all image data blocks required to construct the pixel kernel associated with the pixel coordinates are stored in the cache storage 146. In other examples, the read tag mapper 152 may determine that not all image data blocks required to construct the pixel kernel associated with the pixel coordinates are stored in the cache storage 146.

If, at block 2612, the PFBC 100 determines that not all image blocks associated with the pixel coordinates are stored in cache, the PFBC 100 continues to wait for the image blocks to be stored in the cache.

If, at block 2612, the PFBC 100 determines that all blocks associated with the pixel coordinates are stored in cache, then, at block 2614, the PFBC 100 accesses the image blocks in cache associated with the pixel coordinates. For example, the cache accessor 154 may retrieve the image data blocks from the cache memories 148 included in the cache storage 146 and output the image data blocks onto the data interface 108.

In response to accessing the image blocks in cache, the PFBC 100 updates the tag in the tag storage at block 2616. For example, the read tag mapper 152 may decrement the count field 134 of the corresponding way of the corresponding entry 130.

At block 2618, the PFBC 100 determines whether to continue monitoring for requests. If the PFBC 100 determines to continue monitoring for requests, control returns to block 2602 to determine if a request has been received, otherwise the machine readable instructions 2600 of FIG. 26 conclude.

Figure 27:
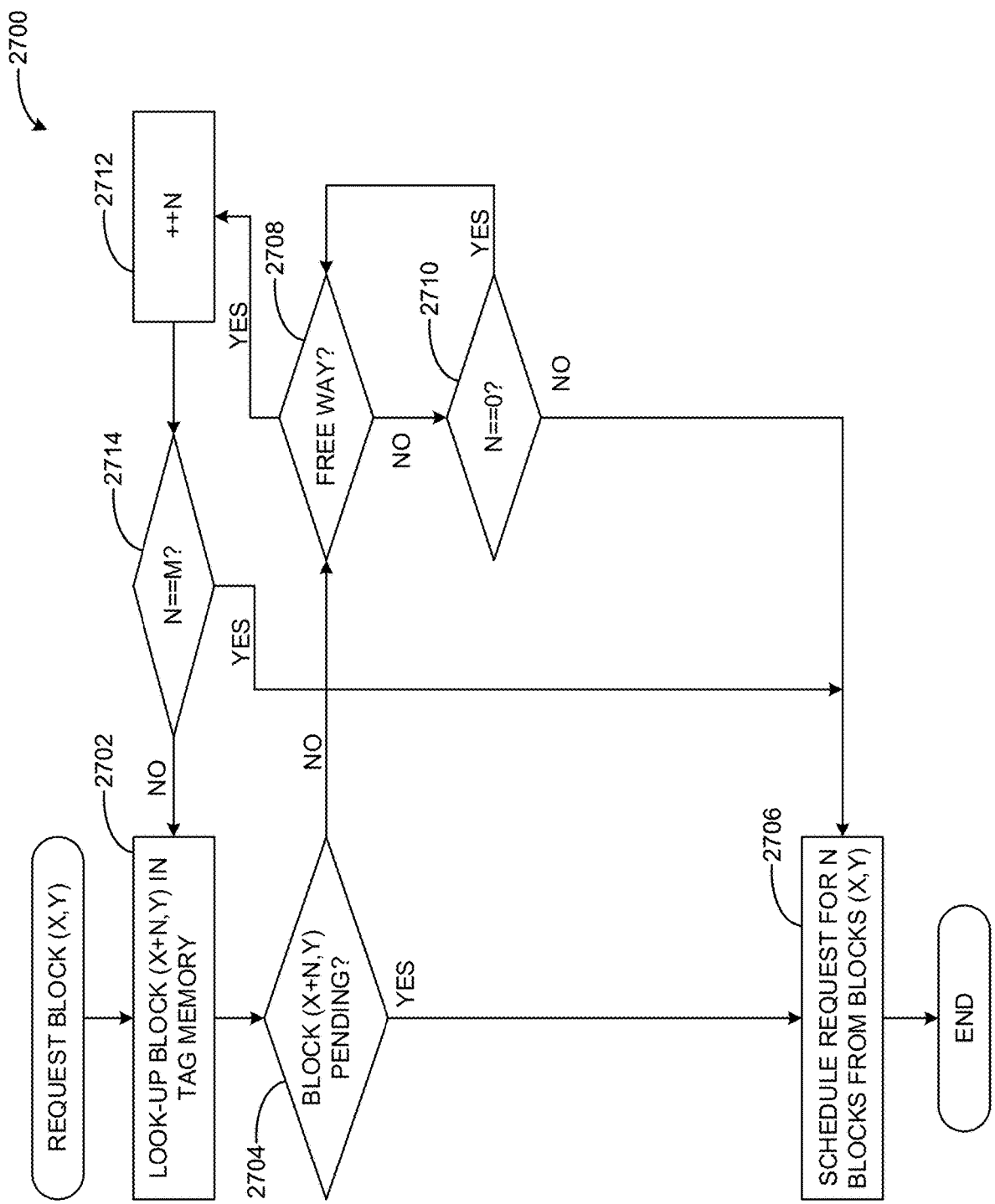
FIG. 27 is a flowchart representative of example machine readable instructions that may be executed to implement the example PFBC of FIG. 1 and/or the example prefetch engine of FIG. 2 to construct example speculative block requests.

FIG. 27 is a flowchart representative of example machine readable instructions 2700 that may be executed by the PFBC 100 of FIG. 1 and/or the prefetch engine 200 of FIG. 2 to construct example speculative block requests. The machine readable instructions 2700 begin at block 2702, at which the PFBC 100 looks up an image block (X+N, Y) in tag memory, where X and Y are pixel coordinates and N is the block quantity field 1504 of FIG. 15 representing a quantity of image blocks to a left-side or a right-side of an image block including the X and Y pixel coordinates to be fetched. For example, the tag mapper 124 may determine that an image data block is stored in the cache storage 146 of FIG. 1 based on mapping the pixel coordinates to one of the tags 120 included in the tag storage 122.

At block 2704, the PFBC 100 determines whether an image block is pending. For example, a pending image block corresponds to an image block being retrieved from the main memory 110 and stored in the cache 146. In response to determining that an image block is pending, the PFBC 100 initializes a retrieval operation of the image block from the main memory 110. In response to determining that the image block is not pending, the PFBC 100 initializes building one or more SBRs to initialize the retrieval operation. For example, the tag mapper 124 of FIG. 1 may map the pixel coordinates to one of the tags 120. The tag mapper 124 may determine that a corresponding pending field is enabled indicating that an image data block associated with the pixel coordinates is getting fetched from the main memory 110 of FIG. 1.

If, at block 2704, the PFBC 100 determines that the image block is pending, the PFBC 100 schedules a request for N image blocks from block (X, Y) at block 2706. For example, the SBR builder 126 may generate one or more SBRs and instruct the block fetcher 138 to retrieve N image data block(s) to the left or the right of the image data block including the X and Y coordinates from the main memory 110. In response to scheduling the request, the machine readable instructions 2700 conclude. For example, the PFBC 100 has received requested pixel coordinates, mapped the pixel coordinates to one or more image blocks in the main memory 110, and has initialized a retrieval of the one or more image blocks from the main memory 110 and will store the one or more image blocks in the cache 146 for accelerated processing by the hardware accelerator 114 and/or any other hardware or machine readable instructions. For example, the hardware accelerator 114 can process one or more image blocks compared to one or more lines of image data.

If, at block 2704, the PFBC 100 determines that the block is not pending (e.g., a value of a pending field is zero and/or otherwise disabled), control proceeds to block 2708 to determine whether the way associated with the tag 120 identified at block 2702 is free. For example, a free way corresponds to one or more indices of a corresponding one of the cache memories 148 of FIG. 1 that is available for image block storage or includes image blocks that can be replaced for new image blocks. For example, the tag mapper 124 may determine that the way is not free based on a non-zero value of the count field 134.

If, at block 2708, the PFBC 100 determines that the way is not free, then, at block 2710, the PFBC 100 determines whether to set N to zero. For example, the SBR builder 126 may set N to zero to indicate that no blocks to the left or right of the X and Y coordinates are to be fetched (e.g., no image data blocks are to be speculatively fetched).

If, at block 2710, the PFBC 100 determines to set N to zero, control proceeds to block 2706 to schedule a request for 0 blocks, causing the machine readable instructions 2700 to conclude. If, at block 2710, the PFBC 100 determines not to set N to zero, control returns to block 2708 to determine whether the way is free. For example, the SBR builder 126 may stall until the requested slot becomes available. For example, the SBR builder 126 may stall processing a request for a first image data block until the tag mapper 124 makes available the corresponding way in the tag storage 122.

If, at block 2708, the PFBC 100 determines that the way is free, control proceeds to block 2712 to increment N. For example, the SBR builder 126 may determine to speculatively fetch an image data block associated with the pixel coordinates to fill a free one of the ways. In response to incrementing N, the PFBC 100 determines whether N=M at block 2714. For example, N may be initially zero and M may be a programmable value in a range of 1 to 8. If, at block 2714, the PFBC 100 determines that the quantity of blocks to speculatively fetch (N) is not equal to a speculative fetch threshold (M), control proceeds to block 2702 to look up the block (X+N, Y) in tag memory. If, at block 2714, the PFBC 100 determines that the quantity of blocks to speculatively fetch (N) are equal to a speculative fetch threshold (M), control proceeds to block 2706 to schedule the request to speculatively fetch N blocks to the left or right of the image data block associated with the pixel coordinates. Alternatively, the request may include speculatively fetching N blocks above or below the image data block associated with the pixel coordinates.

FIG. 28 is a block diagram of an example processor platform 2800 structured to execute the instructions of FIGS. 24-27 to implement the PFBC 100 of FIG. 1. The processor platform 2800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2812 implements the example pre-fetcher 112, the example pixel data FIFO buffer 116, the example tag mapper 124, the example SBR builder 126, the example SBR FIFO 136, the example block fetcher 138, the example address generator 142, the example cache filler 144, the example block data reader 150, the example read tag mapper 152, and the example cache accessor 154.

The processor 2812 of the illustrated example includes a local memory 2813 (e.g., a cache). The processor 2812 of the illustrated example is in communication with a main memory including a volatile memory 2814 and a non-volatile memory 2816 via a bus 2818. The volatile memory 2814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 2816 may be implemented by flash memory and/or any other desired type of memory device. Access to the main memory 2814, 2816 is controlled by a memory controller. In this example, the volatile memory 2814 implements the example tag storage 122 and the example cache storage 146. Alternatively, the non-volatile memory 2816 may implement the example tag storage 122 and/or the example cache storage 146.

The processor platform 2800 of the illustrated example also includes an interface circuit 2820. The interface circuit 2820 may be implemented by any type of interface standard, such as an Ethernet interface, a universal serial bus (USB), a Bluetooth® interface, a near field communication (NFC) interface, and/or a PCI express interface.

In the illustrated example, one or more input devices 2822 are connected to the interface circuit 2820. The input device(s) 2822 permit(s) a user to enter data and/or commands into the processor 2812. The input device(s) 2822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2824 are also connected to the interface circuit 2820 of the illustrated example. The output devices 2824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 2820 of the illustrated example, thus, typically includes a graphics driver card, a graphics driver chip, and/or a graphics driver processor.

The interface circuit 2820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2826. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1020 implements example memory interface 102, the example pre-fetch interface 104, the example request interface 106, the example data interface 108, and the example block fetcher interface 140.

The processor platform 2800 of the illustrated example also includes one or more mass storage devices 2828 for storing software and/or data. Examples of such mass storage devices 2828 include floppy disk drives, hard drive disks, compact disk drives, Blu-ray disk drives, redundant array of independent disks (RAID) systems, and digital versatile disk (DVD) drives.

The machine executable instructions 2832 of FIGS. 24-27 may be stored in the mass storage device 2828, in the volatile memory 2814, in the non-volatile memory 2816, and/or on a removable non-transitory computer readable storage medium such as a CD or DVD.

FIG. 29 is a block diagram of an example processor platform 2900 structured to execute the instructions of FIGS. 24-27 to implement the example prefetch engine 200 of FIG. 2. The processor platform 2900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2900 of the illustrated example includes a processor 2912. The processor 2912 of the illustrated example is hardware. For example, the processor 2912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2912 implements the example prefetch kernel retriever 202, the example memory interface engine 204, and the example kernel retriever 206.

The processor 2912 of the illustrated example includes a local memory 2913 (e.g., a cache). The processor 2912 of the illustrated example is in communication with a main memory including a volatile memory 2914 and a non-volatile memory 2916 via a bus 2918. The volatile memory 2914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 2916 may be implemented by flash memory and/or any other desired type of memory device. Access to the main memory 2914, 2916 is controlled by a memory controller.

The processor platform 2900 of the illustrated example also includes an interface circuit 2920. The interface circuit 2920 may be implemented by any type of interface standard, such as an Ethernet interface, a universal serial bus (USB), a Bluetooth® interface, a near field communication (NFC) interface, and/or a PCI express interface.

In the illustrated example, one or more input devices 2922 are connected to the interface circuit 2920. The input device(s) 2922 permit(s) a user to enter data and/or commands into the processor 2912. The input device(s) 2922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2924 are also connected to the interface circuit 2920 of the illustrated example. The output devices 2924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 2920 of the illustrated example, thus, typically includes a graphics driver card, a graphics driver chip, and/or a graphics driver processor.

The interface circuit 2920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2900 of the illustrated example also includes one or more mass storage devices 2928 for storing software and/or data. Examples of such mass storage devices 2928 include floppy disk drives, hard drive disks, compact disk drives, Blu-ray disk drives, redundant array of independent disks (RAID) systems, and digital versatile disk (DVD) drives.

The machine executable instructions 2932 of FIGS. 24-27 may be stored in the mass storage device 2928, in the volatile memory 2914, in the non-volatile memory 2916, and/or on a removable non-transitory computer readable storage medium such as a CD or DVD.

From the foregoing, it will be appreciated that example methods, apparatus, and articles of manufacture have been disclosed that reduce memory latency and improve pixel data transfers. Example pre-fetch block cache apparatus disclosed herein optimize accesses to blocks of image data rather than lines of memory. Examples disclosed herein provide high memory bandwidth block-based access to buffers of image data for the hardware acceleration of image processing or computer vision algorithms. Examples disclosed herein provide an improved interface to image data suitable for accelerators of algorithms where access patterns exhibit spatial locality but where they are not pre-determined or fixed from one image (or tile or slice thereof) or pixel to the next. Examples disclosed herein speculatively fetch image data blocks from memory and store them in unused cache memory to improve an efficiency of future requests for the speculatively fetched image data blocks. Examples disclosed herein improve an efficiency of warp transforms by implementing the pre-fetch block cache apparatus disclosed herein.

Example 1 includes an apparatus to reduce pixel transfer latency, the apparatus comprising a prefetch kernel retriever to generate a block tag based on a first request from a hardware accelerator, the first request including first coordinates of a first pixel disposed in a first image block, a memory interface engine to store the first image block including a plurality of pixels including the pixel in a cache storage based on the block tag, and a kernel retriever to access two or more memory devices included in the cache storage in parallel to transfer a plurality of image blocks including the first image block when a second request is received including second coordinates of a second pixel disposed in the first image block.

Example 2 includes the apparatus of example 1, wherein the prefetch kernel retriever is to generate the block tag by concatenating a first quantity of bits of a first one of the first coordinates and a second quantity of bits of a second one of the first coordinates.

Example 3 includes the apparatus of example 1, wherein the prefetch kernel retriever is to search a tag storage to identify within a single clock cycle whether the block tag matches one of a plurality of block tags stored in the tag storage, and generate a speculative build request to retrieve the first image block from memory when the block tag does not match one of the plurality of block tags, and the memory interface engine to update an entry in the tag storage when the first image block is stored.

Example 4 includes the apparatus of example 3, wherein the memory interface engine is to update the entry by at least one of storing the block tag in a tag field, storing a first value in a pending field, or storing a second value in a validation field, the first value different from the second value.

Example 5 includes the apparatus of example 1, wherein the plurality of pixels is a first plurality of pixels, and further including the memory interface engine to retrieve a second image block including a second plurality of pixels, the first plurality of pixels proximate to the second plurality of pixels in an image, the second image block not included in the request, and store the second image block in the cache storage based on the block tag, and the kernel retriever to transfer the plurality of blocks including the first image block and the second image block to the hardware accelerator.

Example 6 includes the apparatus of example 1, wherein storing the first block is based on a Morton order, a column-major order, or a row-major order.

Example 7 includes the apparatus of example 1, wherein the block tag is a first block tag, and the prefetch kernel retriever is to determine if a first entry in tag storage includes a first count field with a non-zero value, determine if a second entry in the tag storage includes a second count field with a non-zero value when the first count field has a non-zero value, and replace a second block tag of the second entry with the first block tag when the second count field does not have a non-zero value.

Example 8 includes the apparatus of example 7, wherein the prefetch kernel retriever replaces the second block tag when a pending field of the second entry has a zero value.

Example 9 includes the apparatus of example 1, wherein the hardware accelerator is an image processing hardware accelerator, a three-dimensional (3-d) hardware accelerator, or a cryptographic hardware accelerator.

Example 10 includes a non-transitory computer readable storage medium comprising instructions which, when executed, cause a machine to at least generate a block tag based on a first request from a hardware accelerator, the first request including first coordinates of a first pixel disposed in a first image block, store the first image block including a plurality of pixels including the pixel in a cache storage based on the block tag, and access two or more memory devices included in the cache storage in parallel to transfer a plurality of image blocks including the first image block when a second request is received including second coordinates of a second pixel disposed in the first image block.

Example 11 includes the non-transitory computer readable storage medium of example 10, further including instructions which, when executed cause the machine to at least concatenate a first quantity of bits of a first one of the first coordinates and a second quantity of bits of a second one of the first coordinates.

Example 12 includes the non-transitory computer readable storage medium of example 10, further including instructions which, when executed, cause the machine to at least search a tag storage to identify within a single clock cycle whether the block tag matches one of a plurality of block tags stored in the tag storage, generate a speculative build request to retrieve the first image block from memory when the block tag does not match one of the plurality of block tags, and update an entry in the tag storage when the first image block is stored.

Example 13 includes the non-transitory computer readable storage medium of example 12, further including instructions which, when executed, cause the machine to at least update the entry by at least one of storing the block tag in a tag field, storing a first value in a pending field, or storing a second value in a validation field, the first value different from the second value.

Example 14 includes the non-transitory computer readable storage medium of example 10, wherein the plurality of pixels is a first plurality of pixels, and further including instructions which, when executed, cause the machine to at least retrieve a second image block including a second plurality of pixels, the first plurality of pixels proximate to the second plurality of pixels in an image, the second image block not included in the request, store the second image block in the cache storage based on the block tag, and transfer the plurality of image blocks including the first image block and the second image block to the hardware accelerator.

Example 15 includes the non-transitory computer readable storage medium of example 10, wherein storing the first block is based on a Morton order, a column-major order, or a row-major order.

Example 16 includes the non-transitory computer readable storage medium of example 10, wherein the block tag is a first block tag, and further including instructions which, when executed, cause the machine to at least determine if a first entry in tag storage includes a first count field with a non-zero value, determine if a second entry in the tag storage includes a second count field with a non-zero value when the first count field has a non-zero value, and replace a second block tag of the second entry with the first block tag when the second count field does not have a non-zero value.

Example 17 includes the non-transitory computer readable storage medium of example 16, further including instructions which, when executed, cause the machine to at least determine if a pending field included in the second entry has a non-zero value, and replace the second block tag of the second entry with the first block tag when a pending field of the second entry has a zero value.

Example 18 includes a method to reduce pixel transfer latency, the method comprising generating a block tag based on a first request from a hardware accelerator, the first request including first coordinates of a first pixel disposed in a first image block, storing the first image block including a plurality of pixels including the pixel in a cache storage based on the block tag, and accessing two or more memory devices included in the cache storage in parallel to transfer a plurality of image blocks including the first image block when a second request is received including second coordinates of a second pixel disposed in the first image block.

Example 19 includes the method of example 18, wherein generating the block tag includes concatenating a first quantity of bits of a first one of the first coordinates and a second quantity of bits of a second one of the first coordinates.

Example 20 includes the method of example 18, further including searching a tag storage to identify within a single clock cycle whether the block tag matches one of a plurality of block tags stored in the tag storage, generating a speculative build request to retrieve the first image block from memory when the block tag does not match one of the plurality of block tags, and updating an entry in the tag storage when the first image block is stored.

Example 21 includes the method of example 20, wherein updating the entry includes at least one of storing the block tag in a tag field, storing a first value in a pending field, or storing a second value in a validation field, the first value different from the second value.

Example 22 includes the method of example 18, wherein the plurality of pixels is a first plurality of pixels, and further including retrieving a second image block including a second plurality of pixels, the first plurality of pixels proximate to the second plurality of pixels in an image, the second image block not included in the request, storing the second image block in the cache storage based on the block tag, and transferring the plurality of blocks including the first image block and the second image block.

Example 23 includes the method of example 18, wherein storing the first image block is based on a Morton order, a column-major order, or a row-major order.

Example 24 includes the method of example 18, wherein the block tag is a first block tag, and storing the first image block includes determining if a first entry in tag storage includes a first count field with a non-zero value, in response to determining that the first count field has a non-zero value, determining if a second entry in the tag storage includes a second count field with a non-zero value, and in response to determining that the second count field does not have a non-zero value, replacing a second block tag of the second entry with the first block tag.

Example 25 includes the method of example 24, wherein replacing the second block tag includes determining if a pending field included in the second entry has a non-zero value, and in response to the pending field having a zero value, replacing the second block tag of the second entry with the first block tag.

Example 26 includes an apparatus to reduce pixel transfer latency, the apparatus comprising a first means to generate a block tag based on a first request from a hardware accelerator, the first request including first coordinates of a first pixel disposed in a first image block, a second means to store the first image block including a plurality of pixels including the pixel in a cache storage based on the block tag, and a third means to access two or more memory devices included in the cache storage in parallel to transfer a plurality of image blocks including the first image block when a second request is received including second coordinates of a second pixel disposed in the first image block.

Example 27 includes the apparatus of example 26, wherein the first means includes concatenating a first quantity of bits of a first one of the first coordinates and a second quantity of bits of a second one of the first coordinates.

Example 28 includes the apparatus of example 26, further including a fourth means to search a tag storage to identify within a single clock cycle whether the block tag matches one of a plurality of block tags stored in the tag storage, a fifth means to generate a speculative build request to retrieve the first image block from memory when the block tag does not match one of the plurality of block tags, and a sixth means to update an entry in the tag storage when the first image block is stored.

Example 29 includes the apparatus of example 28, wherein the sixth means includes at least one of storing the block tag in a tag field, storing a first value in a pending field, or storing a second value in a validation field, the first value different from the second value.

Example 30 includes the apparatus of example 26, wherein the plurality of pixels is a first plurality of pixels, and further including a fourth means to retrieve a second image block including a second plurality of pixels, the first plurality of pixels proximate to the second plurality of pixels in an image, the second image block not included in the request, a fifth means to store the second image block in the cache storage based on the block tag, and a sixth means to transfer the plurality of blocks including the first image block and the second image block.

Example 31 includes the apparatus of example 26, wherein the second means is based on a Morton order, a column-major order, or a row-major order.

Example 32 includes the apparatus of example 26, wherein the block tag is a first block tag, and the second means includes a fourth means to determine if a first entry in tag storage includes a first count field with a non-zero value, a fifth means to determine if a second entry in the tag storage includes a second count field with a non-zero value when the first count field has a non-zero value, and a sixth means to replace a second block tag of the second entry with the first block tag when the second count field does not have a non-zero value.

Example 33 includes the apparatus of example 32, wherein the sixth means includes seventh means to determine if a pending field included in the second entry has a non-zero value, and eighth means to replace the second block tag of the second entry with the first block tag when a pending field of the second entry has a zero value.

Examples disclosed herein may apply to internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

Backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices, such as over the backbone links, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

Clusters of IoT devices may be equipped to communicate with other IoT devices as well as with a cloud network. This may allow the IoT devices to form an ad-hoc network between the devices, allowing them to function as a single device, which may be termed a fog device.

A cloud computing network in communication with a mesh network of IoT devices may operate as a fog device at the edge of the cloud computing network. The mesh network of IoT devices may be termed a fog, operating at the edge of the cloud.

The fog may be considered to be a massively interconnected network wherein a number of IoT devices are in communications with each other, for example, by radio links. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices include gateways, data aggregators, and sensors, although any combinations of IoT devices and functionality may be used. The gateways may be edge devices that provide communications between the cloud and the fog, and may also provide the backend process function for data obtained from sensors, such as motion data, flow data, temperature data, and the like. The data aggregators may collect data from any number of the sensors, and perform the back end processing function for the analysis. The results, raw data, or both may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along a convenient path (e.g., a most convenient path) between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog provided from these IoT devices may be presented to devices in the cloud, such as a server, as a single device located at the edge of the cloud, e.g., a fog device. In this example, the alerts coming from the fog device may be sent without being identified as coming from a specific IoT device within the fog. In this fashion, the fog may be considered a distributed platform that provides computing and storage resources to perform processing or data-intensive tasks such as data analytics, data aggregation, and machine-learning, among others.

In some examples, the IoT devices may be configured using an imperative programming style, e.g., with each IoT device having a specific function and communication partners. However, the IoT devices forming the fog device may be configured in a declarative programming style, allowing the IoT devices to reconfigure their operations and communications, such as to determine needed resources in response to conditions, queries, and device failures. As an example, a query from a user located at a server about the operations of a subset of equipment monitored by the IoT devices may result in the fog device selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from flow sensors or temperature sensors. Further, if some of the IoT devices are not operational, other IoT devices in the fog device may provide analogous data, if available.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to reduce pixel transfer latency, the apparatus comprising:
   prefetch kernel retriever circuitry to generate a block tag based on a first request obtained from a hardware accelerator at a first time at first interface circuitry, the first request including first coordinates of a first pixel disposed in a first image block;
   memory interface engine circuitry to store the first image block including a plurality of pixels including the first pixel and a second pixel in a cache storage based on the block tag; and
   kernel retriever circuitry to:
      in response to obtaining a second request from the hardware accelerator at a second time at second interface circuitry, determine whether the first image block has been stored in the cache storage based on a mapping of second coordinates of the second pixel to the block tag, the second request including the second coordinates, the second time after the first time; and
      in response to determining that the first image block has been stored in the cache storage, access, in parallel, two or more memory devices included in the cache storage to transfer a plurality of image blocks including the first image block to the hardware accelerator.

2. The apparatus of claim 1, wherein the prefetch kernel retriever circuitry is to generate the block tag based on a concatenation of a first quantity of bits of a first one of the first coordinates and a second quantity of bits of a second one of the first coordinates.

3. The apparatus of claim 1, wherein the prefetch kernel retriever circuitry is to:
   search tag storage memory to identify within a single clock cycle whether the block tag matches one of a plurality of block tags stored in the tag storage memory; and
   generate a speculative build request to retrieve the first image block from memory in response to a determination that the block tag does not match one of the plurality of the block tags; and
the memory interface engine circuitry to update an entry in the tag storage memory in response to a storage of the first image block.

4. The apparatus of claim 3, wherein the memory interface engine circuitry is to update the entry based on at least one of a storage of the block tag in a tag field, a first value in a pending field, or a second value in a validation field, the first value different from the second value.

5. The apparatus of claim 1, wherein the plurality of the pixels is a first plurality of the pixels, and further including:
   the memory interface engine circuitry to:
      retrieve a second image block including a second plurality of the pixels, the first plurality of the pixels proximate to the second plurality of the pixels in an image, the second image block not included in the first request; and
      store the second image block in the cache storage based on the block tag; and
   the kernel retriever circuitry to transfer the plurality of the image blocks including the first image block and the second image block to the hardware accelerator.

6. The apparatus of claim 1, wherein the memory interface engine circuitry is to store the first image block based on a Morton order, a column-major order, or a row-major order.

7. The apparatus of claim 1, wherein the block tag is a first block tag, and the prefetch kernel retriever circuitry is to:
   determine whether a first entry in tag storage memory includes a first count field with a non-zero value;
   determine whether a second entry in the tag storage memory includes a second count field with a non-zero value in response to a first determination that the first count field has a non-zero value; and
   replace a second block tag of the second entry with the first block tag in response to a second determination that the second count field does not have a non-zero value.

8. The apparatus of claim 7, wherein the prefetch kernel retriever circuitry is to replace the second block tag in response to a third determination that a pending field of the second entry has a zero value.

9. The apparatus of claim 1, wherein the hardware accelerator is an image processing hardware accelerator, a three-dimensional (3-D) hardware accelerator, or a cryptographic hardware accelerator.

10. A non-transitory computer readable storage medium comprising instructions which, when executed, cause hardware to at least:
   generate a block tag based on a first request obtained from a hardware accelerator at a first time at first interface circuitry, the first request including first coordinates of a first pixel disposed in a first image block;
   store the first image block including a plurality of pixels including the first pixel and a second pixel in a cache storage based on the block tag;
   in response to obtaining a second request from the hardware accelerator at a second time at second interface circuitry, determine whether the first image block has been stored in the cache storage based on a mapping of second coordinates of the second pixel to the block tag, the second request including the second coordinates, the second time after the first time; and
   in response to determining that the first image block has been stored in the cache storage, access, in parallel, two or more memory devices included in the cache storage to transfer a plurality of image blocks including the first image block to the hardware accelerator.

11. The non-transitory computer readable storage medium of claim 10, wherein the instructions, when executed cause the hardware to concatenate a first quantity of bits of a first one of the first coordinates and a second quantity of bits of a second one of the first coordinates.

12. The non-transitory computer readable storage medium of claim 10, wherein the instructions, when executed, cause the hardware to:
   search a tag storage to identify within a single clock cycle whether the block tag matches one of a plurality of block tags stored in the tag storage;
   generate a speculative build request to retrieve the first image block from memory in response to a first determination that the block tag does not match one of the plurality of the block tags; and
   update an entry in the tag storage in response to a storage of the first image block.

13. The non-transitory computer readable storage medium of claim 12, wherein the instructions, when executed, cause the hardware to update the entry based on at least one of a storage of the block tag in a tag field, a first value in a pending field, or a second value in a validation field, the first value different from the second value.

14. The non-transitory computer readable storage medium of claim 10, wherein the plurality of the pixels is a first plurality of the pixels, and the instructions, when executed, cause the hardware to:

retrieve a second image block including a second plurality of the pixels, the first plurality of the pixels proximate to the second plurality of the pixels in an image, the second image block not included in the first request;

store the second image block in the cache storage based on the block tag; and transfer the plurality of the image blocks including the first image block and the second image block to the hardware accelerator.

15. The non-transitory computer readable storage medium of claim 10, wherein the instructions, when executed, cause the hardware to store the first image block based on a Morton order, a column-major order, or a row-major order.

16. The non-transitory computer readable storage medium of claim 10, wherein the block tag is a first block tag, and the instructions, when executed, cause the hardware to:

determine whether a first entry in tag storage includes a first count field with a non-zero value;

determine whether a second entry in the tag storage includes a second count field with a non-zero value in response to a first determination that the first count field has a non-zero value; and replace a second block tag of the second entry with the first block tag in response to a second determination that the second count field does not have a non-zero value.

17. The non-transitory computer readable storage medium of claim 16, wherein the instructions, when executed, cause the hardware to:

determine whether a pending field included in the second entry has a non-zero value; and replace the second block tag of the second entry with the first block tag in response to a third determination that a pending field of the second entry has a zero value.

18. An apparatus to reduce pixel transfer latency, the apparatus comprising:

means for generating a block tag based on a first request obtained from a hardware accelerator at a first time at first interface circuitry, the first request including first coordinates of a first pixel disposed in a first image block;

means for storing the first image block including a plurality of pixels including the first pixel and a second pixel in a cache storage based on the block tag;

means for determining whether the first image block has been stored in the cache storage based on a mapping of second coordinates of the second pixel to the block tag in response to obtaining from the hardware accelerator a second request at a second time at second interface circuitry, the second request including the second coordinates, the second time after the first time; and the means for determining to access, in parallel, two or more memory devices included in the cache storage to transfer a plurality of image blocks including the first image block to the hardware accelerator in response to determining that the first image block has been stored in the cache storage.

19. The apparatus of claim 18, wherein the means for generating is to concatenate a first quantity of bits of a first one of the first coordinates and a second quantity of bits of a second one of the first coordinates.

20. The apparatus of claim 18, wherein the means for generating is to:

search tag storage memory to identify within a single clock cycle whether the block tag matches one of a plurality of block tags stored in the tag storage memory;

generate a speculative build request to retrieve the first image block from memory in response to a determination that the block tag does not match one of the plurality of the block tags; and update an entry in the tag storage memory in response to a storage of the first image block.

21. The apparatus of claim 20, wherein the means for generating is to update the entry based on at least one of storing a of the block tag in a tag field, a first value in a pending field, or a second value in a validation field, the first value different from the second value.

22. The apparatus of claim 18, wherein the plurality of the pixels is a first plurality of the pixels, and wherein:

the means for storing is to:

retrieve a second image block including a second plurality of the pixels, the first plurality of the pixels proximate to the second plurality of the pixels in an image, the second image block not included in the first request; and store the second image block in the cache storage based on the block tag; and the means for determining is to transfer the plurality of the image blocks including the first image block and the second image block.

23. The apparatus of claim 18, wherein the means for storing is to store the first image block based on a Morton order, a column-major order, or a row-major order.

24. The apparatus of claim 18, wherein the block tag is a first block tag, and the means for determining is to:

determine whether a first entry in tag storage memory includes a first count field with a non-zero value;

determine whether a second entry in the tag storage memory includes a second count field with a non-zero value in response to a first determination that the first count field has a non-zero value; and replace a second block tag of the second entry with the first block tag in response to a second determination that the second count field does not have a non-zero value.

25. The apparatus of claim 24, wherein the means for generating is to:

determine whether a pending field included in the second entry has a non-zero value; and replace the second block tag of the second entry with the first block tag in response to a third determination that a pending field of the second entry has a zero value.

* * * * *

UNITED STATES PATENT AND TRADEMARK OFFICE
CERTIFICATE OF CORRECTION

| | | |
|---|---|---|
| PATENT NO. | : 11,170,463 B2 | Page 1 of 1 |
| APPLICATION NO. | : 16/614755 | |
| DATED | : November 9, 2021 | |
| INVENTOR(S) | : Boyd et al. | |

It is certified that error appears in the above-identified patent and that said Letters Patent is hereby corrected as shown below:

In the Claims

In Claim 21, Line 18, delete "storing a of the block tag" and insert -- a storage of the block tag --.

Signed and Sealed this
Sixth Day of September, 2022

Katherine Kelly Vidal
*Director of the United States Patent and Trademark Office*